United States Patent
Kondo et al.

(10) Patent No.: US 8,181,216 B2
(45) Date of Patent: May 15, 2012

(54) DATA PROCESSING APPARATUS, DATA PROCESSING METHOD, AND DATA PROCESSING SYSTEM

(75) Inventors: Tetsujiro Kondo, Tokyo (JP); Kazutaka Ando, Kanagawa (JP)

(73) Assignee: Sony Corporation, Tokyo (JP)

( * ) Notice: Subject to any disclaimer, the term of this patent is extended or adjusted under 35 U.S.C. 154(b) by 1302 days.

(21) Appl. No.: 10/469,174

(22) PCT Filed: Dec. 12, 2002

(86) PCT No.: PCT/JP02/12991
§ 371 (c)(1),
(2), (4) Date: Aug. 26, 2003

(87) PCT Pub. No.: WO03/056815
PCT Pub. Date: Jul. 10, 2003

(65) Prior Publication Data
US 2004/0237103 A1    Nov. 25, 2004

(30) Foreign Application Priority Data

Dec. 27, 2001    (JP) ................................. 2001-395823

(51) Int. Cl.
| | |
|---|---|
| *H04N 7/173* | (2011.01) |
| *H04N 5/00* | (2011.01) |
| *H04N 5/52* | (2006.01) |
| *H04N 7/12* | (2006.01) |
| *G06F 3/00* | (2006.01) |

(52) U.S. Cl. ........ 725/118; 348/606; 348/607; 348/683; 715/722; 375/240.29

(58) Field of Classification Search ........................ None
See application file for complete search history.

(56) References Cited

U.S. PATENT DOCUMENTS

| | | | | |
|---|---|---|---|---|
| 4,305,091 | A | * | 12/1981 | Cooper .......................... 348/619 |
| 5,402,179 | A | | 3/1995 | Okada |
| 5,790,172 | A | * | 8/1998 | Imanaka ........................... 725/8 |
| 6,151,018 | A | * | 11/2000 | Webb et al. .................... 715/722 |
| 6,246,050 | B1 | * | 6/2001 | Tullis et al. .............. 250/231.13 |
| 6,263,502 | B1 | * | 7/2001 | Morrison et al. ............... 725/47 |
| 6,530,083 | B1 | * | 3/2003 | Liebenow ....................... 725/46 |

(Continued)

FOREIGN PATENT DOCUMENTS

EP    1 061 473    12/2000

(Continued)

*Primary Examiner* — Kieu Oanh T Bui
*Assistant Examiner* — Jason Lin
(74) *Attorney, Agent, or Firm* — Frommer Lawrence & Haug LLP; William S. Frommer; Thomas F. Presson

(57) ABSTRACT

A data processing apparatus that appropriately adjusts the image quality of an image. At a plurality of user terminals, image data transmitted from a broadcasting station is processed based on parameters input by users, and user information including the image data and the parameters is provided to a management server. The management server calculates noise amounts of the respective sets of image data included in the user information provided from the plurality of user terminals, calculates an average value of parameters input by users for each noise amount, and associates the average value with the noise amount. Furthermore, the management server provides a user terminal with server information including a parameter associated with a noise amount of image data from a user terminal. The user terminal processes the image data based on the parameter included in the server information from the management server.

49 Claims, 45 Drawing Sheets

U.S. PATENT DOCUMENTS

| | | | |
|---|---|---|---|
| 6,734,898 B2 * | 5/2004 | Zeidler | 348/183 |
| 6,813,775 B1 * | 11/2004 | Finseth et al. | 725/46 |
| 6,937,767 B1 * | 8/2005 | Burak et al. | 382/232 |
| 2002/0008784 A1 | 1/2002 | Shirata et al. | |
| 2004/0109087 A1 * | 6/2004 | Robinson et al. | 348/461 |

FOREIGN PATENT DOCUMENTS

| | | |
|---|---|---|
| JP | 5-304622 | 11/1993 |
| JP | 10-39830 | 2/1998 |
| JP | 10-233942 | 9/1998 |
| JP | 11-178009 | 7/1999 |
| JP | 2000-175035 | 6/2000 |
| JP | 2000-348019 | 12/2000 |
| JP | 2001-84368 | 3/2001 |
| JP | 2001-257905 | 9/2001 |

* cited by examiner

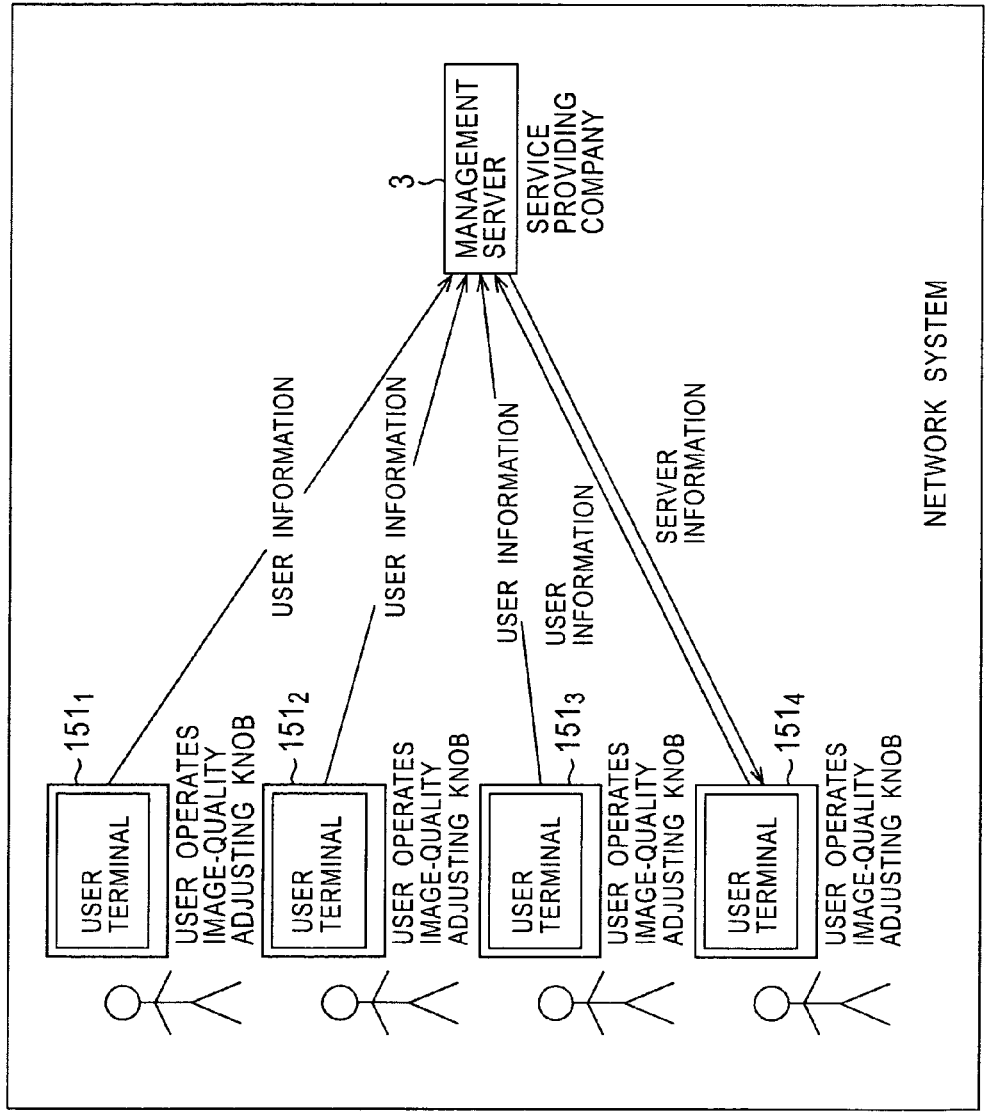

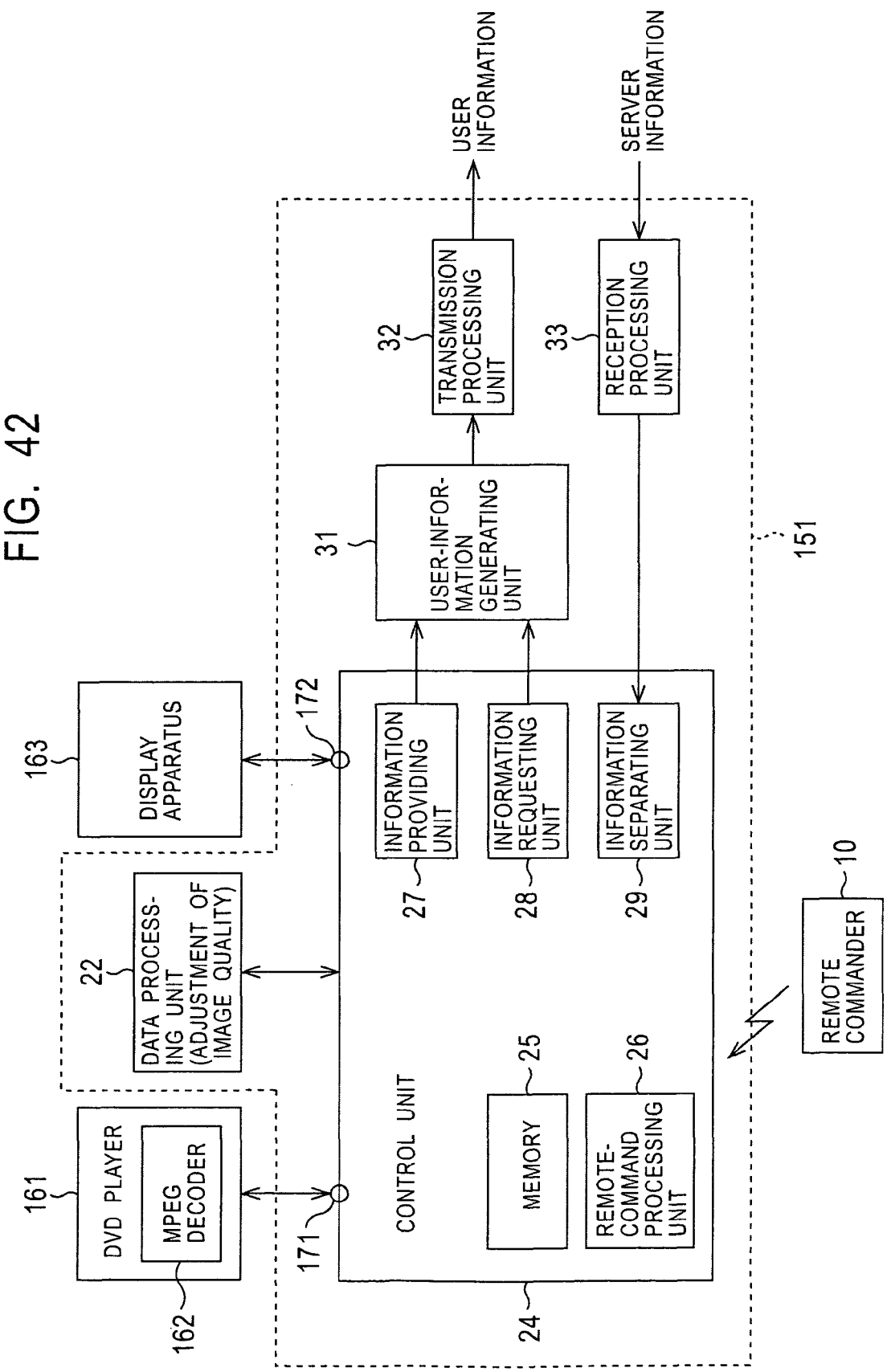

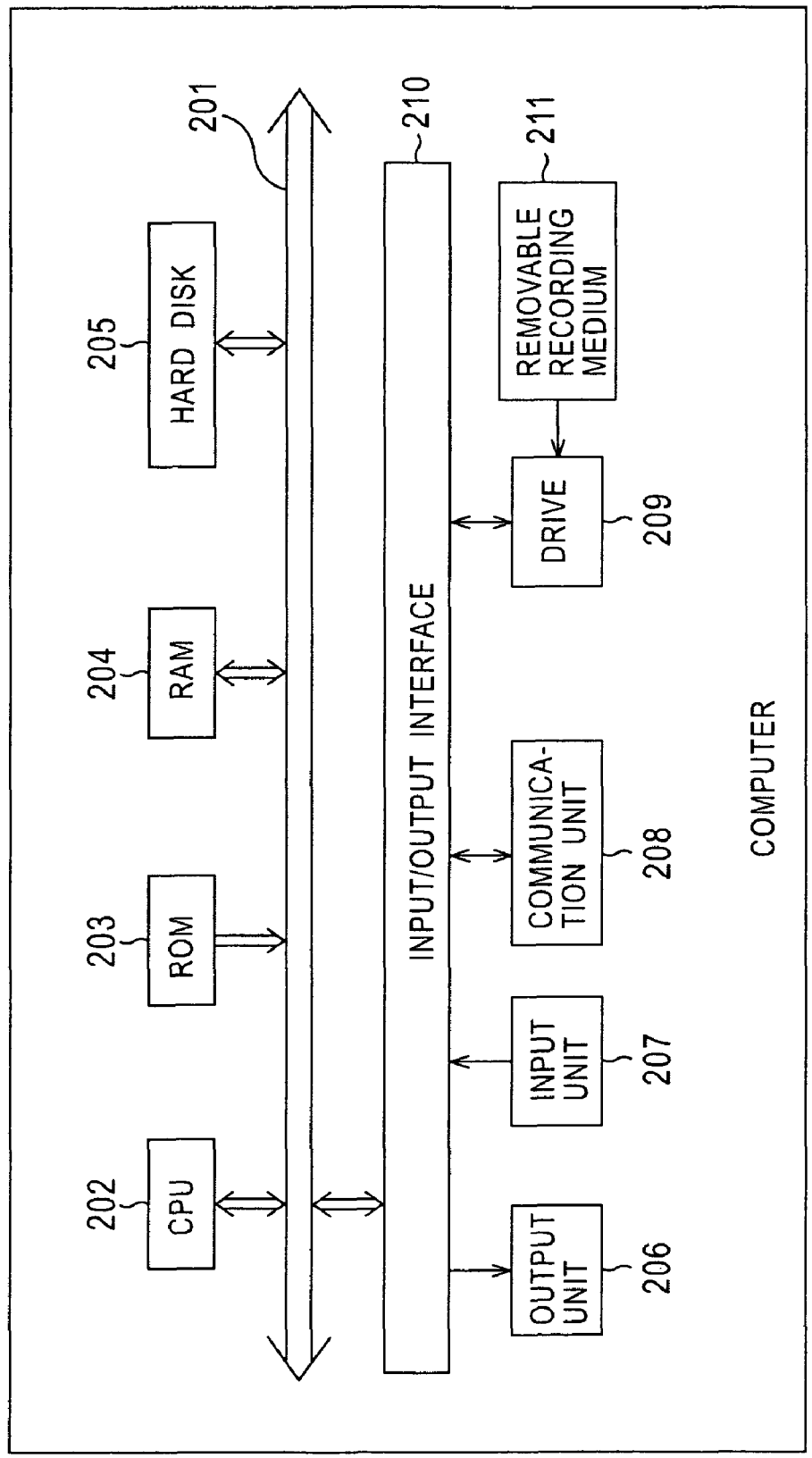

DATA PROCESSING APPARATUS, DATA PROCESSING METHOD, AND DATA PROCESSING SYSTEM

TECHNICAL FIELD

The present invention relates to data processing apparatuses, data processing methods, and data processing systems. More specifically, the present invention relates to, for example, a data processing apparatus, a data processing method, and a data processing system that allow the image quality of an image to be adjusted without causing a sense of laboriousness for a user.

BACKGROUND ART

For example, television receivers that include NR (noise reduction) circuits exist. In such a television receiver, an NR circuit removes noise from image data.

Furthermore, a television receiver is provided with a knob for adjusting brightness (luminance), etc., and a user is allowed to adjust the brightness of a screen, etc. to a desired level by operating the knob.

With regard to NR circuits, generally, a knob for adjusting a parameter that affects processing therein is not provided. Thus, noise is not necessarily removed suitably for all users. More specifically, for example, the S/N (signal/noise) ratio of an image received by a television receiver is usually degraded as the distance from a broadcasting station becomes longer. However, a conventional NR circuit performs the same processing regardless of the S/N ratio of an image.

Furthermore, even if a knob for adjusting a parameter that affects processing in the NR circuit is provided, a user has to operate the knob and set the parameter so that noise will be removed appropriately, which causes a sense of laboriousness for the user.

DISCLOSURE OF INVENTION

The present invention has been made in view of the situation described above, and it allows, for example, the image quality of an image to be adjusted appropriately without causing a sense of laboriousness for a user.

A first data processing apparatus according to the present invention comprise data processing means for processing input data based on a predetermined parameter; first setting means for setting, in accordance with an operation of operation means that is operated when inputting the parameter, the parameter that is used by the data processing means; user-information providing means for providing user information to a server apparatus that statistically processes the user information, the user information at least including the parameter that has been set by the first setting means and status information indicating status under which the parameter has been used by the data processing means; server-information obtaining means for obtaining server information for setting the parameter, the server information being provided from the server apparatus; and second setting means for setting, in accordance with the server information, information regarding the parameter that is used by the data processing means.

A first data processing method according to the present invention comprises a data processing step of processing input data based on a predetermined parameter; a first setting step of setting, in accordance with an operation of operation means that is operated when inputting the parameter, the parameter that is used in the data processing step; a user-information providing step of providing user information to a server apparatus that statistically processes the user information, the user information at least including the parameter that has been set in the first setting step and status information indicating status under which the parameter has been used in the data processing step; a server-information obtaining step of obtaining server information for setting the parameter, the server information being provided from the server apparatus; and a second setting step of setting, in accordance with the server information, information regarding the parameter that is used in the data processing step.

A first program according to the present invention, executed by a computer, comprises a data processing step of processing input data based on a predetermined parameter; a first setting step of setting, in accordance with an operation of operation means that is operated when inputting the parameter, the parameter that is used in the data processing step; a user-information providing step of providing user information to a server apparatus that statistically processes the user information, the user information at least including the parameter that has been set in the first setting step and status information indicating status under which the parameter has been used in the data processing step; a server-information obtaining step of obtaining server information for setting the parameter, the server information being provided from the server apparatus; and a second setting step of setting, in accordance with the server information, information regarding the parameter that is used in the data processing step.

A first storage medium according to the present invention stores a program that is executed by a computer, the program comprising a data processing step of processing input data based on a predetermined parameter; a first setting step of setting, in accordance with an operation of operation means that is operated when inputting the parameter, the parameter that is used in the data processing step; a user-information providing step of providing user information to a server apparatus that statistically processes the user information, the user information at least including the parameter that has been set in the first setting step and status information indicating status under which the parameter has been used in the data processing step; a server-information obtaining step of obtaining server information for setting the parameter, the server information being provided from the server apparatus; and a second setting step of setting, in accordance with the server information, information regarding the parameter that is used in the data processing step.

A second data processing apparatus according to the present invention comprises user-information obtaining means for obtaining user information from a plurality of user terminals, the user information at least including a predetermined parameter that is used at a user terminal that processes input data based on the parameter, and including status information indicating status under which the parameter has been used at the user terminal; feature detecting means for detecting feature information from the status information included in the user information and associating information regarding the parameter with each set of feature information; and server-information providing means for providing the user terminal with server information at least including the information regarding the parameter associated with the feature information.

A second data processing method according to the present invention comprises a user-information obtaining step of obtaining user information from a plurality of user terminals, the user information at least including a predetermined parameter that is used at a user terminal that processes input data based on the parameter, and including status information indicating status under which the parameter has been used at the user terminal; a feature detecting step of detecting feature information from the status information included in the user information and associating information regarding the parameter with each set of feature information; and a server-information providing step of providing the user terminal with server information including the information regarding the parameter associated with the feature information.

A second program according to the present invention, executed by a computer, comprises a user-information obtaining step of obtaining user information from a plurality of user terminals, the user information at least including a predetermined parameter that is used at a user terminal that processes input data based on the parameter, and including status information indicating status under which the parameter has been used at the user terminal; a feature detecting step of detecting feature information from the status information included in the user information and associating information regarding the parameter with each set of feature information; and a server-information providing step of providing the user terminal with server information including the information regarding the parameter associated with the feature information.

A second storage medium according to the present invention stores a program that is executed by a computer, the program comprising a user-information obtaining step of obtaining user information from a plurality of user terminals, the user information at least including a predetermined parameter that is used at a user terminal that processes input data based on the parameter, and including status information indicating status under which the parameter has been used at the user terminal; a feature detecting step of detecting feature information from the status information included in the user information and associating information regarding the parameter with each set of feature information; and a server-information providing step of providing the user terminal with server information including the information regarding the parameter associated with the feature information.

A data processing system according to the present invention comprises a plurality of user terminals and a server apparatus, each of the plurality of user terminals comprising data processing means for processing input data based on a predetermined parameter; first setting means for setting, in accordance with an operation of operation means that is operated when inputting the parameter, the parameter that is used by the data processing means; user-information providing means for providing user information to a server apparatus that statistically processes the user information, the user information at least including the parameter that has been set by the first setting means and status information indicating status under which the parameter has been used by the data processing means; server-information obtaining means for obtaining server information for setting the parameter, the server information being provided from the server apparatus; and second setting means for setting, in accordance with the server information, information regarding the parameter that is used by the data processing means; and the server apparatus comprising user-information obtaining means for obtaining the user information from the plurality of user terminals; feature detecting means for detecting feature information from the status information included in the user information and associating the information regarding the parameter with each set of feature information; and server-information providing means for providing the user terminal with server information at least including the information regarding the parameter associated with the feature information.

According to the first data processing apparatus, data processing method, and program of the present invention, input data is processed based on a predetermined parameter; and a parameter is set in accordance with an operation of operation means that is operated when inputting the parameter. Furthermore, user information is provided to a server apparatus that statistically processes the user information, the user information at least including the parameter that has been set and status information indicating status under which the parameter has been used, and server information for setting the parameter is obtained from the server apparatus. Furthermore, information regarding the parameter is set according to the server information.

According to the second data processing apparatus, data processing method, and program of the present invention, user information is obtained from a plurality of user terminals, the user information at least including a predetermined parameter that is used at a user terminal that processes input data based on the parameter, and including status information indicating status under which the parameter has been used at the user terminal. Furthermore, feature information is detected from the status information included in the user information and information regarding the parameter is associated with each set of feature information. Furthermore, the user terminal is provided with server information at least including the information regarding the parameter associated with the feature information.

According to the data processing system of the present invention, at each of the plurality of user terminals, data processing method, and program, input data is processed based on a predetermined parameter; and a parameter is set in accordance with an operation of operation means that is operated when inputting the parameter. Furthermore, user information is provided to a server apparatus that statistically processes the user information, the user information at least including the parameter that has been set and status information indicating status under which the parameter has been used. Furthermore, server information for setting the parameter is obtained from the server apparatus, and information regarding the parameter is set according to the server information. At the server apparatus, user information is obtained from the plurality of user terminals. Furthermore, feature information is detected from status information included in the user information, and each set of feature information is associated with information regarding the parameter. Furthermore, the user terminal is provided with server information at least including the information regarding the parameter associated with the feature information.

BRIEF DESCRIPTION OF THE DRAWINGS

FIG. 41 is a diagram showing an example configuration of a network system according to an embodiment of the present invention.

FIG. 42 is a block diagram showing an example configuration of a user terminal 151.

FIG. 49 is a block diagram showing an example configuration of a computer according to an embodiment of the present invention.

BEST MODE FOR CARRYING OUT THE INVENTION

Figure 1:
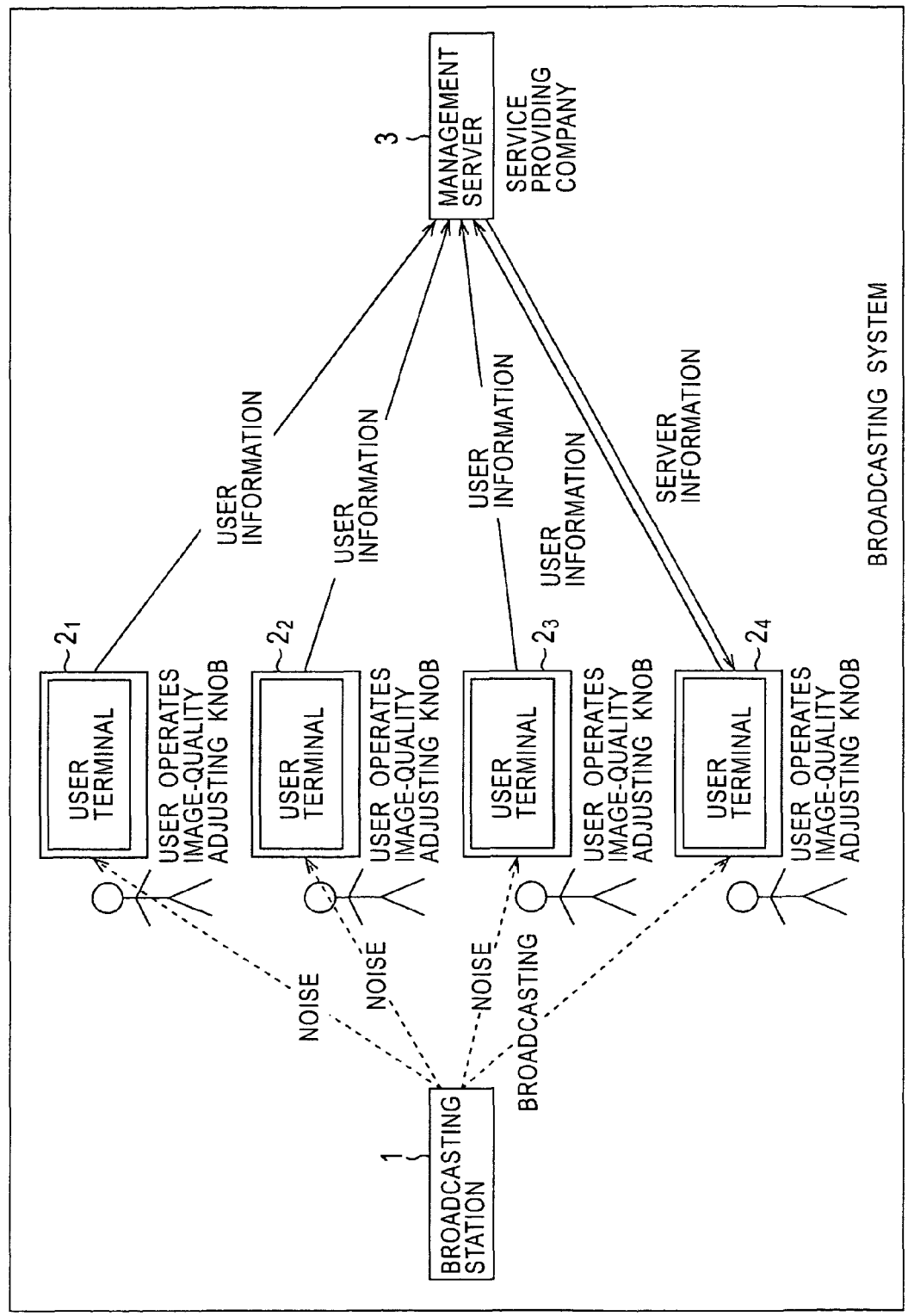
FIG. 1 is a diagram showing an example configuration of a broadcasting system according to an embodiment of the present invention.

FIG. 1 shows an example configuration of a broadcasting system according to an embodiment of the present invention.

A broadcasting station 1, for example, is providing television broadcasting using television broadcasting signals, and radio waves serving as the television broadcasting signals are received by user terminals $2_1$ to $2_4$ owned by individual users.

Although four user terminals $2_1$ to $2_4$ are provided in the embodiment shown in FIG. 1, the number of user terminals is not limited to four, and a plurality of user terminals of an arbitrary number may be provided.

Hereinafter, the user terminals $2_1$ to $2_4$ will each be referred to as a user terminal 2 unless a distinction thereamong is particularly necessary.

At the user terminal 2, processing is executed as needed on a television broadcasting signal received from the broadcasting station 1, whereby an image and a sound corresponding to the television broadcasting signal is displayed and output.

Furthermore, at the user terminal 2, as will be described later, image processing for noise reduction, resolution improvement, etc. is executed. Furthermore, the user terminal 2 is provided with a remote commander 10 shown in FIG. 2, which will be described later, for allowing a user to input a parameter for the image processing. At the user terminal 2, image processing is executed based on the parameter input by the user's operation of the remote commander 10.

The user terminal 2, in addition to executing processing relating to the television broadcasting signal transmitted from the broadcasting station 1 as described above, sends user information including the parameter input by the user to a management server 3 owned by a service providing company via, for example, a public network, the Internet, a CATV network, or other transmission media (not shown).

Furthermore, the user terminal 2 receives server information transmitted from the management server 3 via, for example, a public network, the Internet, a CATV network, a satellite circuit, or other transmission media, sets a parameter for image processing based on information regarding the parameter for image processing, included in the server information, and executes image processing accordingly.

The management server 3 owned by the service providing company receives user information transmitted from a plurality of user terminals 2, and executes statistical processing, thereby obtaining information regarding parameters for setting parameters that allow appropriate image processing to be executed at the user terminals 2 of the individual users. Furthermore, the management server 3 sends server information including the information regarding the parameters to the user terminals 2 via transmission media.

The management server 3, as required, executes charging processes for user information provided from the user terminals 2 to the management server 3 or server information provided from the management server 3 to the user terminals 2.

Figure 2:
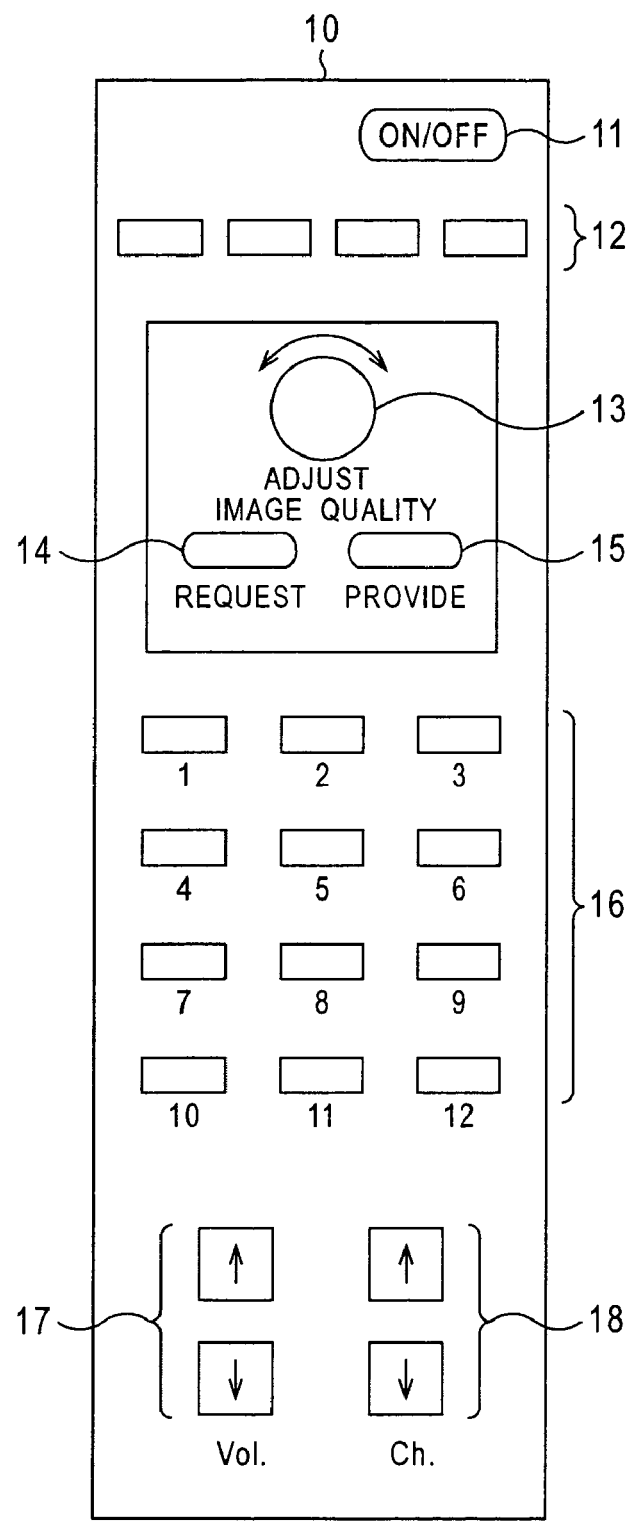
FIG. 2 is a plan view showing an example configuration of a remote commander 10.

FIG. 2 shows an example configuration of the remote commander 10 attached to the user terminal 2.

In a top region of the remote commander 10, a power button 11 is provided. The power button 11 is operated when the power of the user terminal 2 is turned on or off. Below the power button 11, function buttons 12 are provided. The function buttons 12 are operated, for example, when an off timer is set or when what is called a child lock is set.

Below the function buttons 12, an image-quality adjusting knob 13 is provided. The image-quality adjusting knob 13 is operated when a parameter for image processing that is executed at the user terminal 2 is adjusted. Below the image-quality adjusting knob 13, a requesting button 14 and a providing button 15 are provided. The requesting button 14 is operated when requesting server information to the management server 3, and the providing button 15 is operated when providing user information to the management server 3.

Below the requesting button 14 and the management button 15, a set of channel selecting buttons 16 is provided. The set of channel selecting buttons 16 includes a plurality of buttons associated with channels of television broadcasting, a button associated with a channel is operated when directly selecting the channel.

Below the set of channel selecting buttons 16, volume buttons 17 and channel buttons 18 are provided. The volume buttons 17 are operated when increasing or decreasing the volume of a sound that is output from the user terminal 2. The channel buttons 18 are operated when switching the channel of television broadcasting that is received by the user terminal 2.

When the remote commander 10 is operated by the user, the remote commander 10 emits, for example, an infrared ray that serves as an operation signal corresponding to the operation. The infrared ray is received by the user terminal 2, and the user terminal 2 executes processing in accordance with the operation signal received in the form of the infrared ray.

Without limitation to communications using infrared rays, communications between the user terminal 2 and the remote commander 10 may alternatively be based on, for example, Bluetooth (registered trademark).

Figure 3:
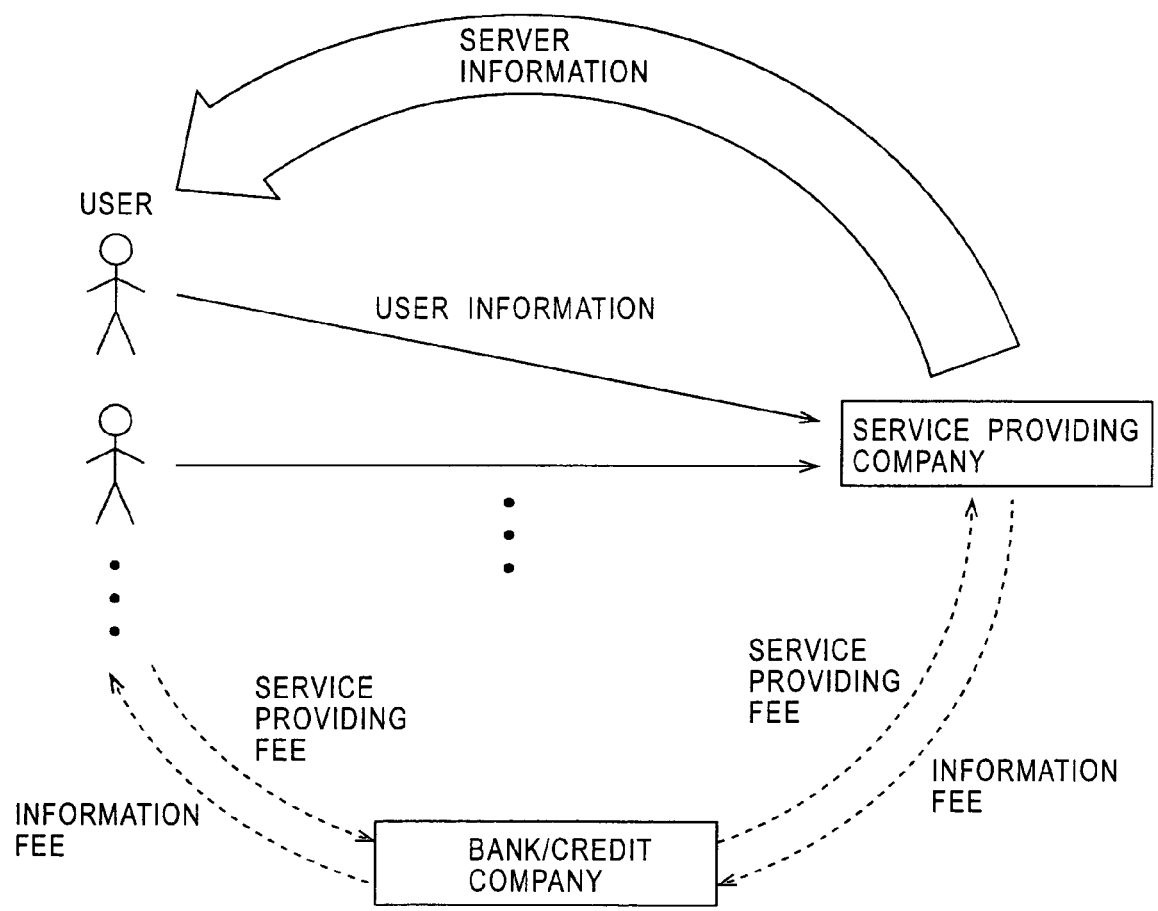
FIG. 3 shows an example of a business model supported by the present invention.

FIG. 3 shows a business model supported by this embodiment.

A user at the user terminal 2, by operating the image-quality adjusting knob 13, sets a parameter that allows appropriate image processing to be executed for the user, and provides user information including the parameter to the service providing company.

The service providing company statistically processes user information provided from individual users, thereby obtaining information regarding parameters for setting parameters that allow appropriate image processing to be executed at the user terminals 2 of the individual users. Furthermore, the service providing company provides the users with server information including the information regarding parameters.

On the user's side, a parameter for image processing is set according to the server information at the user terminal 2.

Thus, at the user terminal 2, a parameter that allows an appropriate image quality to be achieved for the user by image processing is set by receiving the server information without operating the image-quality adjusting knob 13. Thus, image quality is adjusted appropriately without causing a sense of laboriousness for the user. Accordingly, the user wishes to keep using the user terminal 2 because of its convenience. For example, it is expected that when the user purchases a new one, the user will more likely purchase a succeeding product of the user terminal 2. That is, enclosure of users is possible.

Furthermore, the service providing company is allowed to pay information fees as prices for the user information provided by the users via bank accounts of the users at banks. In that case, the users are encouraged to provide user information. Thus, a large amount of user information will be provided to the service providing company, so that more appropriate information regarding parameters for the individual users can be obtained.

Furthermore, the service providing company is allowed to collect service providing fees as prices for the server information provided to the users via accounts of the user at banks or credit companies. In that case, the users are allowed to view images of an appropriate image quality for the users by paying service providing fees without operating the image-quality adjusting knob 13 by themselves. At the same time, the service providing company is allowed to provide server information as a business.

The service providing company may provide server information free of charge or at a cost.

Furthermore, it is possible, for example, to provide server information only or preferentially to users who have paid service providing fees, users who have just purchased and started using the user terminals 2, or users who frequently provide user information.

In this embodiment, user information is provided from the user terminal 2 of the user to the management server 3 of the service providing company via a transmission medium. Alternatively, for example, user information may be provided by recording (storing) the user information on a recording (storage) medium such as a semiconductor memory on the user's side and mailing or otherwise delivering the recording medium. Similarly, server information may be provided from the service providing company to the user terminal 2 by recording the server information on a recording medium and mailing or otherwise delivering the recording medium.

Figure 4:
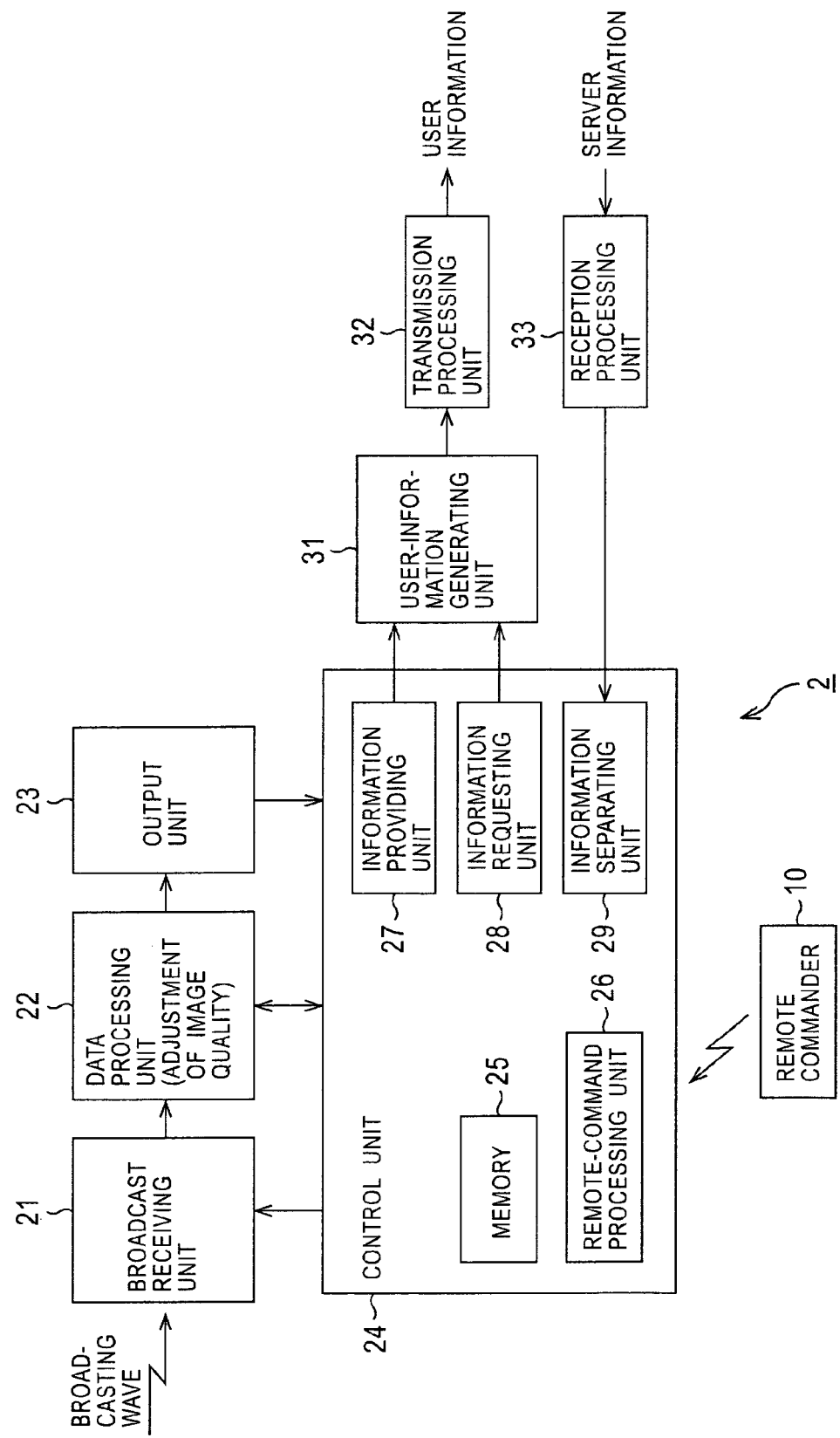
FIG. 4 is a block diagram showing an example configuration of a user terminal 2.

FIG. 4 shows an example configuration of the user terminal 2 shown in FIG. 1.

A broadcast receiving unit 21 receives a television broadcasting signal transmitted from the broadcasting station 1 in the form of a broadcasting wave. Furthermore, the broadcast receiving unit 21 detects a channel specified by a control unit 24 and carries out demodulation, and supplies the resulting baseband image data and audio data to an output unit 23 via a data processing unit 22.

Of the image data and audio data output from the broadcast receiving unit 21, the data processing unit 22, for example, executes image processing on the image data to adjust the image quality thereof, and supplies the result to the output unit 23.

The data processing unit 22 receives from the control unit 24 a parameter that is input by a user's operation of the image-quality adjusting knob 13 of the remote commander 10, and the data processing unit 22 executes image processing based on the parameter. Furthermore, the data processing unit 22 receives from the control unit 24 information regarding a parameter, included in server information transmitted from the management server 3, and the data processing unit 22 executes image processing based on the information regarding parameter.

Furthermore, the data processing unit 22 supplies the parameter input by the user's operation of the image-quality adjusting knob 13 of the remote commander 10 to the control unit 24 as required.

The output unit 23 includes a display implemented by a CRT (cathode ray tube) or a liquid crystal panel, and a speaker (neither shown). The output unit 23 displays and outputs (plays) the image data and audio data supplied via the data processing unit 22.

The control unit 24 includes a memory 25, a remote-command processing unit 26, an information providing unit 27, an information requesting unit 28, and an information separating unit 29, and it controls each block.

More specifically, the memory 25 stores data needed by the control unit 24 to execute various processes. The remote-command processing unit 26 receives an infrared ray serving as an operation signal from the remote commander 10, and executes photoelectric conversion and other processing as required. The information providing unit 27 obtains (generates) information that is needed to provide user information (e.g., a parameter that is set in the data processing unit 22), and supplies the information to a user-information generating unit 31. The information requesting unit 28 obtains information that is needed to request server information, and supplies the information to the user-information generating unit 31. The information separating unit 29 separates information needed from server information that is output from a reception processing unit 33, and stores the information needed in the memory 25.

The control unit 24, when an operation signal specifying selection of a channel is received from the remote commander 10, controls the broadcast receiving unit 21 so that a television broadcasting signal of the channel associated with the operation signal will be detected and demodulated.

Furthermore, the control unit 24, when an operation signal corresponding to an operation of the image-quality adjusting knob 13 is received from the remote commander 10, supplies and sets a parameter associated with the operation signal to the data processing unit 22. In that case, the data processing unit 22 executes image processing based on the parameter set by the control unit 24.

The user-information generating unit 31 generates user information in which information supplied from the information providing unit 27 or the information requesting unit 28 is arranged in a predetermined format, and supplies the user information to a transmission processing unit 32.

The transmission processing unit 32 carries out modulation and other processing as required on the user information supplied from the user-information generating unit 31, and sends the result to the management server 3.

The reception processing unit 33 receives server information transmitted from the management server 3, carries out demodulation and other processing as required, and supplies the result to the information separating unit 29 of the control unit 24.

Next, processing relating to user information and server information, executed at the user terminal 2 shown in FIG. 4, will be described with reference to a flowchart shown in FIG. 5.

First, in step S1, the control unit 24 determines whether the image-quality adjusting knob 13 has been operated by the user. If it is determined in step S1 that the image-quality adjusting knob 13 has been operated by the user, that is, if the remote-command processing unit 26 has received an operation signal corresponding to an operation of the image-quality adjusting knob 13 from the remote commander 10, the procedure proceeds to step S2. In step S2, the control unit 24 supplies and sets a parameter (image-quality adjusting parameter) associated with the operation signal to the data processing unit 22, and the procedure returns to step S1. Thus, in this case, the data processing unit 22 executes image processing (data processing) based on the parameter set in step S2.

On the other hand, if it is determined in step S1 that the image-quality adjusting knob 13 has not been operated by the user, the procedure proceeds to step S3, in which the reception processing unit 33 determines whether server information has been transmitted from the management server 3. If it is determined in step S3 that server information has been transmitted, the reception processing unit 33 receives the server information and supplies the server information to the information separating unit 29. The procedure then proceeds to step S4.

In step S4, the information separating unit 29 separates information relating to a parameter from the server information, and supplies the information to the data processing unit 22. The procedure then returns to step S1. Thus, in the data processing unit 22, a parameter is set according to the information regarding the parameter, included in the server information, and image processing is subsequently executed based on the parameter that has been set.

On the other hand, if it is determined in step S3 that server information has not been received, the procedure proceeds to step S5. In step S5, the control unit 24 executes a requesting determination process (FIG. 6), which will be described later, determining whether or not to request server information to the management server 3.

If it is determined in step S5 that server information is to be requested to the management server 3, the procedure proceeds to step S6. In step S6, the information requesting unit 28 obtains (collects) information that is needed to request server information, and supplies the information to the user-information generating unit 31. The procedure then proceeds to step S7.

The memory 25 stores, for example, a user ID (identification) that is unique to the user terminal 2, and the information requesting unit 28 obtains the user ID, etc. as information that is needed to request server information. Furthermore, the information requesting unit 28 obtains, for example, status information indicating how a parameter that has been set in the data processing unit 22 is used. The status information may be, for example, at least a part of image data being processed in the data processing unit 22, or information indicating content or genre of the image data. The information requesting unit 28 obtains the status information from, for example, the data processing unit 22. The information indicating content of the image data may be, for example, a title (program name) of a program including the image data as content thereof, or a unique ID assigned to the program. The information indicating genre of the program may indicate, for example, whether the program including the image data as content thereof is a news program, a sports program, or a movie program.

In step S7, the user-information generating unit 31 generates user information including the information supplied from the information requesting unit 28, and assigns a requesting flag in the user information. The requesting flag is, for example, a one-bit flag indicating whether or not to request server information, and is set to 0 or 1, for example, 1 when requesting server information.

The user-information generating unit 31, having generated user information in step S7, supplies the user information to the transmission processing unit 32, and the procedure proceeds to step S8. In step S8, the transmission processing unit 32 sends the user information from the user-information generating unit 31 to the management server 3, and the procedure returns to step S1.

The management server 3, when user information with the requesting flag set to 1 as described above is received from the user terminal 2, sends server information to the user terminal 2, as will be described later.

If it is determined in step S5 that server information is not to be requested to the management server 3, the procedure proceeds to step S9. In step S9, the control unit 24 executes a providing determination process (FIG. 7), which will be described later, determining whether or not to provide user information to the management server 3.

If it is determined in step S9 that user information is to be provided to the management server 3, the procedure returns to step S1, and then the same procedure is repeated.

On the other hand, if it is determined in step S9 that user information is to be provided to the management server 3, the procedure proceeds to step S10. In step S10, the information providing unit 27 obtains (collects) information that is needed to provide user information, and supplies the information to the user-information generating unit 31. The procedure then proceeds to step S11.

That is, the information providing unit 27 obtains a user ID and status information as information that is needed to provide user information. The information providing unit 27 also obtains from the data processing unit 22 a parameter that is set therein, etc. as information that is needed to provide user information.

In step S11, the user-information generating unit 31 generates user information including the information supplied from the information providing unit 27, and assigns a providing flag in the user information. The providing flag is, for example, a one-bit flag indicating whether or not user information is to be provided, and is set to 0 or 1, for example, 1 when user information is to be provided.

The user-information generating unit 31, having generated user information in step S11, supplies the user information to the transmission processing unit 32, and the procedure proceeds to step S8. In step S8, the transmission processing unit 32 sends the user information from the user-information generating unit 31 to the management server 3, and the procedure returns to step S1.

Next, the requesting determination process for determining whether or not to request server information, executed in step S5 shown in FIG. 5, will be described with reference to a flowchart shown in FIG. 6.

In the request determination process, first, in step S21, the control unit 24 determines whether the requesting button 14 of the remote commander 10 has been operated by the user.

If it is determined in step S21 that the requesting button 14 has not been operated, the procedure proceeds to step S22. In step S22, the control unit 24 determines whether the value of a timer that is not shown has become larger than (or larger than or equal to) a predetermined threshold value.

The timer is reset to, for example, 0 in step S24, which will be described later, when the requesting flag is set to a value indicating that server information is to be requested, for example, 1. As described earlier, server information is requested from the user terminal 2 to the management server 3 when the requesting flag is set to 1. Thus, whether the value of the timer is larger than the predetermined threshold value is equivalent to whether a time corresponding to the predetermined threshold value has elapsed since the last request for server information.

If it is determined in step S22 that the value of the timer has not become larger than the predetermined threshold value, that is, if the requesting button 14 has not been operated and if a time corresponding to the predetermined threshold value has not been elapsed since the last request for server information, the procedure proceeds to step S23. In step S23, the control unit 24 sets a value indicating that server information is not to be requested, for example, 0, to the requesting flag. The procedure then returns.

Figure 5:
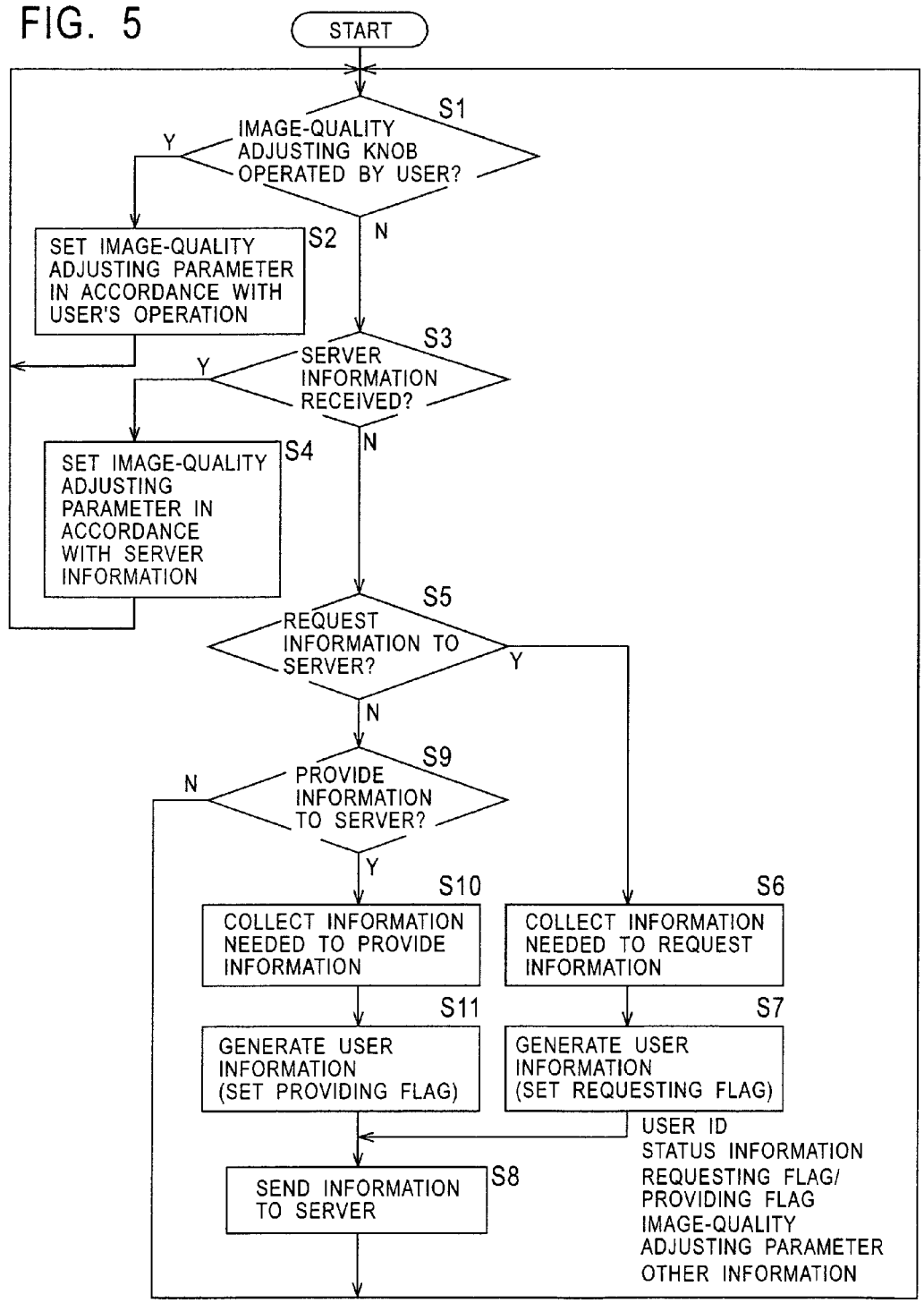
FIG. 5 is a flowchart showing processing that is executed by the user terminal 2.

When the requesting flag indicates 0, it is determined in step S5 shown in FIG. 5 that server information is not to be requested.

If it is determined in step S21 that the requesting button 14 has been operated, that is, if the requesting button 14 has been operated by the user and an operation signal corresponding to the operation has been received by the remote-command processing unit 26, the procedure proceeds to step S24. In step S24, the control unit 24 resets the timer, and the procedure proceeds to step S25. In step S25, the control unit 24 sets a value indicating that server information is to be requested, for example, 1, to the requesting flag. The procedure then returns.

When the requesting flag indicates 1, it is determined in step S5 shown in FIG. 5 that server information is to be requested.

If it is determined in step S22 that the value of the timer has become larger than the predetermined threshold value, that is, if a time corresponding to the predetermined threshold value has elapsed since the last request for server information, the procedure sequentially goes through steps S24 and S25. Then, the processes described above are executed, and the procedure returns. Thus, as well as in the case where the requesting button 14 has been operated, it is also determined in step S5 shown in FIG. 5 that server information is to be requested when a time corresponding to the predetermined threshold value has elapsed since the last request for server information.

Figure 6:
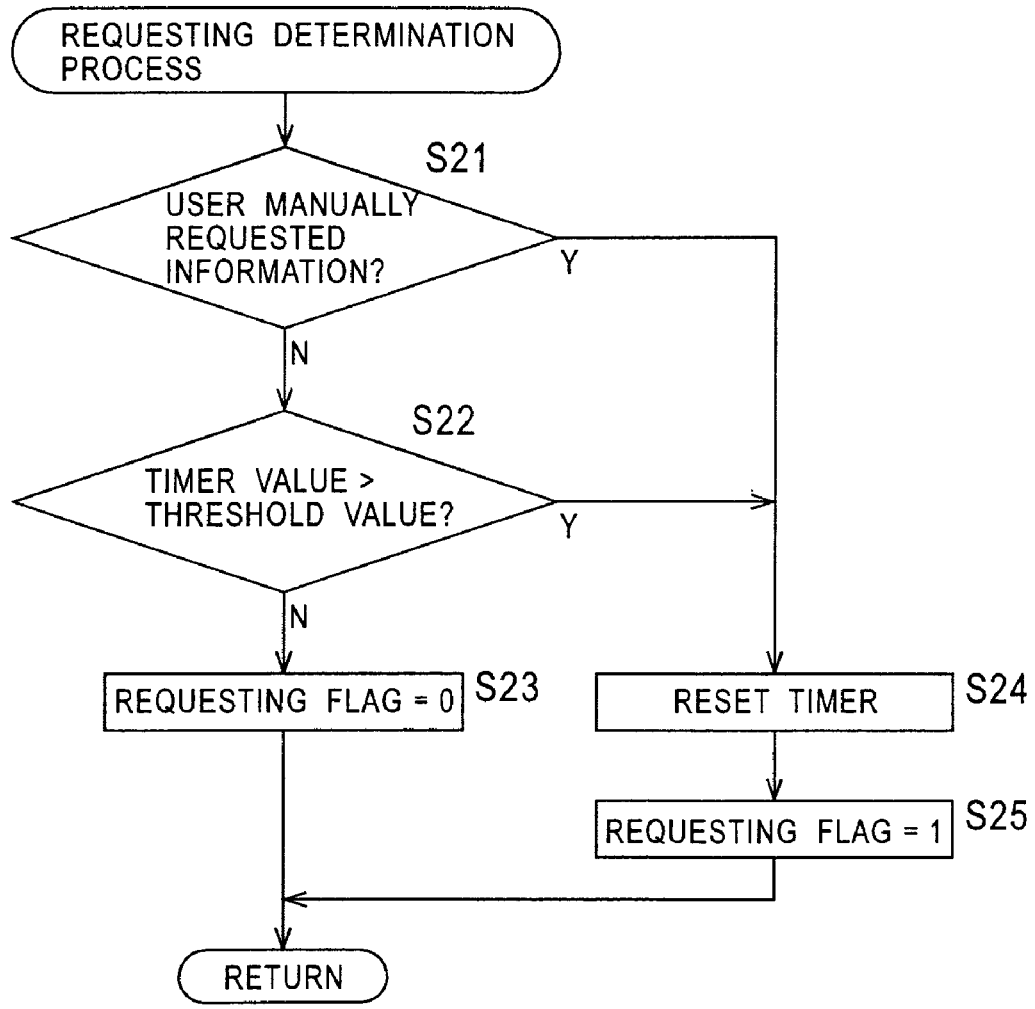
FIG. 6 is a flowchart showing in detail processing that is executed in step S5.

In the embodiment shown in FIG. 6, server information is requested when the requesting button 14 has been operated and when a predetermined time has elapsed since the last request for server information. Alternatively, server information may be requested, for example, only when the requesting button 14 has been operated, or only when a predetermined time has elapsed since the last request for server information. Furthermore, server information may be sent from the management server 3 regularly or irregularly instead of being requested by the user terminal 2.

Next, the providing determination process for determining whether or not to provide user information, executed in step S9 shown in FIG. 5, will be described with reference to a flowchart shown in FIG. 7.

In the providing determination process, first, in step S31, the control unit 24 determines whether the providing button 15 of the remote commander 10 has been operated by the user.

If it is determined in step S31 that the providing button 15 has not been operated, the procedure proceeds to step S32. In step S32, the control unit 24 sets a value indicating that user information is not to be provided, for example, 0, to the providing flag. The procedure then returns.

When the providing flag indicates 0, it is determined in step S9 shown in FIG. 5 that user information is not to be provided.

On the other hand, if it is determined in step S31 that the providing button 15 has been operated, that is, if the providing button 15 has been operated by the user and if an operation signal corresponding to the operation has been received by the remote-command processing unit 26, the procedure proceeds to step S33. In step S33, the control unit 24 sets a value indicating that user information is to be provided, for example, 1, to the providing flag. The procedure then returns.

When the providing flag indicates 1, it is determined in step S9 shown in FIG. 5 that user information is to be provided.

Figure 7:
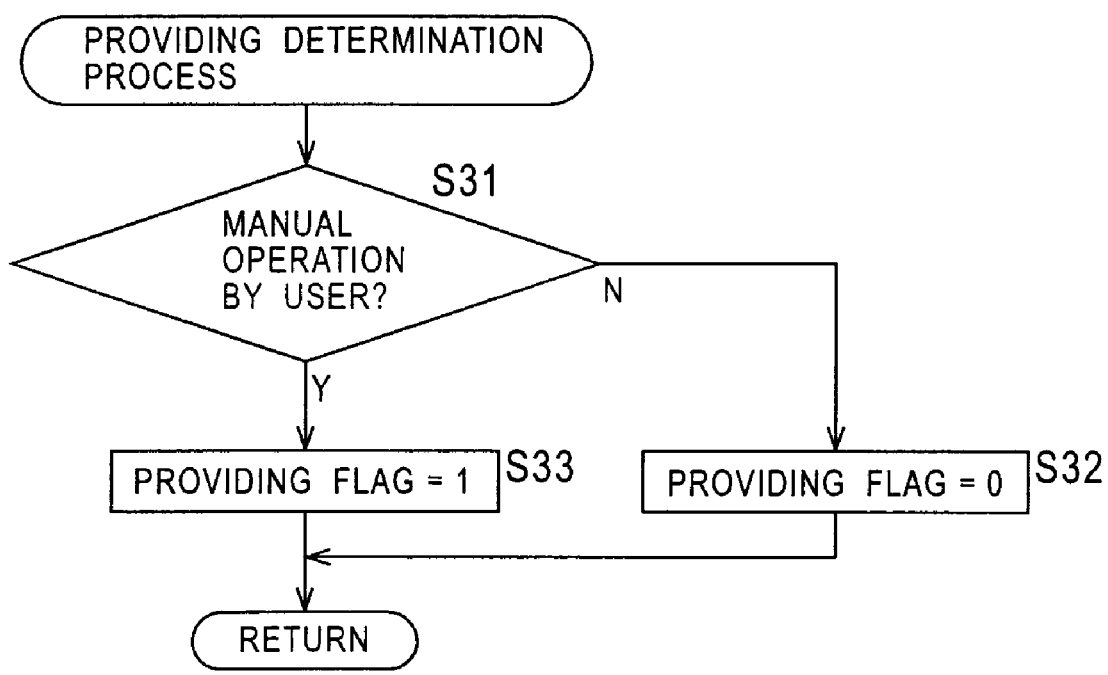
FIG. 7 is a flowchart showing in detail processing that is executed in step S9.

In the embodiment shown in FIG. 7, user information is provided when the providing button 15 has been operated. Alternatively, user information may be provided, for example, when a parameter that allows an image of a desired image quality to be obtained by image processing (appropriate parameter) is set by a user's operation of the image-quality adjusting knob 13. In that case, the user usually operates the image-quality adjusting knob 13 while checking the image quality of an image displayed by the output unit 23. Thus, for example, when the image-quality adjusting knob 13 is continuously operated for a predetermined period of time and the operation is then stopped, a parameter at the time when the operation of the image-quality adjusting knob 13 is stopped can be considered as an appropriate parameter for the user.

Figure 8:
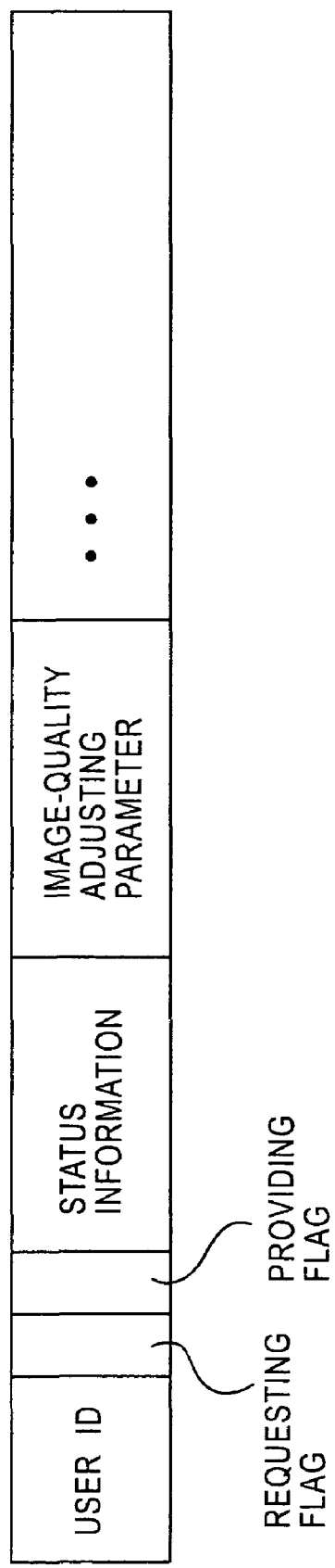
FIG. 8 is a diagram showing a format of user information.

FIG. 8 shows the format of the user information generated by the user-information generating unit 31.

In the embodiment shown in FIG. 8, the user information includes, from the beginning thereof, a user ID, a requesting flag, a providing flag, status information, a parameters, etc., in that order.

Figure 9:
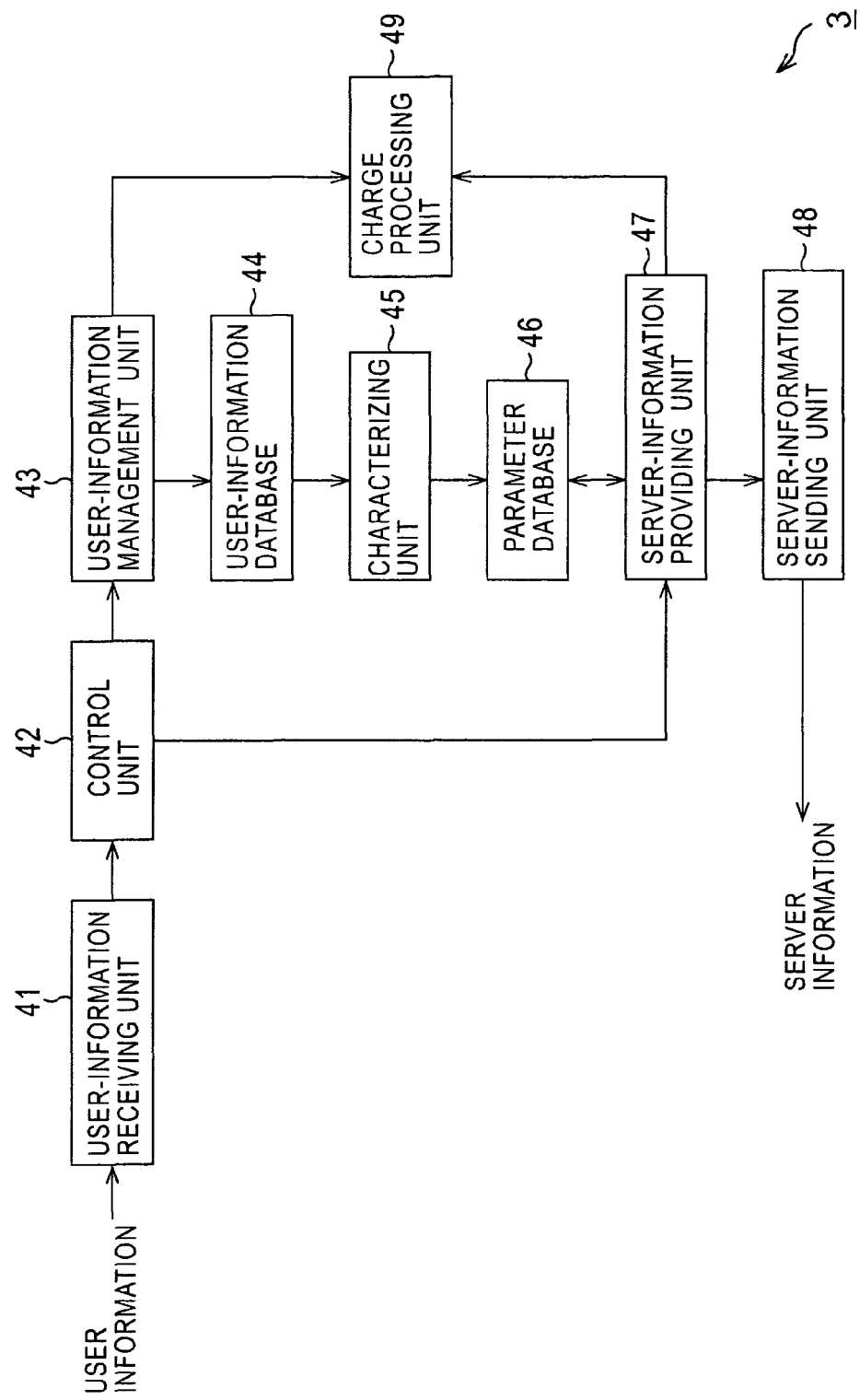
FIG. 9 is a block diagram showing an example configuration of a management server 3.

FIG. 9 shows an example configuration of the management server 3 shown in FIG. 1.

A user-information receiving unit 41 receives user information transmitted from the user terminal 2, executes demodulation and other processing as required, and supplies the result to a control unit 42.

The control unit 42 refers to the user information supplied from the user-information receiving unit 41, and supplies the user information to a user-information management unit 43 or a server-information providing unit 47. More specifically, the control unit 42 supplies the user information to the user-information management unit 43 when the providing flag-of the user information indicates 1, while supplying the user information to the server-information providing unit 47 when the requesting flag of the user information indicates 1.

The user-information management unit 43 registers and manages the user information with the providing flag indicating 1, supplied from the control unit 42, in a user-information database 44. More specifically, the user-information management unit 43 extracts a user ID, status information, and a parameter from the user information, carries out predetermined classification, and registers the information in the user-information database 44 accordingly.

The user-information database 44 stores the information supplied from the user-information management unit 43.

A characterizing unit 45 obtains feature information that characterizes the parameter stored in the user-information database 44 from the status information also stored in the user-information database 44, and statistically processes parameters characterized by the feature information, thereby associating the feature information with information regarding the parameters. Furthermore, the characterizing unit 45 supplies the set of feature information and the information regarding the parameters associated therewith (hereinafter referred to as parameter-related information when appropriate) to a parameter database 46.

The parameter database 46 stores the parameter-related information supplied from the characterizing unit 45.

The server-information providing unit 47, upon receiving user information with the requesting flag indicating 1, i.e., user information for requesting server information, searches for and reads parameter-related information from the parameter database 46. Furthermore, the server-information providing unit 47 generates server information including the parameter-related information read from the parameter database 46, and supplies the server information to a server-information sending unit 48.

The server-information sending unit 48 executes modulation and other processing as required on the server information supplied from the server-information providing unit 47, and sends the result to the user terminal 2 of a user identified by a user ID included in the user information with the requesting flag indicating 1 (the user terminal 2 from which the user information has been transmitted).

A charge processing unit 49 monitors the user-information management unit 43 and the server-information providing unit 47, and executes, as required, a charging process for paying an information fee and collecting a service providing fee as described with reference to FIG. 3. More specifically, for example, if the user ID, status information, and parameter extracted from the user information are registered in the user-information database 44 by the user-information management unit 43, the charge processing unit 49 increments by one a variable for counting the number of times user information has been provided by a user identified by the user ID (hereinafter referred to as a providing-count variable when appropriate). The charge processing unit 49 calculates a sum for each user by multiplying a unit price for provided user information by the providing-count variable, regularly such as monthly or irregularly, transfers the sum to a bank account of the user as an information fee, and resets the providing-count variable to 0. Furthermore, for example, when server information to be provided to the user terminal 2 of a user from which user information has been transmitted is generated by the server-information providing unit 47, the charge processing unit 49 increments by one a variable for counting the number of times that server information has been requested by the user to whom the server information is provided (identified by a user ID included in the user information) (hereinafter referred to as a request-counting variable when appropriate). The charge processing unit 49 calculates a sum for each user by multiplying a unit price for provided server information by the request-count variable, regularly such as monthly or irregularly, withdraws the sum from a bank account or credit-company account of the user as a service providing fee, and resets the request-counting variable to 0.

The charging process executed by the charge processing unit 49 requires information such as a bank account number or a credit card number of the user. It is to be assumed that this information is provided in advance form the user to the service providing company that owns the management server 3 in some way.

Although a service providing fee that is proportional to the number of times of request is collected from the user in the example described above, alternatively, for example, the service providing fee may be a fixed sum. Yet alternatively, the service providing fee and the information fee may be variable in accordance with, for example, the period or frequency of usage of the management server 3 by the user.

Next, processing that is executed by the management server 3 shown in FIG. 9 will be described with reference to a flowchart shown in FIG. 10.

First, in step S41, the user-information receiving unit 41 determines whether user information has been transmitted from the user terminal 2. If it is determined that user information has not been transmitted, the procedure returns to step S41.

On the other hand, if It is determined in step S41 that user information has been transmitted, the user-information processing unit 41 receives the user information and supplies the user information to the control unit 42. The procedure then proceeds to step S42.

In step S42, the control unit 42 refers to the user information supplied from the user-information receiving unit 41 to determine which of the providing flag and the requesting flag indicates 1.

If it is determined in step S42 that the providing flag of the user information indicates 1, the control unit 42 supplies the user information to the user-information management unit 43. The procedure then proceeds to step S43.

In step S43, the user-information management unit 43 extracts a user ID, status information, and a parameter from the user information with the providing flag indicating 1, supplied from the control unit 42, executes predetermined classification, and supplies the information to the user-information database 44 for registration, thereby updating the user-information database 44. The procedure then proceeds to step S44, in which the charge processing unit 49 executes a charging process for paying an information fee as a price for the user information provided by the user. The procedure then proceeds to step S45.

In step S45, the characterizing unit 45 obtains feature information that characterizes the parameter stored in the user-information database 44 from the status information also stored in the user-information database 44, and statistically processes parameters characterized by the feature information, thereby associating the feature information with information regarding the parameters. The procedure then proceeds to step S46.

In step S46, the characterizing unit 45 updates the content stored in the parameter database 46 with the parameter-related information including a set of the feature information and the information regarding the parameters associated therewith. The procedure then returns to step S41.

If it is determined in step S42 that the requesting flag of the user information is set to 1, the control unit 42 supplies the user information to the server-information providing unit 47. The procedure then proceeds to step S47.

In step S47, the server-information providing unit 47, as required, searches the parameter database 46 for parameter-related information that is suitable for the user information supplied from the control unit 42. Furthermore, the server-information providing unit 47 reads the parameter-related information from the parameter database 46, and generates server information including the parameter-related information. Furthermore, the server-information providing unit 47 supplies the server information to the server-information sending unit 48. The procedure then proceeds to step S48.

In step S48, the server-information sending unit 48 executes modulation and other processing as required on the server information supplied from the server-information providing unit 47, and sends the result to the user terminal 2 of a user identified by a user ID included in the user information supplied from the control unit 42. The procedure then returns to step S41.

Figure 11:
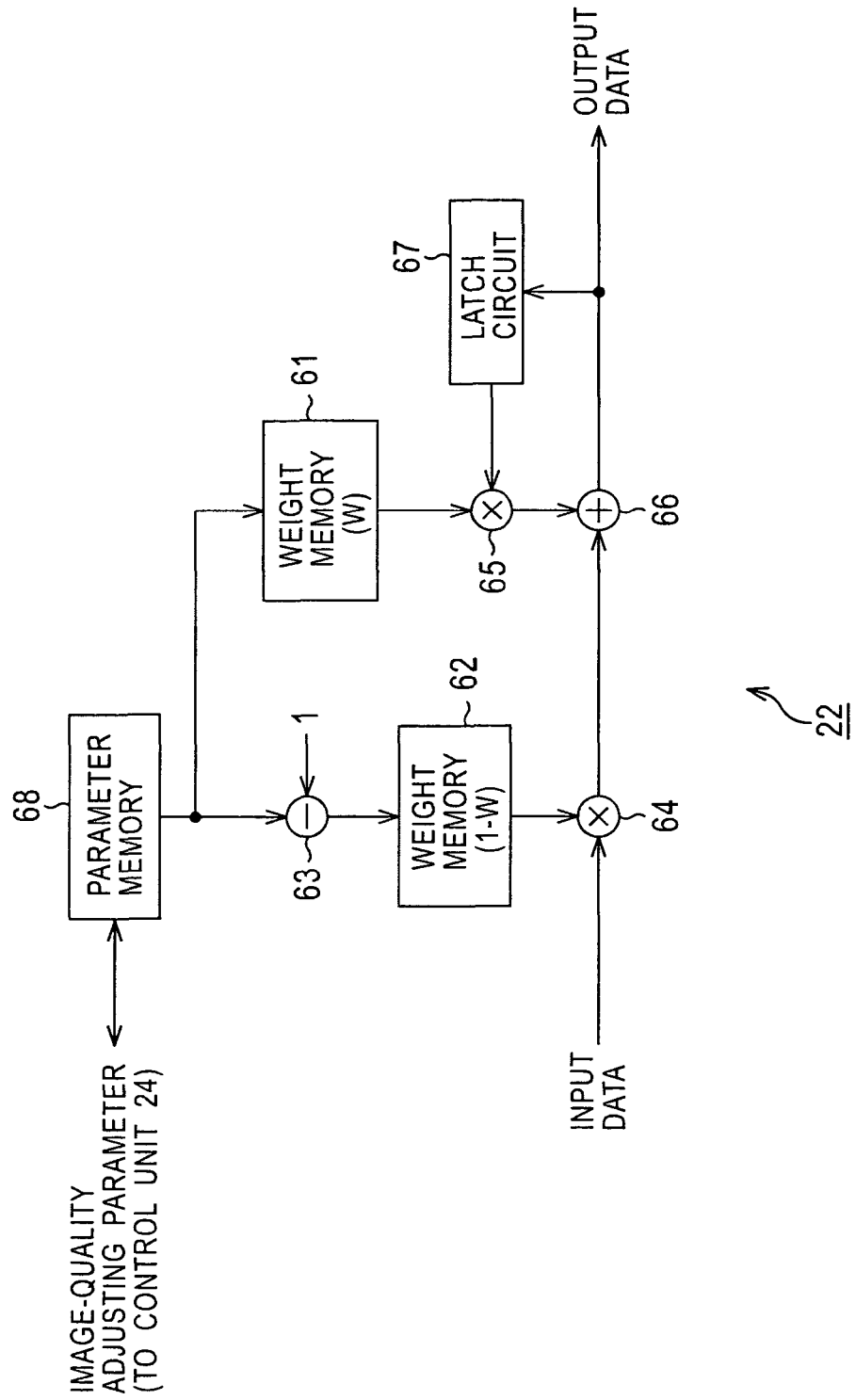
FIG. 11 is a block diagram showing a first example configuration of a data processing unit 22.

FIG. 11 shows an example configuration of the data processing unit 22 shown in FIG. 4 in a case where noise in image data supplied from the broadcast receiving unit 21 is to be removed.

A weight memory 61 stores a weight (coefficient) W (e.g., a value in a range of 0 to 1) that serves as a parameter, supplied from a parameter memory 68, which will be described later. A weight memory 62 stores a weight 1−W supplied from a calculator 63.

The calculator 63 subtracts the weight W supplied from the parameter memory 68 from 1.0, and supplies the result of subtraction 1−W to the weight memory 62 as a weight. A calculator 64, as input data, multiplies (the pixel values of pixels constituting) image data supplied from the broadcast receiving unit 21 by the weight 1−W stored in the weight memory 62, and supplies the result of multiplication to a calculator 66. A calculator 65 multiplies (the pixel values of pixels constituting) image data stored (latched) in a latch circuit 67 as output data by the weight W stored in the weight memory 61, and supplies the result of multiplication to the calculator 66. The calculator 66 adds together the respective outputs of the calculators 64 and 65, and outputs the result of addition as output data.

The latch circuit 67 has a storage capacity that allows storage of at least one frame of image data. The latch circuit 67 latches the image data output from the calculator 66 as output data, for example, over a time corresponding to one frame, and then supplies the image data to the calculator 65. Thus, when image data of a pixel at a position (x1, y1) of a frame t is supplied to the calculator 64 as input data, the latch circuit 67 supplies to the calculator 65 image data of a pixel at the same position (x1, y1) in a frame t-1 that is one frame previous to the frame f.

Hereinafter, when appropriate, image data of a pixel at a position (x1, y1) of a frame t supplied as input data will be denoted as x(t). In this case, pixel data of a pixel at a position (x1, y1) of a frame t-1 supplied as input data is denoted as x(t-1), and image data that is output by the calculator 66 as output data corresponding to the input data x(t-1) will be denoted as y(t-1).

The parameter memory 68 stores a parameter supplied from the control unit 24. In the embodiment shown in FIG. 11, a parameter is set in the data processing unit 22 by storing the parameter in the parameter memory 68.

Figure 12:
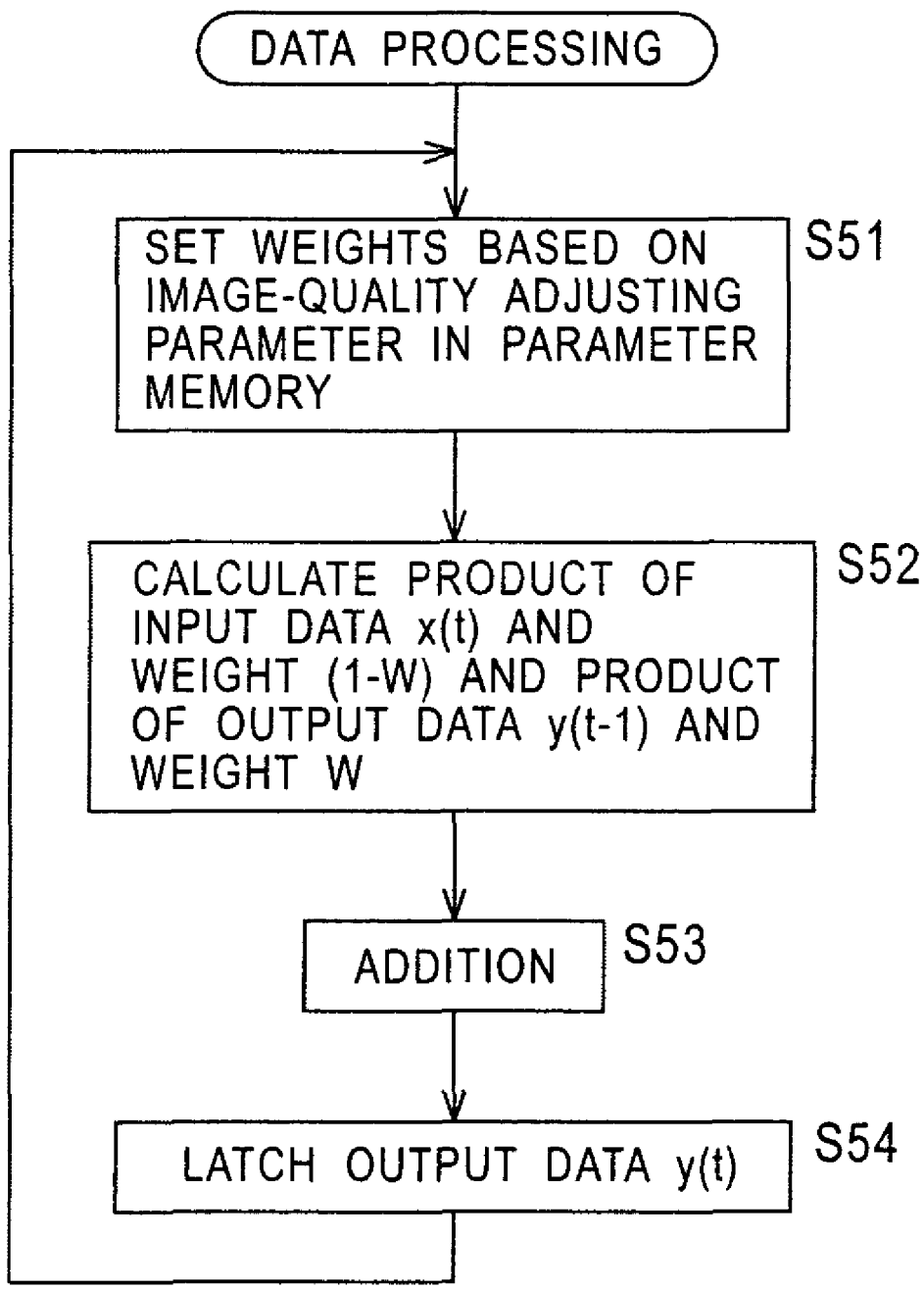
FIG. 12 is a flowchart showing processing that is executed by the data processing unit 22.

Next, processing that is executed by the data processing unit 22 shown in FIG. 11 will be described with reference to a flowchart shown in FIG. 12.

In the data processing unit 22 shown in FIG. 11, assuming that input data is image data in which time-varying noise is superposed on a constant true value, the time-varying noise is removed by calculating a weighted average of the input data.

First, in step S51, weights are set in the weight memories 61 and 62 based on the parameter stored in the parameter memory 68. More specifically, in step S51, the weight memory 61 reads the parameter stored in the parameter memory 68, and stores the parameter as it is as a weight W (overwrites). Furthermore, in step S51, the calculator 63 reads the weight W stored in the parameter memory 68 as a parameter, and subtracts the weight W from 1.0 to obtain a result of subtraction 1−W. Then, the calculator 63 supplies the result of subtraction 1−W to the weight memory 62 and stores it therein (overwrites). The procedure then proceeds to step S52.

In step S52, the calculator 64, upon receiving image data x(t) as image data, multiplies the input data x(t) by the weight 1−W stored in the weight memory 62, and supplies the result to the calculator 66. Furthermore, in step S52, the calculator 65 multiplies image data y(t-1), i.e., output data of an immediately previous frame, latched in the latch circuit 67, by the weight W stored in the weight memory 61, and supplies the result to the calculator 66.

The procedure then proceeds to step S53. In step S53, the calculator 66 adds together the result of multiplication of the input data x(t) by the weight 1−W and the result of multiplication of the output data y(t-1) by the weight W, thereby calculating a weighted sum (1−W)x(t)+Wy(t-1) of the input data x(t) and the output data y(t-1), and outputs it as output data y(t) corresponding to the input data x(t). The output data y(t) is also supplied to the latch circuit 67, and in step S54, the latch circuit 67 stores the output data y(t) by overwriting the output data y(t-1) of the immediately previous frame therewith. The procedure then returns to step S51, and when next input data is supplied, the same procedure is repeated.

Next, processes for collecting information, executed in steps S6 and S10 shown in FIG. 5 in a case where the data processing unit 22 of the user terminal 2 (FIG. 4) is configured as shown in FIG. 11 will be described in detail with reference to flowcharts shown in FIGS. 13A and 13B.

Figure 13A:
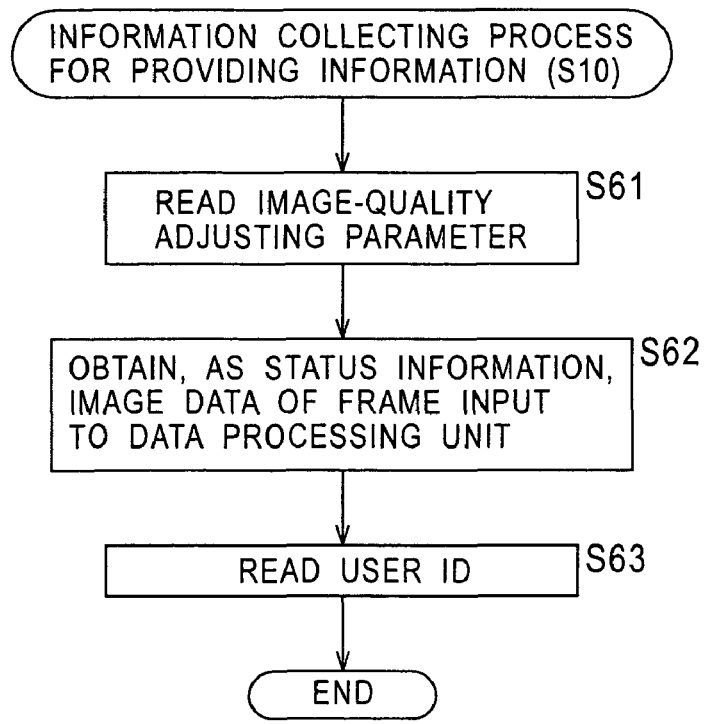
FIG. 13A is a flowchart showing in detail processing that is executed in step S10.

In the collecting process in a case where user information is to be provided, shown in step S10, referring to FIG. 13A, first, in step S61, the information providing unit 27 (FIG. 4) reads a parameter (a weight W herein) that is set in the parameter memory 68 (FIG. 11). The procedure then proceeds to step S62.

In step S62, the information providing unit 27 reads image data of a frame that is currently being input to the data processing unit 22 from the broadcast receiving unit 21 or the data processing unit 22, obtaining the image data as status information. The procedure then proceeds to step S63.

In step S62, the information providing unit 27 obtains, in addition to the image data, information for identifying a scene of the image data (hereinafter referred to as scene information when appropriate), for example, information indicating which frame of which program the frame of the image data belongs to, as status information.

If the broadcasting station 1 is carrying out television broadcasting with information indicating a program name or an index of a frame superposed in a vertical blanking period of a television broadcasting signal, the information can be used as scene information. Alternatively, for example, a channel and a time and date of broadcast of a frame of image data serving as status information can be used as scene information.

In step S63, the information providing unit 27 reads a user ID from the memory 25 (FIG. 4). The procedure is then exited.

In step S11 shown in FIG. 5, a providing flag is attached to the user ID, the parameter, and the frame of image data serving as status information, collected, as described above, whereby user information is generated.

The collecting process shown in FIG. 13A is executed when the requesting flag is set to 1 in the requesting determination process shown in FIG. 6. In the embodiment shown in FIG. 6, the requesting flag is set to 1 when a parameter is set by a user's operation of the image-quality adjusting knob 13 or a predetermined time has elapsed since the last time when user information was provided. Thus, the collecting process shown in FIG. 13A is executed when a parameter is set by a user's operation of the image-quality adjusting knob 13 or a predetermined time has elapsed since the last time when user information was provided. The status information may include information indicating which of these cases is relevant.

Figure 13B:
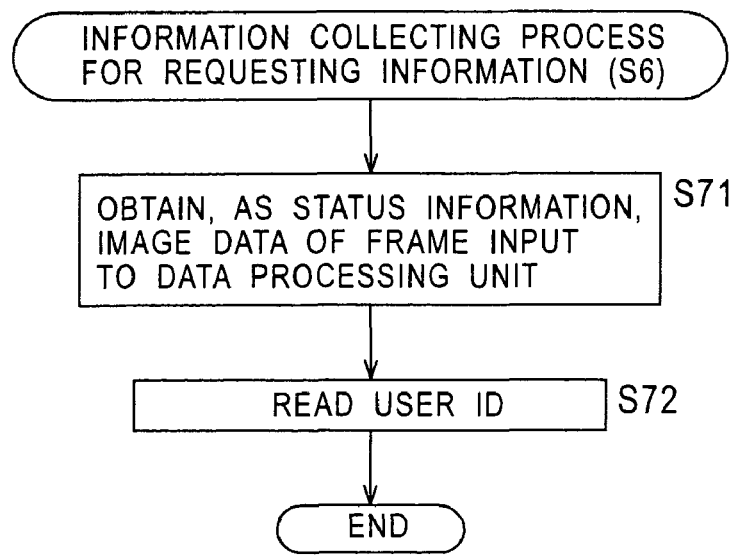
FIG. 13B is a flowchart showing in detail processing that is executed in step S6.

In the collecting process in step S6 for requesting server information, referring to FIG. 13B, first, in step S71, similarly to step S62 shown in FIG. 13A, the information requesting unit 28 (FIG. 4) reads a frame of image data that is currently being input to the data processing unit 22 from the broadcast receiving unit 21 or the data processing unit 22, obtaining the image data as status information. The procedure then proceeds to step S72. In step S71, similarly to step S62 shown in FIG. 13A, the information requesting unit 28 obtains scene information relating to the image data serving as status information, and includes the scene information in the status information.

In step S72, the information requesting unit 28 reads a user ID from the memory 25 (FIG. 4). The procedure is then exited.

In step S7 shown in FIG. 5, a requesting flag is attached to the user ID and the frame of image data serving as status information, collected as described above, whereby user information is generated.

Next, a process of updating the user-information database 44 by the user-information management unit 43 of the management server 3 (FIG. 9) in step S43 shown in FIG. 10 in a case where the data processing unit 22 of the user terminal 2 (FIG. 4) is configured as shown in FIG. 11 will be described in detail with reference to a flowchart shown in FIG. 14.

First, in step S81, the user-information management unit 43 searches the user-information database 44 for image data of the same scene as the image data included in the status information separated from the user information supplied from the control unit 42.

More specifically, as described with reference to FIGS. 13A and 13B, the status information includes a frame of image data and scene information relating to the image data, and the user-information management unit 43 searches for a directory of the user-information database 44 (or a record or other segment of storage area) where scene information that is the same as the scene information in the user information supplied from the control unit 42 is registered.

The procedure then proceeds to step S82. In step S82, the user-information management unit 43, based on the result of the search in step S81, determines whether image data of the same scene as the image data included in the status information separated from the user information supplied from the control unit 42 has been registered in the user-information database 44.

If it is determined in step S82 that image data of the same scene as the image data included in the status information separated from the user information supplied from the control unit 42 has been registered in the user-information database 44, that is, if scene information that is the same as the scene information in the user information supplied from the control unit 42 has been registered in a directory of the user-information database 44, the procedure proceeds to step S83. In step S83, the user-information management unit 43 additionally registers the user ID, the parameter (weight W herein), and the status information in the user information supplied from the control unit 42 in that directory. The procedure is then exited.

On the other hand, if it is determined in step S82 that image data of the same scene as the image data included in the status information separated from the user information supplied from the control unit 42 has not been registered in the user-information database 44, that is, if scene information that is the same as the scene information in the user information supplied from the control unit 42 has not been registered in any directory of the user-information database 44, the procedure proceeds to step S84. In step S84, the user-information management unit 43 adds a directory that serves as a new storage area to the user-information database 44, and registers the user ID, the parameter, and the status information in the user information supplied from the control unit 42 in that directory. The procedure is then exited.

Figure 14:
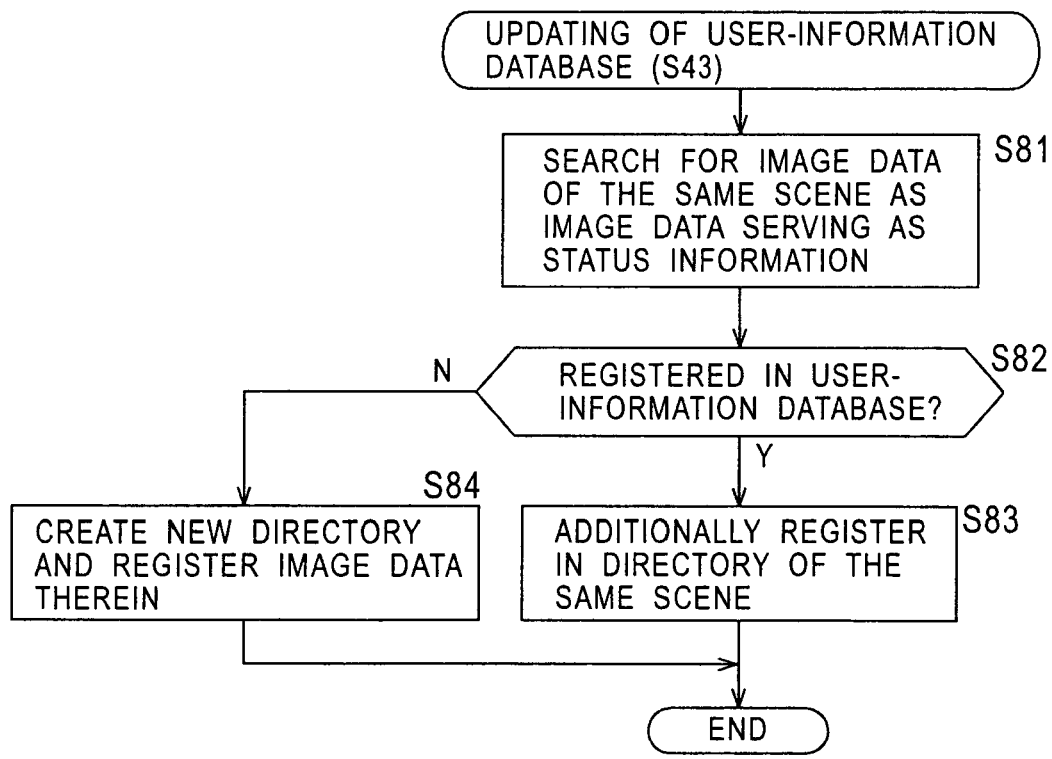
FIG. 14 is a flowchart showing in detail processing that is executed in step S43.

According to the process of updating of the user-information database 44, shown in FIG. 14, a user ID, a parameter, and status information in user information are classified on the basis of a scene included in the status information, and registered in the user-information database 44 accordingly.

It has been described that a user ID, a parameter, and status information are classified only on the basis of scene. Alternatively, for example, users with similar history of input parameters may be detected, carrying out classification on the basis of scene and on the basis of users with similar history of input parameters.

Next, processing that is executed by the characterizing unit 45 of the management server 3 (FIG. 9) in step S45 shown in FIG. 10 in a case where the data processing unit 22 of the user terminal 2 (FIG. 4) is configured as shown in FIG. 11 will be described in detail with reference to a flowchart shown in FIG. 15.

First, in step S91, the characterizing unit 45 obtains true values of image data of each scene stored in the user-information database 44.

More specifically, at the user terminal 2, a television broadcasting signal from the broadcasting station 1 (FIG. 1) is received and image data included in the television broadcasting signal is displayed. On the image data, a noise is superposed during broadcasting of the television broadcasting signal. The user-information database 44 stores image data of each scene, with noise superposed thereon as described above, as classified on the basis of scene. Furthermore, assuming that noise superposed on a plurality of frames of image data of the same scene has a Gaussian distribution (this assumption is generally acceptable), true values of image data of the scene (pixel values approximate to true values) can be obtained by summing corresponding pixels of the image data of the plurality of frames of the same scene.

Thus, the characterizing unit 45, in step S91, reads image data of the same scene, registered in each directory, from the user-information database 44, and calculates an average value thereof, thereby obtaining true values of image data of each scene.

In step S91, alternatively, for example, true values of image data may be obtained directly from the broadcasting station 1. Furthermore, in the embodiment shown in FIG. 1, the broadcasting station 1 is allowed to act as the service providing company that owns the management server 3. In that case, the management server 3 is allowed to readily obtain true values of image data. Hereinafter, for simplicity, it will be assumed that true values of image data are obtained directly from, for example, the broadcasting station 1.

When true values of image data of each scene have been obtained in step S91, the procedure proceeds to step S92. In step S92, the characterizing unit 45 calculates, using the true values of image data of each scene, the amount of noise superposed on image data of each scene registered in the user-information database 44.

That is, the characterizing unit 45 reads image data of each scene registered in the user-information database 44, and subtracts the true values of the image data of the scene therefrom, thereby calculating the amount of noise on the image data of each scene.

The amount of noise is represented, for example, by an S/N ratio based on variance of each pixel value of a difference image obtained by subtracting the true pixel values image data from the pixel values of corresponding pixels of the image data registered in the user-information database 44, or the total of high-frequency components of the difference image.

Figure 16:
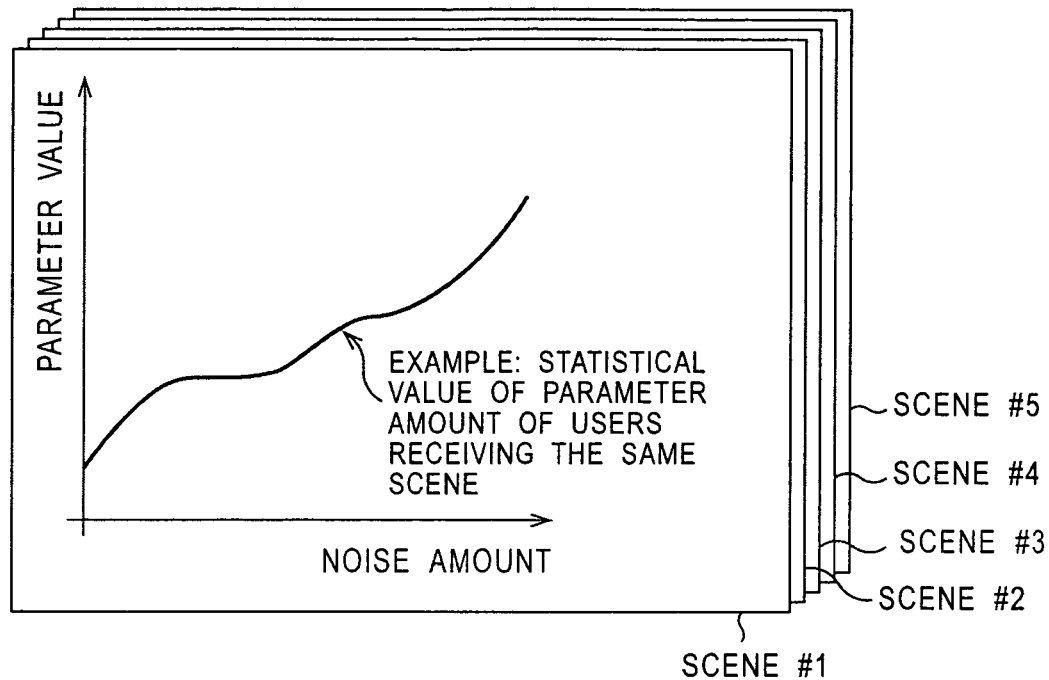
FIG. 16 is a diagram for explaining processing that is executed in step S93.

When the amount of noise in the image data has been obtained in step S92, the procedure proceeds to step S93. In step S93, the characterizing unit 45, using the amount of noise of each image data registered in the user-information database 44 as feature information that characterizes a parameter with which the image data is associated as status information, derives a relationship between the parameter and the amount of noise serving as feature information, for example, as shown in FIG. 16. The relationship between the amount of noise and the parameter represents a value that have been set by individual users as an optimal parameter (weight W herein) for image data for each scene with an amount of noise superposed thereon.

The procedure then proceeds to step S94. In step S94, the characterizing unit 45 statistically processes the relationships between the amount of noise and parameter for each scene, obtained in step S93, thereby obtaining an optimal parameter for the amount of noise serving as feature information. The procedure is then exited.

More specifically, for example, the characterizing unit 45, by classifying a predetermined range of noise amount into a plurality of classes and assuming noise amounts belonging to the same class as the same noise amount, calculates an average value or mode of parameters transmitted from the user terminals 2 together with image data having noise amounts belonging to the same class. Furthermore, the characterizing unit 45 associates a representative value of noise amount for each class (e.g., average value, minimum value, or maximum value of each class) with the average value or mode calculated for the noise amounts belonging to the class.

Alternatively, the characterizing unit 45, for example, divides a predetermined range of parameter into a plurality of classes, assuming parameters belonging to the same class as the same parameter, and calculates an average value or mode of noise amounts obtained from image data transmitted from the user terminals 2 together with parameters belonging to the same class. Furthermore, the characterizing unit 45 associates a parameter serving as a representative value of each class (e.g., an average value, minimum value, or maximum value of each class) with the average value or mode of noise amounts that has been calculated for parameters belonging to the class.

Figure 10:
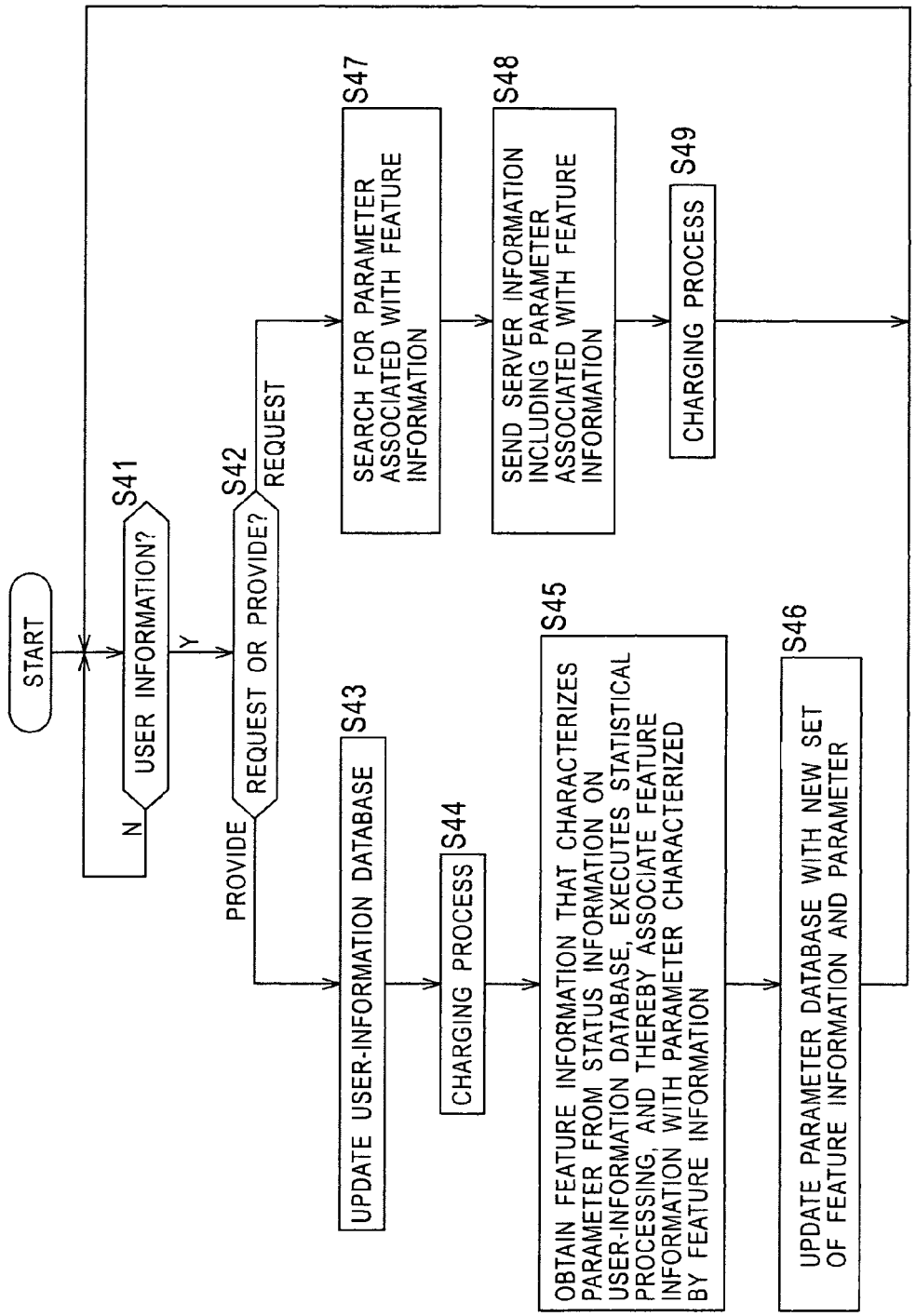
FIG. 10 is a flowchart showing processing that is executed by the management server 3.

In step S46 shown in FIG. 10, sets of noise amounts and parameters associated as described above (parameter-related information) are stored in the parameter database 46 by overwriting.

Figure 17:
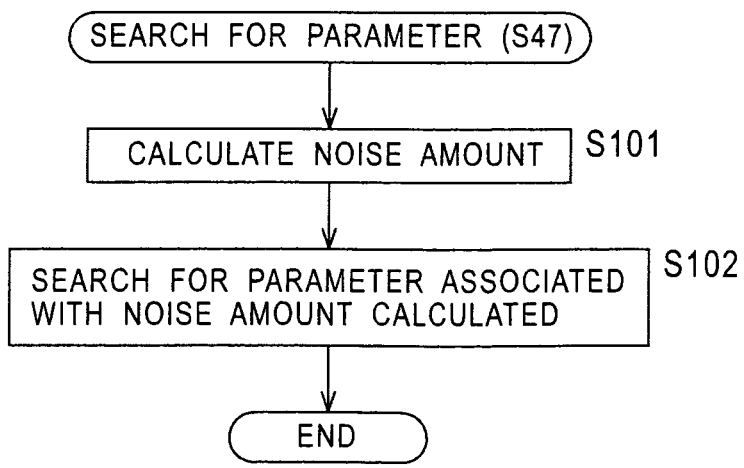
FIG. 17 is a flowchart showing in detail processing that is executed in step S47.

Next, processing that is executed in step S47 shown in FIG. 10 by the server-information providing unit 47 of the management server 3 (FIG. 9) in a case where the data processing unit 22 of the user terminal 2 (FIG. 4) is configured as shown in FIG. 11 will be described in detail with reference to a flowchart shown in FIG. 17.

Figure 15:
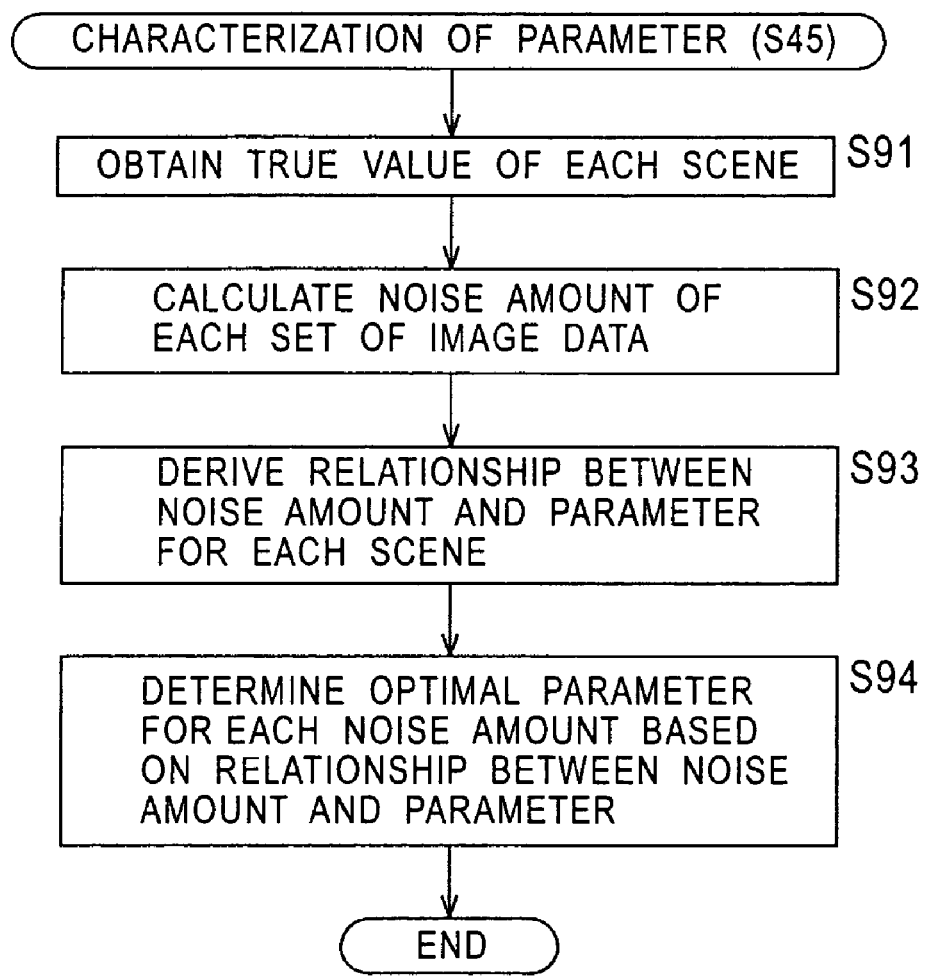
FIG. 15 is a flowchart showing in detail processing that is executed in step S45.

First, in step S101, the server-information providing unit 47 obtains the amount of noise in image data included in status information of user information supplied from the control unit 42 (FIG. 9), i.e., user information for requesting server information (user information with the requesting flag set to 1), for example, similarly to step S92 in FIG. 15. The procedure then proceeds to step S102.

In step S102, the server-information providing unit 47 searches the parameter database 46 for a parameter associated with the amount of noise that is most approximate to the amount of noise obtained in step S101. Furthermore, the server-information providing unit 47 reads parameter-related information that includes the parameter from the parameter database 46, and supplies the parameter-related information to the server-information sending unit 48. The procedure is then exited.

Thus, in step S48 shown in FIG. 10, a parameter associated with an amount of noise that is most approximate to the amount of noise of the image data included in the user information transmitted from the user terminal 2 is sent as an optimal parameter for the user terminal 2.

As described with reference to FIGS. 15 and 16, in the parameter database 46, an average value or mode of parameters that have been set by individual users' operations of the image-quality adjusting knob 13 for each noise amount is registered. Thus, the parameter that is selected by the processing shown in FIG. 17 from the parameter database 46 represents an average value or mode of parameters that have been set by operations of the image-quality adjusting knob 13 by a large number of users receiving image data having an amount of noise approximate to the noise amount of image data that is being received by the user terminal 2 of the user that has requested server information. The user terminal 2 that has sent user information for requesting server information is provided with server information including the average value or mode of parameters. As described with reference to FIG. 5, at the user terminal 2 having received the server information, the parameter included in the server information, i.e., an average value or mode of parameters that have been set by a large number of users under similar noise environments, is set. Accordingly, without a user's operation of the image-quality adjusting knob 13, a parameter that has been set by a large number of users under similar noise environments, i.e., an optimal parameter, is automatically set.

In the example described above, the parameter database 46 is searched for a parameter associated with a noise amount that is approximate to the noise amount of the image data included in the user information for requesting server information (hereinafter referred to as request user information when appropriate), and server information including the parameter itself is transmitted to the user terminal 2 that has sent the request user information. Alternatively, for example, a parameter obtained by processing the parameter selected from the parameter database 46, based on history of parameters input by the user of the user terminal 2, an offset between the parameter input by the user of the user terminal 2 and the parameter registered in the parameter database 46, etc., may be included in server information transmitted to the user terminal 2 that has sent the request user information.

More specifically, for example, if parameters input by the user of the user terminal 2 that has sent the request user information (these parameters are recognized, for example, based on user information with the providing flag indicating 1, transmitted in the past from the user terminal 2 of the user) tend to be smaller than the parameter associated with noise amounts approximate to noise amounts of image data included in request user information, when request user information has been transmitted, a parameter that is smaller by a predetermined offset than a parameter selected from the parameter database 46 may be included in server information that is transmitted.

Figure 18:
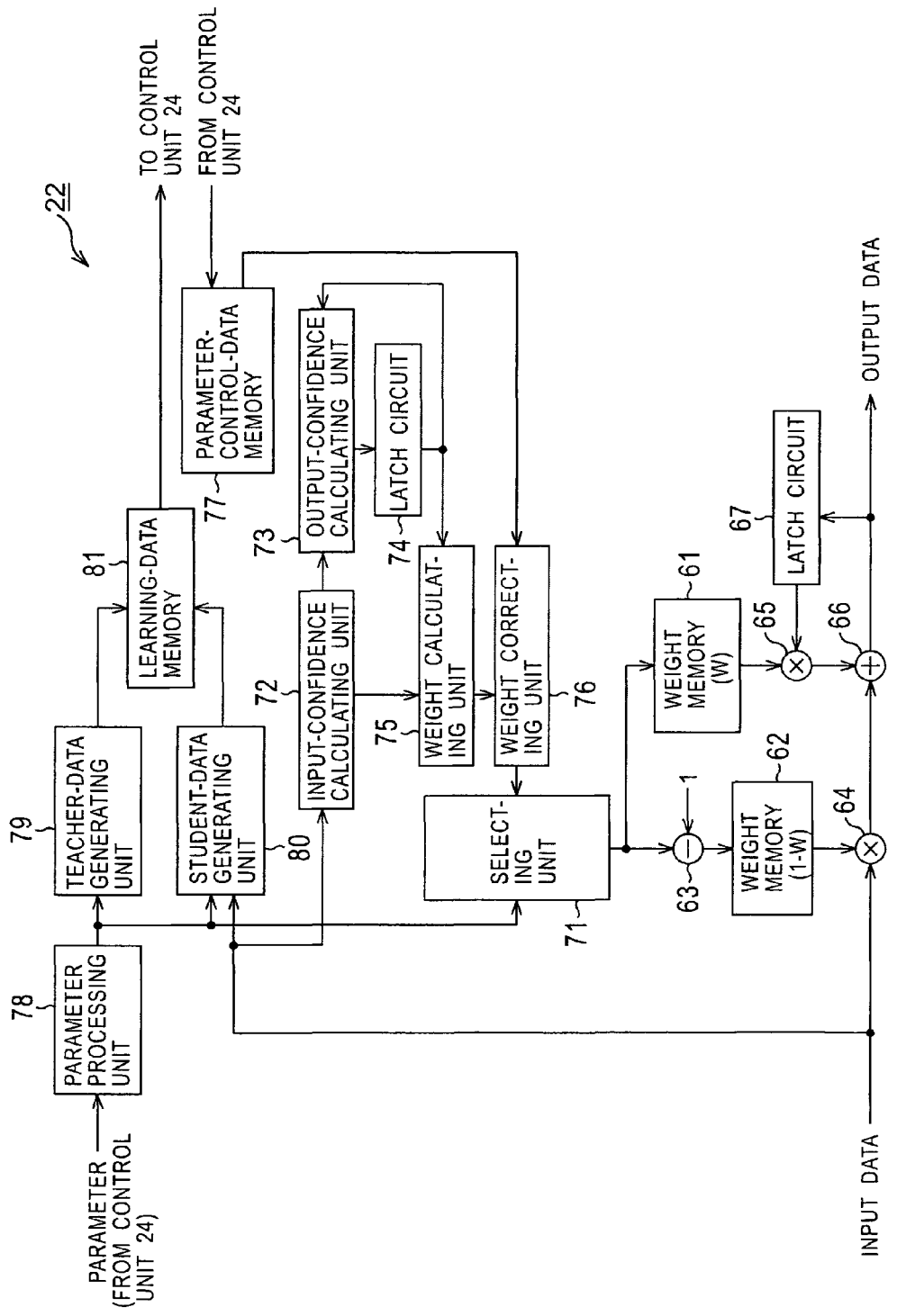
FIG. 18 is a block diagram showing a second example configuration of the data processing unit 22.

FIG. 18 shows another example configuration of the data processing unit 22 shown in FIG. 4 in a case where the data processing unit 22 removes a noise in image data supplied from the broadcast receiving unit 21. In the figure, components corresponding to those in FIG. 11 are denoted by the same numerals, and descriptions thereof will hereinafter be omitted as appropriate.

A selecting unit 71 selects either a weight output from a weight correcting unit 76 or a weight output from a parameter processing unit 78, and supplies the weight selected to a weight memory 61 and a calculator 63.

An input-confidence calculating unit 72 receives image data supplied as input data. The input-confidence calculating unit 72 calculates an input confidence representing the confidence of the input data, and outputs the input confidence to an output-confidence calculating unit 73 and a weight calculating unit 75. The output-confidence calculating unit 73, based on the input confidence supplied from the input-confidence calculating unit 72 and an output of a latch circuit 74, calculates an output confidence representing the confidence of image data that serves as output data, and supplies the output confidence to the latch circuit 74 and the weight calculating unit 75. The latch circuit 74 stores (latches) the output confidence supplied from the output-confidence calculating unit 73, and supplies the output confidence to the weight calculating unit 75 and the output-confidence calculating unit 73.

The weight calculating unit 75, based on the input confidence fed from the weight calculating unit 75 and the output confidence fed from the latch circuit 74, calculates a weight that serves as a parameter, and outputs the weight to the weight correcting unit 76. In addition to the weight, the weight correcting unit 76 receives parameter control data for controlling the weight from a parameter-control-data memory 77. The weight correcting unit 76 corrects the weight based on the parameter control data, and supplies the result to the selecting unit 71.

The parameter-control-data memory 77 stores parameter control data for correcting the weight that serves as a parameter, calculated by the weight calculating unit 75, and supplies the parameter control data to the weight correcting unit 76. In this embodiment, server information provided from the management server 3 includes the parameter control data as parameter-related information, as will be described later. When server information is provided from the management server 3, the control unit 24 (FIG. 4) overwrites the parameter-control-data memory 77 with the parameter control data included as parameter-related information in the server information.

The parameter processing unit 78 receives from the control unit 24 (FIG. 4) a weight W that serves as a parameter, input by a user's operation of the image-quality adjusting knob 13 of the remote commander 10. The parameter processing unit 78 processes the weight W supplied thereto as a parameter, and supplies the weight W to the selecting unit 71, a teacher-data generating unit 31, and a student-data generating unit 32. Furthermore, the parameter processing unit 78 determines whether the parameter supplied from the control unit 24 (FIG. 4) is a parameter that can be used for learning of parameter control data at the management server 3, which will be described later (hereinafter referred to as a learning parameter when appropriate). If the parameter is a learning parameter, the parameter processing unit 78 attaches a flag indicating that effect (hereinafter referred to as a learning flag when appropriate) to the weight W that is output.

When the user operates the image-quality adjusting knob 13, usually, the user initially performs an arbitrary operation, and makes adjustment operations while checking output data output in accordance with the operations, and stops operation when presumably optimal output data is obtained. A parameter corresponding to the position of the image-quality adjusting knob 13 at the time when the output data presumed as optimal by the user is obtained is a learning parameter. Thus, the parameter processing unit 78 determines, as a learning parameter, a parameter at a time when variation of the parameter by operation of the image-quality adjusting knob 13 has stopped after variation over a predetermined period or longer.

The teacher-data generating unit 79, upon receiving a weight (parameter) with a learning flag from the parameter processing-unit 78, generates teacher data that serves as a teacher in learning, and supplies the teacher data to a learning-data memory 81. That is, the teacher-data generating unit 79 supplies the weight with the learning flag as it is to the learning-data memory 81 as teacher data.

The student-data generating unit 80, upon receiving a weight with a learning flag from the parameter processing unit 78, generates student data that serves as a student in learning, and supplies the student data to the learning-data memory 81. That is, the student-data generating unit 80 is configured, for example, similarly to the input-confidence calculating unit 72, the output-confidence calculating unit 73, the latch circuit 74, and the weight calculating unit 75, and it calculates a weight from input data supplied thereto, and supplies a weight calculated from input data when the weight with the learning flag is received (a weight calculated from input confidence, etc. of input data) to the learning-data memory 81 as student data.

The learning-data memory 81 stores, as a set of learning data, a set of teacher data and student data, the teacher data being a weight supplied from the teacher-data generating unit 79 as a learning parameter, and the student data being a weight calculated from input data that is input when the learning parameter is received. In this embodiment, the learning data in the form of a set of a learning parameter serving as teacher data and a weight serving as student data, stored in the learning-data memory 81 in step S11 shown in FIG. 5, is included in user information, whereby user information that is to be provided to the management server 3 (user information with the providing flag indicating 1) (hereinafter referred to as provided user information) is generated. That is, in this embodiment, in addition to a parameter input by a user's operation of the image-quality adjusting knob 13 (learning parameter), a weight serving as student data is included in user information.

In the data processing unit 22 configured as described above, a noise is removed from image data supplied as input data as described below.

Figure 19A:
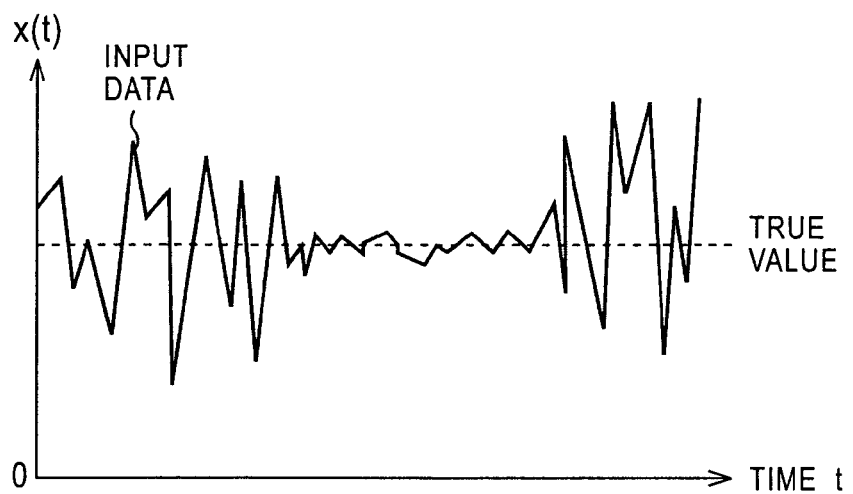
FIG. 19A is a diagram showing input data.

For simplicity of description, similarly to the embodiment shown in FIG. 11, as an example, a case will be considered in which input data in which time-varying noise is superposed on constant true value is averaged to remove the time-varying noise, as shown in FIG. 19A. The noise can be removed effectively by decreasing weight of (paying less consideration) to input data with a high noise level (i.e., signals with a low S/N ratio) while increasing weight for input data with a low noise level (i.e., a high S/N ratio).

Figure 19B:
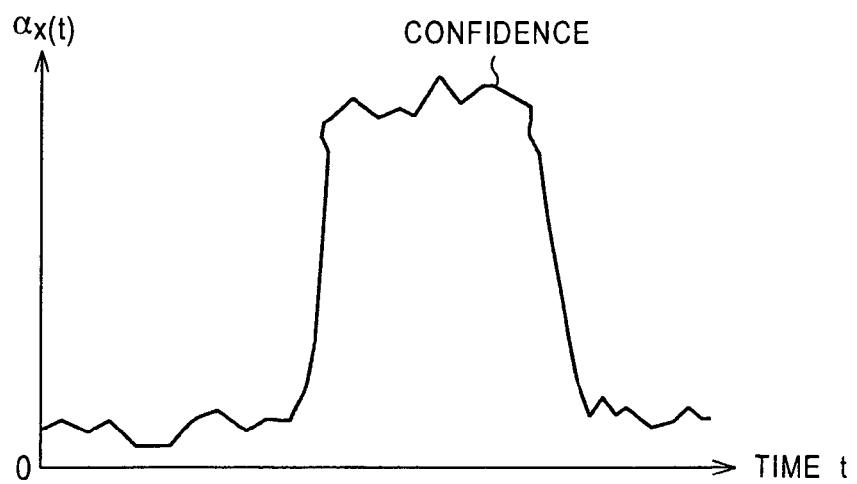
FIG. 19B is a diagram showing the confidence of the input data.

Thus, in the data processing unit 22 shown in FIG. 18, as a value for evaluating input data, for example, the closeness of input image to true values, i.e., an input confidence representing the confidence of input data being true values, is obtained, as shown in FIG. 19B, and an average thereof is calculated while weighting the input data in accordance with the input confidence, thereby removing the noise effectively.

Thus, in the data processing unit 22 shown in FIG. 18, a weighted average of the input data is obtained using weights in accordance with the input confidence, and output as output data. Letting input data, output data, and input confidence at time t be denoted as x(t), y(t), and $\alpha x_{(t)}$, the output data y(t) is obtained according to the following equation:

$$y(t) = \frac{\sum_{i=0}^{t} \alpha_{x(i)} x(i)}{\sum_{i=0}^{t} \alpha_{x(i)}} \quad (1)$$

In this example, a larger weight is assigned as the input confidence $\alpha x_{(t)}$ becomes larger.

For example, if the input data and the output data are image data, as described earlier, x(t) denotes image data (pixel value) of a pixel at a position in a frame t, and y(t) denotes image data that serves as output data corresponding to the input data x(t). x(t-1) denotes image data of a pixel at the same position in the immediately previous frame of the image data x(t), and y(t-1) denotes output data corresponding to the image data x(t-1).

From equation (1), the output data y(t-1) of the immediately previous frame of the target frame t can be obtained by the following equation:

$$y(t-1) = \frac{\sum_{i=0}^{t-1} \alpha_{x(i)} x(i)}{\sum_{i=0}^{t-1} \alpha_{x(i)}} \quad (2)$$

Furthermore, letting an output confidence $\alpha_{y(t)}$ be introduced for output data y(t) as a value for evaluating output data y(t), the output confidence $\alpha_{y(t)}$ representing the closeness to true values, i.e., the confidence of the output data y(t) being true values, the output confidence $\alpha_{y(t-1)}$ of the output data y(t-1) of the immediately previous frame of the target frame t can be expressed by the following equation:

$$\alpha_{y(t-1)} = \sum_{i=0}^{t-1} \alpha_{x(i)} \quad (3)$$

In this case, from equations (1) to (3), the output data y(t) and the output confidence $\alpha_{y(t)}$ thereof can be expressed as follows:

$$y(t) = \frac{\overbrace{\sum_{i=0}^{t-1} \alpha_{x(i)} x(i)}^{\alpha_{y(t-1)} y(t-1)} + \alpha_{x(t)} x(t)}{\underbrace{\sum_{i=0}^{t-1} \alpha_{x(i)}}_{\alpha_{y(t-1)}} + \alpha_{x(t)}}$$

$$= \frac{\alpha_{y(t-1)} y(t-1) + \alpha_{x(t)} x(t)}{\alpha_{y(t-1)} + \alpha_{x(t)}} \quad (4)$$

$$\alpha_{y(t)} = \alpha_{y(t-1)} + \alpha_{x(t)} \quad (5)$$

Furthermore, let a weight that is used for obtaining the output data y(t) in the target frame t be denoted as w(t), and defined by the following equation:

$$w(t) = \frac{\alpha_{y(t-1)}}{\alpha_{y(t-1)} + \alpha_{x(t)}} \quad (6)$$

From equation (6), the following equation can be derived:

$$1 - w(t) = \frac{\alpha_{x(t)}}{\alpha_{y(t-1)} + \alpha_{x(t)}} \quad (7)$$

Using equations (6) and (7), the output data y(t) in equation (4) can be expressed as a weighted sum by multiplications and addition as follows:

$$y(t) = w(t)y(t-1) + (1-w(t))x(t) \tag{8}$$

The weight w(t) (and 1−w(t)) used in equation (8) can be obtained from the output confidence the output confidence $\alpha_{y(t-1)}$ of the output data y(t-1) of the immediately previous frame and the input confidence $\alpha_{x(t)}$ of the current input data x(t). Furthermore, the output confidence $\alpha_{y(t)}$ of the current output data y(t) in equation (5) can also be obtained from the output confidence the output confidence $\alpha_{y(t-1)}$ of the output data y(t-1) of the immediately previous frame and the input confidence $\alpha_{x(t)}$ of the current input data x(t).

Now, the reciprocals of a variance $\sigma_{x(t)}^2$ and a variance $\sigma_{y(t)}^2$ will be used as the input confidence $\alpha_{x(t)}$ and the output confidence $\alpha_{y(t)}$ of the input data x(t) and the output data y(t). That is, the input confidence $\alpha_{x(t)}$ and the output confidence $\alpha_{y(t)}$ will be expressed by the following equations:

$$\alpha_{x(t)} = \frac{1}{\sigma_{x(t)}^2} \tag{9}$$

$$\alpha_{y(t)} = \frac{1}{\sigma_{y(t)}^2}$$

Then, the weight w(t) in equation (6) and the weight 1−W in equation (7) can be obtained by the following equations:

$$w(t) = \frac{\sigma_{x(t)}^2}{\sigma_{y(t-1)}^2 + \sigma_{x(t)}^2} \tag{10}$$

$$1 - w(t) = \frac{\sigma_{y(t-1)}^2}{\sigma_{y(t-1)}^2 + \sigma_{x(t)}^2} \tag{11}$$

$\sigma_{y(t)}^2$ can be obtained by the following equation:

$$\sigma_{y(t)}^2 = w(t)^2 \sigma_{y(t-1)}^2 + (1-w(t))^2 \sigma_{x(t)}^2 \tag{12}$$

The data processing unit 22 shown in FIG. 18 calculates a parameter that serves as the weight w(t) according to equation (6), and calculates a weighted sum of the output data y(t-1) of the immediately previous frame and the current input data x(t) using the weight w(t) according to equation (8), thereby obtaining output data y(t) in which noise included in the input data x(t) has been removed effectively.

The output data obtained by processing input data using the weight w(t) according to equation (6) is not necessarily considered as optimal by the user. Thus, in the data processing unit shown in FIG. 18, input data is processed using a weight that is obtained by performing correcting using parameter control data for controlling (correcting) the weight w(t), obtained by learning of the operation of the image-quality adjusting knob 13 by the user.

The learning of the parameter control data is performed at the management server 3, using a set of the learning parameter input by a user's operation of the image-quality adjusting knob 13, serving as learning data stored in the learning-data memory 81, and a weight w(t) obtained by the student-data generating unit 80 when the learning parameter is given. The weight w(t) serving as a parameter is corrected by the weight correcting unit 76 using the parameter control data. Now, learning of the parameter control data and correction of the weight w(t) serving as a parameter will be described.

A weight $w_i$ given at an i-th time by a user's operation of the image-quality adjusting knob 13 can be considered as a parameter considered by the user as optimal for input data input at the time the learning parameter is given. Thus, in leaning of the parameter control data, parameter control data with which the weight (t) calculated according to equation (6) is corrected to a value approximate to (ideally the same as) the weight $W_i$ associated with the learning parameter is obtained.

Thus, with the weight w(t) obtained according to equation (6) as student data that serves as a student in learning and with the weight $W_i$ associated with the learning parameter as teacher data that serves as a teacher in learning, for example, a predictive value $W_i'$ of the weight $W_i$ serving as teacher data, defined by parameter control data a and b and predicted by a first-order equation that relates teacher data and student data with each other, expressed in the following equation, is obtained from the weight w(t) serving as student data:

$$W'_i = aw_i - b \tag{13}$$

In equation (13) (also in equations (14), (16), and (21), described later), $w_i$ denotes a weight w(t) that serves as student data, calculated according to equation (6) for input data that is input when the weight $w_i$ associated with the learning parameter serving as teacher data is given (hereinafter referred to as a weight for input data when appropriate).

From equation (13), an error (prediction error) $e_i$ between $W_i$ serving as teacher data and the predictive value $W_i'$ thereof can be expressed by the following equation:

$$e_i = W_i - W'_i \tag{14}$$
$$= W_i - (aw_i + b)$$

Now, let (the sum of) square errors $e_i$ in equation (14) be expressed by the following equation:

$$\sum_{i=1}^{N} e_i^2 \tag{15}$$

and parameter control data a and b that minimize the sum is obtained by the least square method. In equation (15) (also in equations (16) to (21)), N represents the number of sets of teacher data and student data.

First, partially differentiating the square errors in equation (15) with respect to the parameter control data a and b, respectively, yields the following equations:

$$\frac{\partial \sum_{i=1}^{N} e_i^2}{\partial a} = -2 \sum_{i=1}^{N} w_i (W_i - (aw_i + b)) \tag{16}$$

$$\frac{\partial \sum_{i=1}^{N} e_i^2}{\partial b} = -2 \sum_{i=1}^{N} (W_i - (aw_i + b)) \tag{17}$$

The minimum value (minimal value) of the square errors in equation (15) is given by a and b with which the right-hand sides of equations (16) and (17) become 0. Thus, by assigning 0 to the respective right-hand sides of equations (16) and (17), equation (18) is derived from equation (16) and equation (19) is derived from equation (17):

$$N \sum_{i=1}^{N} w_i W_i = Nb \sum_{i=1}^{N} w_i + Na \sum_{i=1}^{N} w_i^2 \quad (18)$$

$$Nb = \sum_{i=1}^{N} W_i - a \sum_{i=1}^{N} w_i \quad (19)$$

By assigning equation (19) into equation (18), the parameter control data a can be obtained by the following equation:

$$a = \frac{N \sum_{i=1}^{N} w_i W_i - \sum_{i=1}^{N} w_i \sum_{i=1}^{N} W_i}{N \sum_{i=1}^{N} w_i^2 - \left(\sum_{i=1}^{N} w_i\right)^2} \quad (20)$$

Furthermore, from equations (19) and (20), the parameter control data b can be obtained by the following equation:

$$b = \frac{\sum_{i=1}^{N} W_i - a \sum_{i=1}^{N} w_i}{N} \quad (21)$$

At the management server 3, learning of the parameter control data a and b is performed according to equations (20) and (21) using the learning data. In the weight correcting unit 76 shown in FIG. 18, the weight w(t) calculated by the weight calculating unit 75 is corrected according to equation (13) defined by the parameter control data a and b obtained by the learning.

Figure 20:
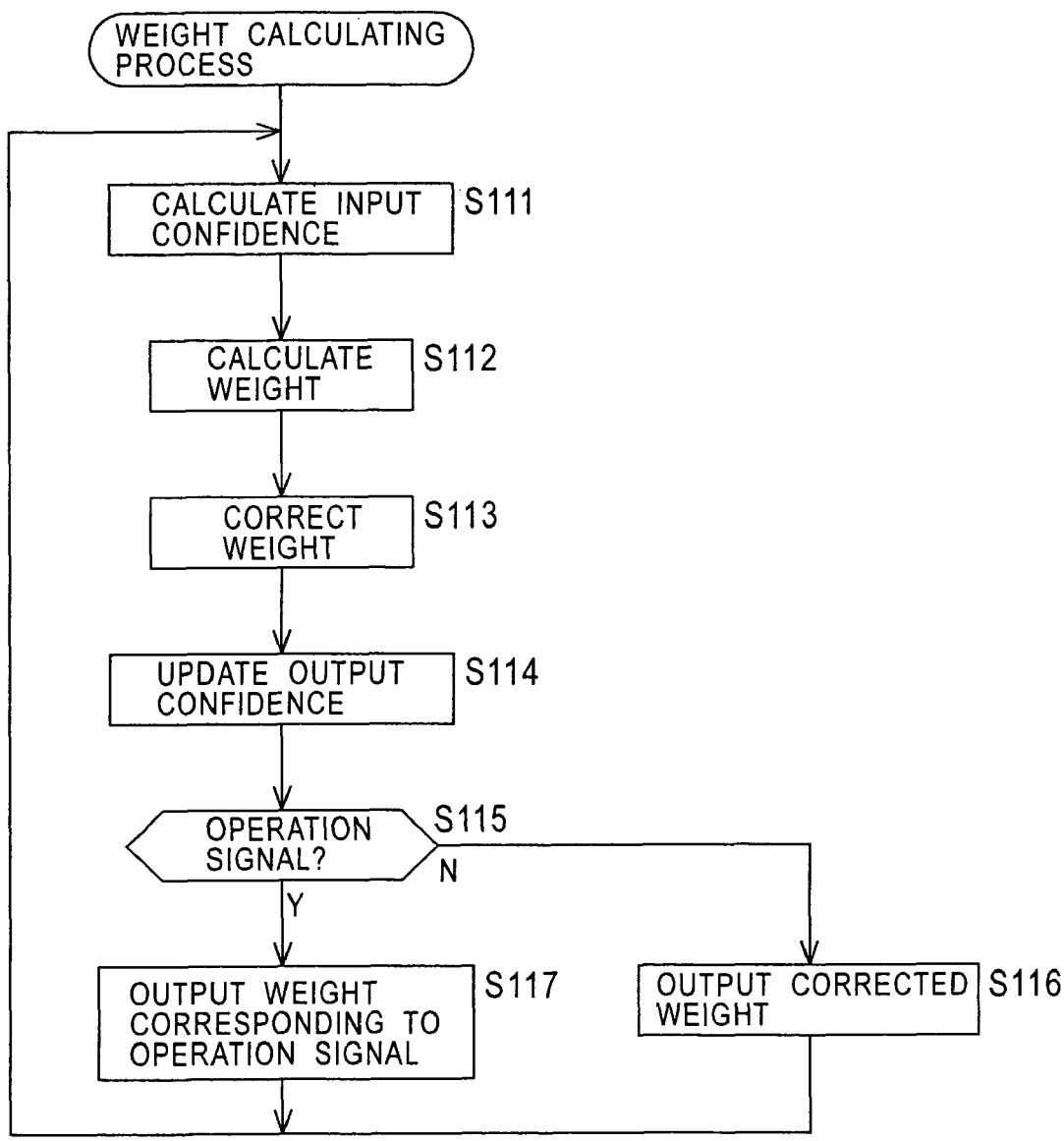
FIG. 20 is a flowchart showing a weight calculating process.
Figure 21:
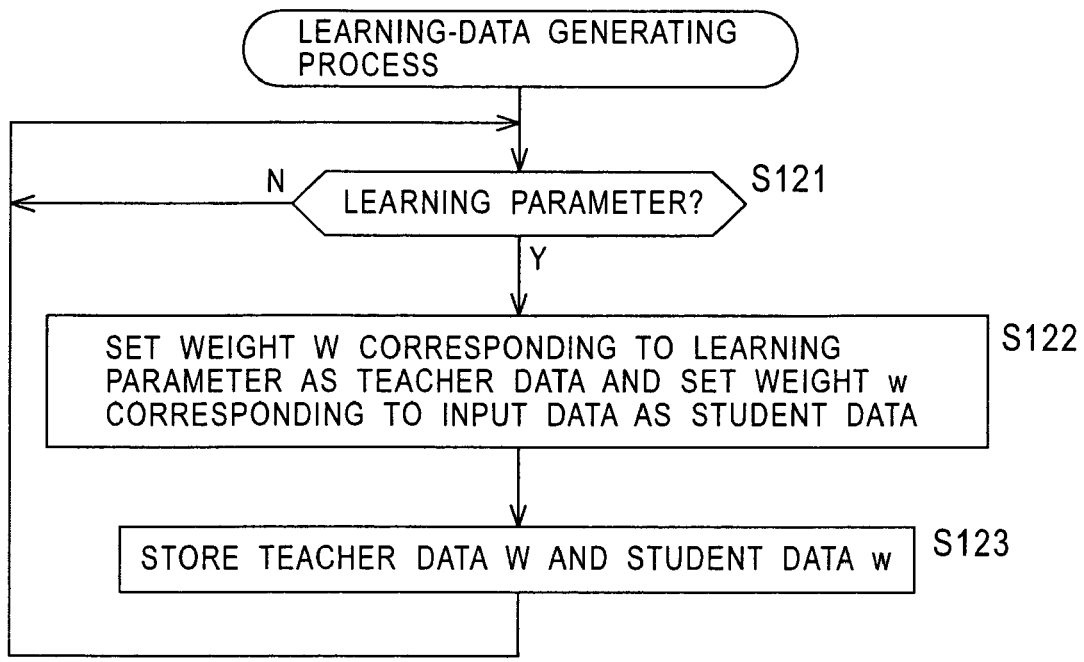
FIG. 21 is a flowchart showing a learning-data generating process.

Next, processing that is executed by the data processing unit 22 shown in FIG. 18 will be described with reference to flowcharts shown in FIGS. 20 and 21.

In the data processing unit 22 shown in FIG. 18, data processing for obtaining output data by processing input data using a weight, a weight calculating process for calculating the weight, and a learning-data generating process for generating learning data are executed. Since the data processing is the same as that in the case described with reference to FIG. 12, description thereof will be omitted. Note, however, that in the data processing by the data processing unit 22 shown in FIG. 18, weights that are stored in the weight memories 61 and 62 are set not based on a parameter set in the parameter memory 68 in step S51 shown in FIG. 12, but based on a parameter (weight) output from the selecting unit 71.

First, a weight calculating process that is executed by the data processing unit 22 shown in FIG. 18 will be described.

In the weight calculating process, first, in step S111, the input-confidence calculating unit 72 calculates the input confidence $\alpha_{x(t)}$.

More specifically, the input-confidence calculating unit 72 includes an FIFO (first in first out) memory that is capable of latching several past frames of image data in addition to image data x(t) of the current input data. The input-confidence calculating unit 72, using pixel values (image data) x(t) of pixels at a position of the current input data and pixel values of pixels at the same position of the several past frames, calculates variances thereof, and calculates the reciprocals thereof as the input confidence $\alpha_{x(t)}$, supplying it to the output-confidence calculating unit 73 and the weight calculating unit 75. When input of input data has just begun, a necessary number of pixel values for calculating a variance does not necessarily exist. In that case, for example, a default value is output as the input confidence $\alpha_{x(t)}$.

Then, the procedure proceeds to step S112, in which the weight calculating unit 75 calculates the weight w(t) according to equation (6) using the input confidence $\alpha_{x(t)}$ supplied from the input-confidence calculating unit 72.

More specifically, at a timing when the input confidence $\alpha_{x(t)}$ is supplied from the input-confidence calculating unit 72 to the weight calculating unit 75, the he output confidence $\alpha_{y(t-1)}$ output by the output-confidence calculating unit 73 in the immediately previous frame is latched in the latch circuit 74. In step S112, the weight calculating unit 75 calculates the weight w(t) according to equation (6) using the input confidence $\alpha_{x(t)}$ supplied from the input-confidence calculating unit 12 and he output confidence $\alpha_{y(t-1)}$ latched in the latch circuit 14. The weight w(t) is supplied to the weight correcting unit 76.

In step S113, the weight correcting unit 76 corrects the weight w(t) supplied from the weight calculating unit 75 according to the first-order equation in equation (13) defined by the parameter control data a and b supplied from the parameter-control-data memory 77, and supplies the result to the selecting unit 71. In equation (13), $w_i$ corresponds to the weight w(t) supplied from the weight calculating unit 75, and $W_i'$ correspond to the weight having been corrected.

The procedure then proceeds to step S114, in which the output-confidence calculating unit 73 update the output confidence. More specifically, the output-confidence calculating unit 73 adds the input confidence $\alpha_{x(t)}$ calculated by the input-confidence calculating unit 72 in the immediately preceding step S111 and the output confidence $\alpha_{y(t-1)}$ of the immediately previous frame latched in the latch circuit 74, thereby obtaining the current output confidence $\alpha_{y(t)}$, which is stored in the latch circuit 74 by overwriting.

The procedure then proceeds to step S115, in which the selecting unit 71 determines whether the image-quality adjusting knob 13 has been operated by the user from the output of the parameter processing unit 78. If it is determined in step S115 that the image-quality adjusting knob 13 has not been operated, the procedure proceeds to step S116. In step S116, the selecting unit 71 outputs the weight calculated from the input confidence of input data, etc. and corrected by the weight correcting unit 76 (hereinafter referred to as a corrected weight when appropriate), and outputs it to the weight memory 61 and the calculator 63. The procedure then returns to step S111.

If it is determined in step S115 that the image-quality adjusting knob 13 has been operated, the procedure proceeds to step S117. In step S117, the selecting unit 71 selects a weight output by the parameter processing unit 78 in accordance with the operation, and outputs it to the weight memory 61 and the calculator 63. The procedure then proceeds to step S111.

Thus, in the weight calculating process, when the image-quality adjusting knob 13 has not been operated, a corrected weight is supplied to the weight memory 61 and the calculator 63. On the other hand, when the image-quality adjusting knob 13 has been operated, a weight associated with a parameter input by the operation is supplied to the weight memory 61 and the calculator 63. Accordingly, in the data processing by the data processing unit 22 shown in FIG. 18, input data is processed using the corrected weight when the image-quality adjusting knob 13 has not been operated, whereas the input data is processed using the weight associated with the parameter input by the operation when the image-quality adjusting knob 13 has been operated.

Next, a learning-data generating process that is executed by the data processing unit 22 shown in FIG. 18 will be described with reference to a flowchart shown in FIG. 21.

In the learning-data generating process, first, in step S121, the parameter processing unit 78 determines whether a learning parameter has been received from the image-quality adjusting knob 13. If it is determined that a learning parameter has not been received, the procedure returns to step S121.

On the other hand, if it is determined in step S121 that a learning parameter has been received from the image-quality adjusting knob 13, the procedure proceeds to step S122, in which the teacher-data generating unit 79 generates teacher data and the student-data generating unit 80 generates student data.

More specifically, when a learning parameter has been received, the parameter processing unit 78 supplies a weight associated with the learning parameter together with a learning flag to the teacher-data generating unit 79 and the student-data generating unit 80. The teacher-data generating unit 79, upon receiving the weight W with the learning flag, obtains the weight W as teacher data, and supplies it to the learning-data memory 81. The student-data generating unit 80, upon receiving the weight with the learning flag, calculates a weight w associated with input data at that time as student data, and supplies it to the learning-data memory 3.

The weight w associated with the input data refers to a weight calculated from the input confidence and the output confidence according to equation (6). As described above, the student-data generating unit 80 calculates the weight w from the input data.

The learning-data memory 81, upon receiving teacher data W from the teacher-data generating unit 79 and receiving student data w from the student-data generating unit 80, additionally stores the latest set of teacher data W and student data w in step S123. The procedure is then exited.

In step S11 shown in FIG. 5, the learning data stored in the learning-data memory 81 as described above is placed in the portion of "parameter" in user information.

When the learning data stored in the learning-data memory 81, included in the user information, and provided to the management server 3, the content stored in the learning-data memory 81 is cleared.

In a case where the data processing unit 22 of the user terminal shown in FIG. 4 is configured as shown in FIG. 18, the characterizing unit 45 of the management server 3 (FIG. 9) derives a relationship between noise amount and learning data in step S93 shown in FIG. 15. In that case, the characterizing unit 45 performs learning of parameter control data as described earlier in step S94 shown in FIG. 15, thereby obtaining parameter control data that allows an optimal parameter for each noise amount to be obtained.

Now, a learning process executed in step S94 shown in FIG. 15 by the characterizing unit 45 of the management server 3 (FIG. 9) in a case where the data processing unit 22 of the user terminal shown in FIG. 4 is configured as shown in FIG. 18 will be described with reference to a flowchart shown in FIG. 22.

In this case, in step S131, the characterizing unit 45 performs summation in the least square method, using teacher data and student data serving as learning data, obtained for each noise amount.

More specifically, the characterizing unit 45 performs a calculation corresponding to multiplication of the student data $w_i$ and the teacher data $W_i$ ($w_i W_i$) and summation ($\Sigma w_i W_i$), a calculation corresponding to summation of the student data ($\Sigma w_i$), a calculation corresponding to summation of the teacher data Wi ($\Sigma W_i$), and a calculation corresponding to summation of squares of the student data $w_i$ ($\Sigma w_i^2$) in equations (20) and (21).

The procedure then proceeds to step S132, in which the characterizing unit 45 obtains parameter control data a and b by calculating equations (20) and (21) using the result of summation obtained in step S131. The procedure is then exited.

Thus, in this case, when request user information has been transmitted from the user terminal 2 to the management server 3, the management server 3 provides the user terminal 2 with server information including, as parameter-related information, the parameter control data obtained as described with reference to FIG. 22. Then, in the data processing unit 22 of the user terminal 2, shown in FIG. 18, the parameter control data a and b included in the server information are set in the parameter-control-data memory 77, and the weight correcting unit 76 corrects the weight w(t) output by the weight calculating unit 75 according to equation (13) defined by the parameter control data a and b.

Thus, at the user terminal 2, the weight output from the weight calculating unit 75 (FIG. 18) is corrected to an optimal weight input by other users under similar noise environments without a user's operation of the image-quality adjusting knob 13.

Furthermore, for the user operating the image-quality adjusting knob 13, the weight w(t) output from the weight calculating unit 75 is corrected based on the parameter control data that is obtained by performing learning using learning data obtained by the operation and learning data obtained by operations of other users operating the image-quality adjusting knob 13 under similar noise environments. Accordingly, an optimal result of noise removal can be obtained more quickly compared with a case where learning is performed using only learning data obtained by a user's operation.

In the example described above, for simplicity of description, the weight w(t) obtained from the input confidence, etc. is corrected to the weight W input by a user's operation of the image-quality adjusting knob 13 according to the first-order equation in equation (13) defined by the parameter control data a and b. Actually, however, it is desired that the weight w(t) be corrected according to a higher-order equation.

Figure 23:
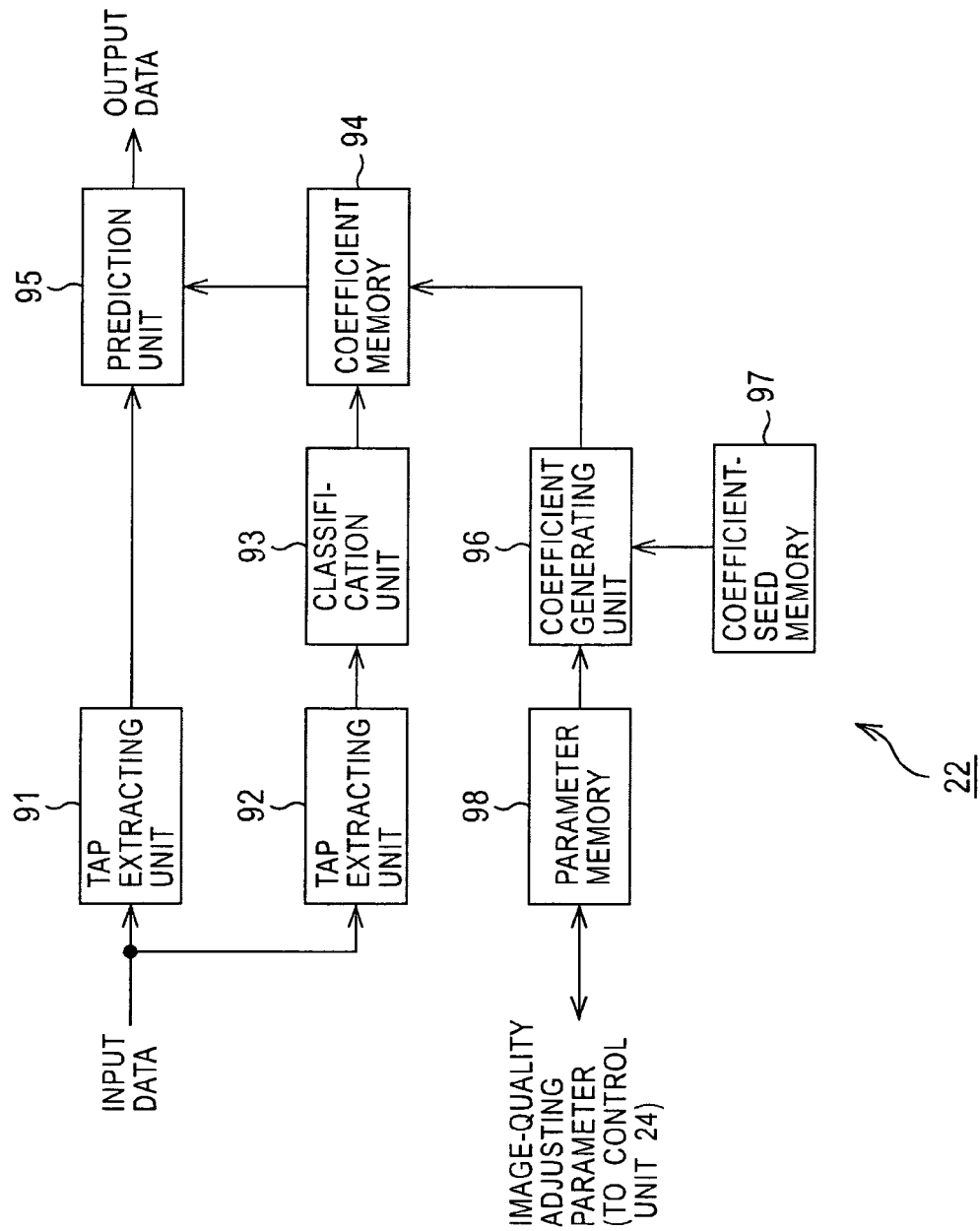
FIG. 23 is a block diagram showing a third example configuration of the data processing unit 22.

FIG. 23 shows yet another example configuration of the data processing unit 22 in a case where the data processing unit 22 removes noise from image data supplied from the broadcast receiving unit 21.

Image data supplied as input data is supplied to tap extracting units 91 and 92.

The tap extracting unit 91 sequentially selects, as a target pixel, each pixel constituting the image data (hereinafter referred to as true-value image data) composed of true values of image data (without noise superposed thereon) supplied as input data, extracts, as prediction taps, (the pixel values of) several pixels for predicting the true value of the target pixel (real pixel value), constituting the image data supplied as input data.

More specifically, the tap extracting unit 91 extracts, as prediction taps, a plurality of pixels that is spatially or temporally close to a pixel of input data supplied as image data corresponding to the target pixel (e.g., the pixel of image data supplied as input data corresponding to the target pixel, and pixels spatially adjacent to the pixel).

The tap extracting unit 92 extracts, as class taps, several pixels that are used for classifying the target pixel into one of several classes, constituting the image data supplied as input data.

For simplicity of description, the prediction taps and the class taps are assumed to have the same tap configuration herein. However, the prediction taps and the class taps may have different tap configurations.

The prediction taps obtained by the tap extracting unit 91 are supplied to a prediction unit 95, and the class taps obtained by the tap extracting unit 92 are supplied to a classification unit 93.

The classification unit 93 classifies the target pixel based on the class taps supplied from the tap extracting unit 92, and supplies a class code corresponding to the class determined to a coefficient memory 94.

The classification may be performed, for example, by ADRC (adaptive dynamic range coding).

With ADRC, the pixel values of pixels serving as class taps are ADRC-processed, and a class of the target pixel is determined based on an ADRC code obtained by ADRC.

For example, in the case of K-bit ADRC, a maximum value MAX and a minimum value MIN of the pixel values of the pixels serving as class taps are detected, a value DR=MAX−MIN is used as a local dynamic range of the set, and the pixel values serving as class taps are requantized in K bits based on the dynamic range DR. That is, the minimum value MIN is subtracted from the pixel value of each pixel serving as a class tap, and the result of subtraction is divided (quantized) by $DR/2^K$. The pixel values of the pixels each having K bits, serving as class taps, are arranged in a predetermined order to form a bit sequence, which is output as an ADRC code. Thus, for example, if the class taps are processed by one-bit ADRC, the minimum value MIN is subtracted from the pixel values of the pixels serving as class taps, and the results are divided (with fractional parts rounded off) by the average of the maximum value MAX and the minimum value MIN, whereby the pixel values of the pixels are each represented by one bit (binarized). A bit sequence in which the one-bit pixel values are arranged in a predetermined order is output as an ADRC code.

Alternatively, for example, the classification unit 93 may output a pattern of distribution of levels of the pixel values of the pixels serving as class taps, as it is as a class code. In that case, however, assuming that the class taps include the pixel values of N pixels, the pixel value of each of the pixels having K bits, the number of possible class codes output from the classification unit 93 is $(2^N)^K$, which increases exponentially with the number of bits K of the pixel values of the pixels.

Thus, preferably, the amount of information of class taps is compressed, for example, by ADRC described above or by vector quantization before carrying out classification.

The coefficient memory 94 stores tap coefficients for each class, supplied from a coefficient generating unit 96. Furthermore, the coefficient memory 94 outputs tap coefficients stored at an address associated with the class code supplied from the classification unit 93 (tap coefficients for the class represented by the class code supplied from the classification unit 93) to a prediction unit 95.

Tap coefficients herein correspond to coefficients that are multiplied with inputs at so-called taps in a digital filter.

The prediction unit 95 obtains the prediction taps output from the tap extracting unit 91 and the tap coefficients output from the coefficient memory 94, and performs a predetermined predictive calculation for calculating a predictive value of the true value of the target pixel using the prediction taps and the tap coefficients. The prediction unit 95 thus calculates and outputs (a predictive value of) the true value of the target pixel, that is, the pixel value of a pixel constituting the image data supplied as input data, with noise removed therefrom.

The coefficient generating unit 96, based on coefficient-seed data stored in a coefficient-seed memory 97 and a parameter stored in a parameter memory 98, generates tap coefficients for each class, supplies the tap coefficients to the coefficient memory 94, where the tap coefficients are stored by overwriting.

The coefficient-seed memory 97 stores coefficient-seed data for each class, obtained by learning of coefficient-seed data, which will be described later. The coefficient-seed data serves as a seed for generating tap coefficients.

The parameter memory 98, by overwriting, stores a parameter supplied from the control unit 24 (FIG. 4) by a user's operation of the image-quality adjusting knob 13.

In the embodiment shown in FIG. 23, a parameter is stored in the parameter memory 98, whereby the parameter is set in the data processing unit 22.

Furthermore, in the embodiment shown in FIG. 23, the parameter stored in the parameter memory 98 is included in the user information, which is then provided to the management server 3, and a parameter included in server information provided from the management server 3 as will be described later is stored in the parameter memory 98.

Next, data processing that is executed by the data processing unit 22 shown in FIG. 23 will be described with reference to a flowchart shown in FIG. 24.

The tap extracting unit 91 sequentially selects, as a target pixel, each pixel constituting true-value image data corresponding to image data input thereto. In step S141, the parameter memory 98 determines whether a parameter has been supplied from the control unit 24 (FIG. 4). If it is determined that a parameter has been supplied, the procedure proceeds to step S142, in which the parameter memory 98 stores the parameter by overwriting. The procedure then proceeds to step S143.

On the other hand, if it is determined in step S141 that a parameter has not been supplied from the control unit 24, step S142 is skipped and the procedure proceeds to step S143.

Thus, the content stored in the parameter memory 98 is updated by a parameter input or provided when a parameter has been supplied from the control unit 24, that is, when a parameter has been input by a user's operation of the image-quality adjusting knob 13, or when server information including a parameter has been provided.

In step S143, the coefficient generating unit 96 reads coefficient-seed data for each class from the coefficient-seed memory 97 and reads a parameter from the parameter memory 98, and calculates tap coefficients for each class based on the coefficient-seed data and the parameter. The procedure then proceeds to step S144, in which the coefficient generating unit 96 supplies the tap coefficients for each class to the coefficient memory 94, where the tap coefficients are stored by overwriting. The procedure then proceeds to step S145.

In step S145, the tap extracting units 91 and 92 extract prediction taps and class taps for the target pixel, respectively, from the image data supplied thereto as input data. The prediction taps are supplied from the tap extracting unit 91 to the prediction unit 95, and the class taps are supplied from the tap extracting unit 92 to the classification unit 93.

The classification unit 93 receives the class taps for the target pixel from the tap extracting unit 92, and in step S146, the classification unit 93 classifies the target pixel based on the class taps. Furthermore, the classification unit 93 outputs a class code representing a class of the target pixel determined by the classification to the coefficient memory 94. The procedure then proceeds to step S147.

In step S147, the coefficient memory 94 reads tap coefficients stored at an address associated with the class code supplied from the classification unit 93. Furthermore, in step S147, the prediction unit 95 obtains the tap coefficients output from the coefficient memory 94. The procedure then proceeds to step S148.

In step S148, the prediction unit 95 performs a predetermined predictive calculation using the prediction taps output from the tap extracting unit 91 and the tap coefficients obtained from the coefficient memory 94. The prediction unit 95 thus obtains (a predictive value of) the true value of the target pixel, and outputs it as output data. The procedure then proceeds to step S149.

In step S149, the tap extracting unit 91 determines whether any true-value image data that has not been selected as a target pixel remains. If it is determined in step S149 that true-value image data that has not been selected as a target pixel remains, one of the pixels of the true-value image data that has not been selected as a target pixel is newly selected as a target pixel. The procedure then returns to step S141, and the same procedure is repeated.

If it is determined in step S149 that true-value image data that has not been selected as a target pixel does not exist, the procedure is exited.

Figure 24:
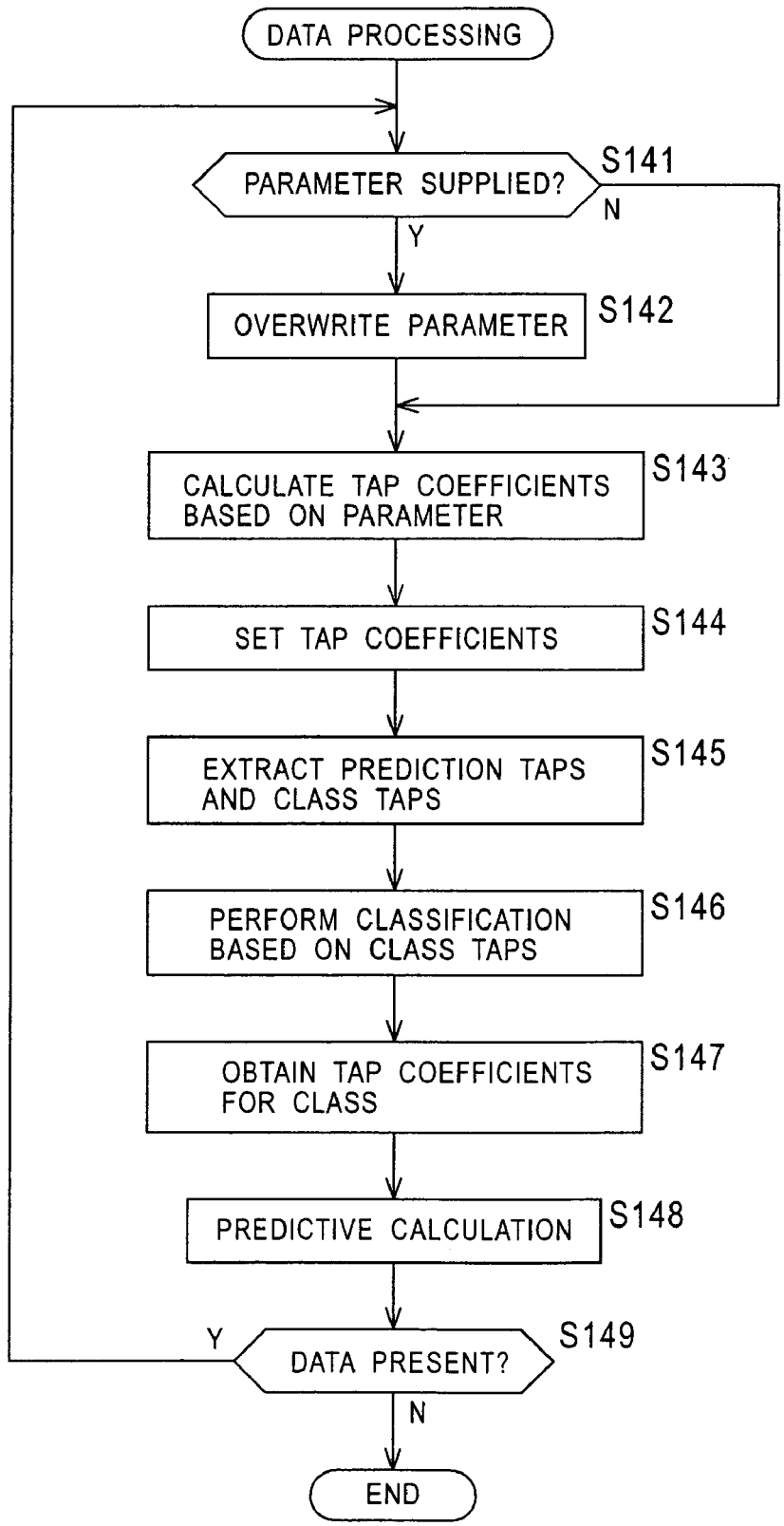
FIG. 24 is a flowchart showing processing that is executed by the data processing unit 22.

The processing in steps S143 and S144 shown in FIG. 24 may be skipped except when the parameter memory 98 has been overwritten with a new parameter.

Next, predictive calculation by the prediction unit 95, generation of tap coefficients by the coefficient-generating unit 96, and learning of coefficient-seed data to be stored in the coefficient-seed memory 97, shown in FIG. 23, will be described.

Now, a case will be considered in which, for example, noise is superposed on pixels (hereinafter referred to as high-quality pixels when appropriate) constituting image data of a high image quality (high-quality image data) to obtain low-quality image data in which the image quality has been degraded, prediction taps are extracted from the low-quality image data, and pixel values of high-quality pixels are calculated (predicted) by a predetermined predictive calculation using the prediction taps and tap coefficients.

Now, let it be supposed, for example, that the predetermined predictive calculation is a linear first-order predictive calculation. Then, a pixel value y of a high-quality pixel can be obtained by the following linear first-order equation:

$$y = \sum_{n=1}^{N} w_n x_n \tag{22}$$

In equation (22), $x_n$ denotes the pixel value of an n-th pixel constituting the low-quality image data (hereinafter referred to as low-quality pixel when appropriate) serving as a prediction tap for the high-quality pixel y, and $w_n$ denotes an n-th tap coefficient that is multiplied with (the pixel value of) the n-th low-quality pixel. In equation (22), it is assumed that the prediction taps include N low-quality pixels $x_1, x_2, \ldots, x_N$.

Alternatively, the pixel value y of the high-quality pixel may be calculated by a second-order or higher-order equation instead of the linear first-order equation in equation (22).

In the embodiment shown in FIG. 23, the coefficient-generating unit 96 generates tap coefficients $w_n$ from the coefficient-seed data stored in the coefficient-seed memory 97 and the parameter stored in the parameter memory 98. The coefficient-generating unit 96 generates tap coefficients $w_n$, for example, according to the following equation using the coefficient-seed data and the parameter.

$$w_n = \sum_{m=1}^{M} \beta_{m,n} z^{m-1} \tag{23}$$

In equation (23), $\beta_{m,n}$ denotes m-th coefficient-seed data that is used to obtain an n-th tap coefficient $w_n$, and z denotes the parameter. In equation (23), tap coefficients $w_n$ are obtained using M sets of coefficient-seed data $\beta_{n,1}, \beta_{n,2}, \ldots, \beta_{n,M}$.

Tap coefficients $w_n$ may be obtained using an equation other than equation (23).

Now, let a value $z^{m-1}$ that is determined by the parameter z in equation (23) be defined by the following equation, introducing a new variable $t_m$:

$$t_m = z^{m-1} \; (m=1, 2, \ldots, M) \tag{24}$$

Assigning equation (24) into equation (23) yields the following equation:

$$w_n = \sum_{m=1}^{M} \beta_{m,n} t_m \tag{25}$$

According to equation (25), tap coefficients $w_n$ are obtained by a linear first-order equation using the coefficient-seed data $\beta_{n,m}$ and the variable $t_m$.

Now, letting the true value of the pixel value of a high-quality pixel in a k-th sample be denoted by $y_k$, and a predictive value of the true value $y_k$, obtained by equation (22), as $y_k'$, a prediction error $e_k$ can be expressed by the following equation:

$$e_k = y_k - y_k' \tag{26}$$

Since the predictive value $y_k'$ in equation (26) is obtained according to equation (22), substituting $y_k'$ in equation (26) according to equation (22) yields the following equation:

$$e_k = y_k - \left( \sum_{n=1}^{N} w_n x_{n,k} \right) \tag{27}$$

In equation (27), $x_{n,k}$ denotes an n-th low-quality pixel serving as a prediction tap for a high-quality pixel in the k-th sample.

Substituting $w_n$ in equation (27) with equation (25) yields the following equation:

$$e_k = y_k - \left( \sum_{n=1}^{N} \left( \sum_{m=1}^{M} \beta_{m,n} t_m \right) x_{n,k} \right) \tag{28}$$

Although coefficient-seed data $\beta_{n,m}$ with which the prediction error $e_k$ in equation (28) becomes zero is optimal for predicting a high-quality pixel, it is generally difficult to obtain such coefficient-seed data $\beta_{n,m}$ for every high-quality pixel.

Thus, for example, using the-least square method as a rule for determining the optimality of coefficient-seed data $\beta_{n,m}$, optimal coefficient-seed data $\beta_{n,m}$ can be obtained by minimizing the sum E of square errors, represented by the following equation:

$$E = \sum_{k=1}^{K} e_k^2 \quad (29)$$

In equation (29), K denotes the number of samples (number of samples for learning) of sets of high-quality pixel $y_k$ and low-quality pixels $x_{1,k}, x_{2,k}, \ldots, x_{N,k}$ constituting tap coefficients for the low-quality pixel $y_k$.

The minimum value (minimal value) of the sum E of the square errors in equation (29) is given by $\beta_{n,m}$ with which the sum E is partially differentiated to become zero, as expressed in equation (30):

$$\frac{\partial E}{\partial \beta_{m,n}} = \sum_{k=1}^{K} 2 \cdot \frac{\partial e_k}{\partial \beta_{m,n}} \cdot e_k = 0 \quad (30)$$

Assigning equation (27) into equation (30) yields the following equation:

$$\sum_{k=1}^{K} t_m x_{n,k} e_k = \sum_{k=1}^{K} t_m x_{n,k} \left( y_k - \left( \sum_{n=1}^{N} \left( \sum_{m=1}^{M} \beta_{m,n} t_m \right) x_{n,k} \right) \right) = 0 \quad (31)$$

Now, let $X_{i,p,j,q}$ and $Y_{i,p}$ be defined as expressed in equations (32) and (33):

$$X_{i,p,j,q} = \sum_{k=1}^{K} x_{i,k} t_p x_{j,k} t_q \quad (32)$$

(i=1, 2, ..., N; j=1, 2, ..., N; p=1, 2, ..., M; q=1, 2, ***, M) (32)

$$Y_{i,p} = \sum_{k=1}^{K} x_{i,k} t_p y_k \quad (33)$$

In this case, equation (31) can be expressed by normal equations expressed in equation (34) using $X_{i,p,j,q}$ and $Y_{i,p}$:

$$\begin{bmatrix} X_{1,1,1,1} & X_{1,1,1,2} & \cdots & X_{1,1,1,M} & X_{1,1,2,1} & \cdots & X_{1,1,N,M} \\ X_{1,2,1,1} & X_{1,2,1,2} & \cdots & X_{1,2,1,M} & X_{1,1,2,1} & \cdots & X_{1,2,N,M} \\ \vdots & \vdots & \ddots & \vdots & \vdots & & \vdots \\ X_{1,M,1,1} & X_{1,M,1,2} & \cdots & X_{1,M,1,M} & X_{1,M,2,1} & \cdots & X_{1,M,N,M} \\ X_{2,1,1,1} & X_{2,1,1,2} & \cdots & X_{2,M,1,M} & X_{2,M,2,1} & \cdots & X_{2,M,N,M} \\ \vdots & \vdots & \vdots & \vdots & \vdots & \ddots & \vdots \\ X_{N,M,1,1} & X_{N,M,1,2} & \cdots & X_{N,M,1,M} & X_{N,M,2,M} & \cdots & X_{N,M,N,M} \end{bmatrix}$$

(34)

$$\begin{bmatrix} \beta_{1,1} \\ \beta_{2,1} \\ \vdots \\ \beta_{M,1} \\ \beta_{1,2} \\ \vdots \\ \beta_{M,N} \end{bmatrix} = \begin{bmatrix} Y_{1,1} \\ Y_{1,2} \\ \vdots \\ Y_{1,M} \\ Y_{2,1} \\ \vdots \\ Y_{N,M} \end{bmatrix}$$

The normal equations in equation (34) can be solved for the coefficient-seed data $\beta_{n,m}$ using, for example, the sweep-out method (Gauss-Jordan elimination).

In the data processing unit 22 shown in FIG. 23, the coefficient-seed memory 97 stores coefficient-seed data $\beta_{n,m}$ obtained by performing learning that solves equation (34) with a large number of high-quality pixels $y_1, y_2, \ldots,$ and $y_K$ as teacher data that serve as a teacher in learning and with low-quality pixels $x_{1,k}, x_{2,k}, \ldots,$ and $x_{N,k}$ constituting prediction taps for each high-quality pixel $y_k$ as student data that serves as a student in learning. The coefficient-generating unit 96 generates tap coefficients $w_n$ according to equation (23) based on the coefficient-seed data $\beta_{n,m}$ and the parameter z stored in the parameter memory 98. The prediction unit 95, using low-quality pixels (pixels of image data supplied as input data) $x_n$ constituting prediction taps for a target pixel serving as a high-quality pixel, calculates (a predictive value approximate to) the pixel value of the target pixel serving as a high-quality pixel according to equation (22).

Figure 25:
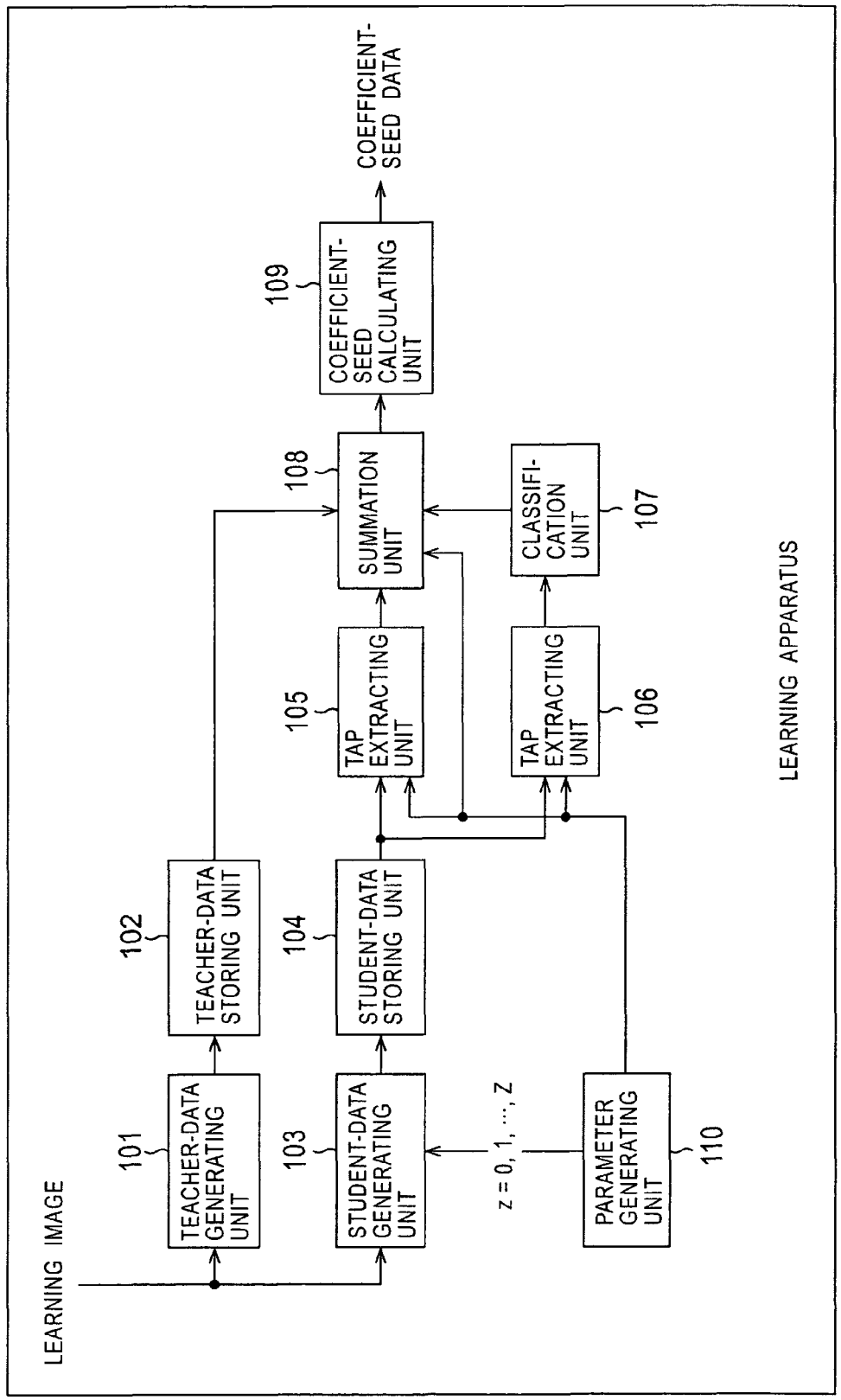
FIG. 25 is a block diagram showing a first example configuration of a learning apparatus for learning coefficient-seed data.

FIG. 25 shows an example configuration of a learning apparatus that performs learning for obtaining coefficient-seed data $\beta_{n,m}$ by forming and solving the normal equations in equation (34).

The learning apparatus receives input of learning-image data that is used for learning of coefficient-seed data $\beta_{n,m}$. As the learning-image data, for example, high-quality image data with a high S/N ratio can be used.

In the learning apparatus, learning-image data is supplied to a teacher-data generating unit 101 and a student-data generating unit 103.

The teacher-data generating unit 101 generates teacher data from the learning-image data supplied thereto, and supplies the teacher data to a teacher-data storing unit 102. More specifically, in this example, the teacher-data generating unit 101 supplies the high-quality image data serving as learning-image data to the teacher-data storing unit 102, as it is as teacher data.

The teacher-data storing unit 102 stores the high-quality image data serving as teacher data, supplied from the teacher-data generating unit 101.

The student-data generating unit 103 generates student data from the learning-image data, and supplies the student data to a student-data storing unit 104. More specifically, the student-data generating unit 103 superposes noise on the high-quality image data serving as learning-image data, thereby generating low-quality image data, and supplies the low-quality image data to the student-data storing unit 104 as student data.

The student-data generating unit 103, in addition to the learning-image data, receives several values in a range of values that a parameter z supplied to the parameter memory 98 shown in FIG. 23 is allowed to take on from a parameter generating unit 110. That is, assuming that the values that a parameter z is allowed to take on are real values in a range of 0 to Z, the student-data generating unit 103 receives, for example, z=0, 1, 2, 3, ..., and Z from the parameter generating unit 110.

The student-data generating unit 103 superposes noise of a level in accordance with a parameter z supplied thereto on the high-quality image data serving as learning-image data, thereby generating low-quality image data that serves as student data.

Figure 26:
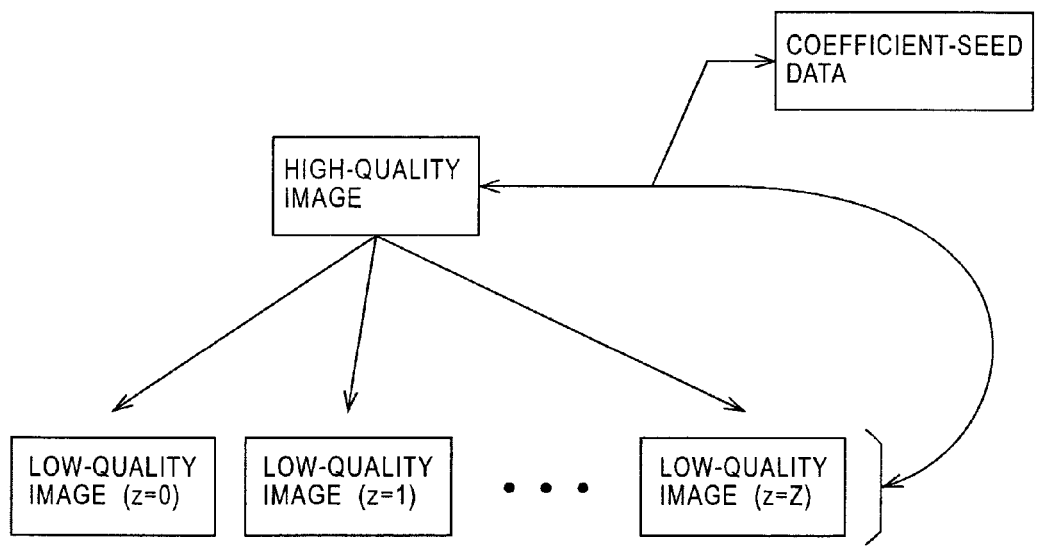
FIG. 26 is a diagram showing how student data is generated.

Thus, in this case, the student-data generating unit 103 generates Z+1 types of low-quality image data that serve as student data, having different amounts of noise, for the high-quality image data serving as learning-image data, as shown in FIG. 26.

Figure 27:
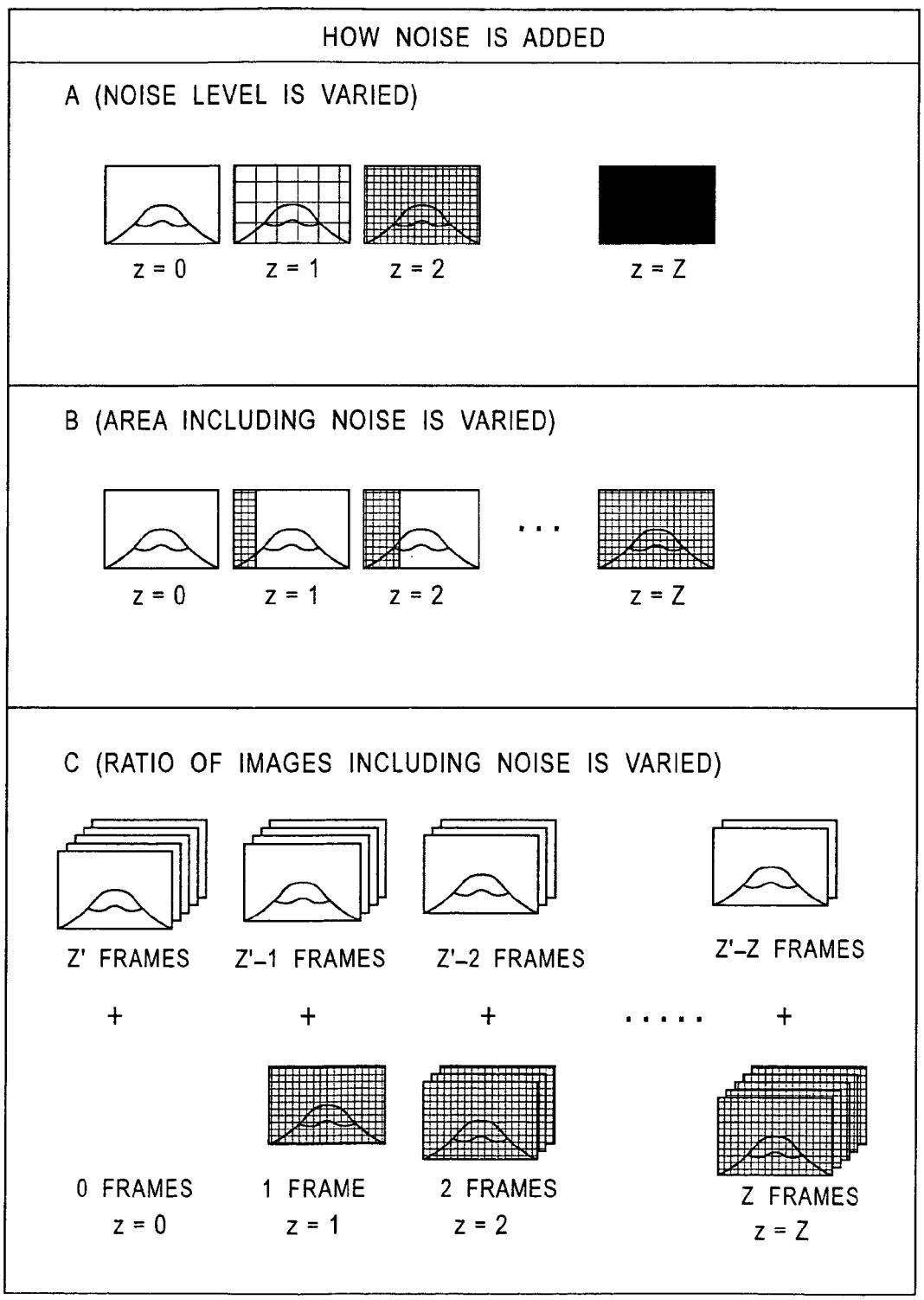
FIG. 27 is a diagram showing how student data is generated.

Now, how the student-data generating unit 103 generates student data on which noise in accordance with the parameter z is superposed will be described with reference to FIG. 27. In FIG. 27, shaded regions represent where noise is superposed, the noise level being higher as the shade becomes denser.

The student-data generating unit 103, for example, as shown in part A of FIG. 27, may generate student data in which the amount of noise is varied in steps by adding noise whose level (amplitude or power) is varied in steps in accordance with the parameter z on the high-quality image data serving as learning-image data.

As another example, as shown in part B of FIG. 27, the student-data generating unit 103 may generate student data in which the amount of noise is varied in steps by varying the image area of the high-quality image data serving as learning-image data where noise of a constant level is added in steps in accordance with the parameter z.

As yet another example, as shown in part C of FIG. 27, the student-data generating unit 103 may generate image data on which noise of a constant level is added and image data on which noise is not added for the high-quality image data serving as learning-image data, and generate Z' ($\geq$Z) frames of image data in which the numbers of frames of image data with noise added and image data without noise added are varied in steps, as student data for a value of the parameter z.

In the embodiment shown in part C of FIG. 27, for one frame of teacher data, Z' frames of student data including (Z'-z) frames of image data with noise added and z frames of image data without noise added are generated.

In this case, as will be described later, summation is performed for each of the Z' frames of student data for each value of the parameter z, repeatedly using the associated one frame of teacher data.

Referring back to FIG. 25, the student-data storing unit 104 stores the student data supplied from the student-data generating unit 103.

A tap extracting unit 105 sequentially selects, as a target teacher pixel, each pixel constituting the high-quality image data serving as teacher data, stored in the teacher-data storing unit 102, extracts predetermined low-quality pixels constituting low-quality image data serving as student data, stored in the student-data storing unit 104, thereby generating prediction taps having the same tap configuration as that formed by the tap extracting unit 91 shown in FIG. 23, and supplies the prediction taps to a summation unit 108.

A tap extracting unit 106 extracts, with respect to the target teacher pixel, predetermined low-quality pixels constituting the low-quality image data serving as student data, stored in the student-data storing unit 104, thereby generating class taps having the same tap configuration as that formed by the tap extracting unit 92 shown in FIG. 23, and supplies the class taps to a classification unit 107.

The tap extracting units 105 and 106 receives a parameter z generated by the parameter generating unit 110. The tap extracting units 105 and 106 generate prediction taps and class taps, respectively, using student data generated in accordance with the parameter z supplied from the parameter generating unit 110 (image data on which noise of a level in accordance with the parameter z is superposed).

The classification unit 107 performs classification based on the class taps output from the tap extracting unit 106, similarly to the classification unit 93 shown in FIG. 23, and outputs a class code corresponding to a class determined to the summation unit 108.

The summation unit 108 reads the target teacher pixel from the teacher-data storing unit 102, and performs summation using the target teacher pixel, student data constituting prediction taps for the target teacher pixel, supplied from the tap extracting unit 105, supplied from the tap extracting unit 105, and the parameter z with which the student data has been generated, for each class code supplied from the classification unit 107.

That is, in addition to the teacher data $y_k$ stored in the teacher-data storing unit 102, the prediction taps $x_{i,k}$ ($x_{j,k}$) output from the tap extracting unit 105, and the class code output from the classification unit 107, the summation unit 108 receives the parameter z used for generating the student data constituting the prediction taps from the parameter generating unit 110.

The summation unit 108, for each class corresponding to the class code supplied from the classification unit 107, using the prediction taps (student data) $x_{i,k}$ ($x_{j,k}$) and the parameter z, performs a calculation corresponding to multiplication of the student data and the parameter z ($x_{i,k} t_p x_{j,k} t_q$) and summation ($\Sigma$) to obtain a component $X_{i,p,j,q}$ of the matrix on the left-hand side of equation (34), defined by equation (32). $t_p$ in equation (32) is calculated from the parameter z according to equation (24), and so is $t_q$ in equation (32).

Furthermore, the summation unit 108, for each class corresponding to the class code supplied from the classification unit 107, using the prediction taps (student data) $x_{i,k}$, the teacher data $y_k$, and the parameter z, performs a calculation corresponding to multiplication of the student data $x_{i,k}$, the teacher data $y_k$, and the parameter z ($x_{i,k} t_p y_k$) and a summation ($\Sigma$) to obtain a component $Y_{i,p}$ of the vector on the right-hand side of equation (34), defined by equation (33). $t_p$ in equation (33) is calculated from the parameter z according to equation (24).

More specifically, the summation unit 108, in an internal memory (not shown) thereof, stores the component $X_{i,p,j,q}$ of the matrix on the left-hand side of equation (34) and the component $Y_{i,p}$ of the vector on the right-hand side thereof, calculated for the teacher data selected as a target teacher pixel in the previous iteration. To the component $X_{i,p,j,q}$ of the matrix or the component $Y_{i,p}$ of the vector, the summation unit 108 adds a corresponding component $x_{i,k} t_p x_{j,k} t_q$ or $x_{i,k} t_p y_k$ calculated for the teacher data that has newly been selected as a target teacher pixel using the teacher data $y_k$, the student data $x_{i,k}$($x_{j,k}$) and the parameter z (performs an addition represented by summation in the component $X_{i,p,j,q}$ in equation (32) or the component $Y_{i,p}$ in equation (33)).

The summation unit 108 performs the summation described above for all the values of the parameters 0, 1, ..., and Z, using all the teacher data stored in the teacher-data storing unit 102 as a target teacher pixel, thereby generating the normal equations expressed in equation (34) for each class, and supplies the normal equations to a coefficient-seed calculating unit 109.

The coefficient-seed calculating unit 109 solves the normal equations for each class, supplied from the summation unit 108, and generates and outputs coefficient-seed data $\beta_{m,n}$ for each class.

The parameter generating unit 110 generates several values in the range of values that a parameter z supplied to the parameter memory 98 shown in FIG. 23 is allowed to take on, for example, z=0, 1, 2, ..., and Z as described above, and supplies the values to the student-data generating unit 103. Furthermore, the parameter generating unit 110 supplies the parameter z generated to the tap extracting units 105 and 106 and the summation unit 108.

Figure 28:
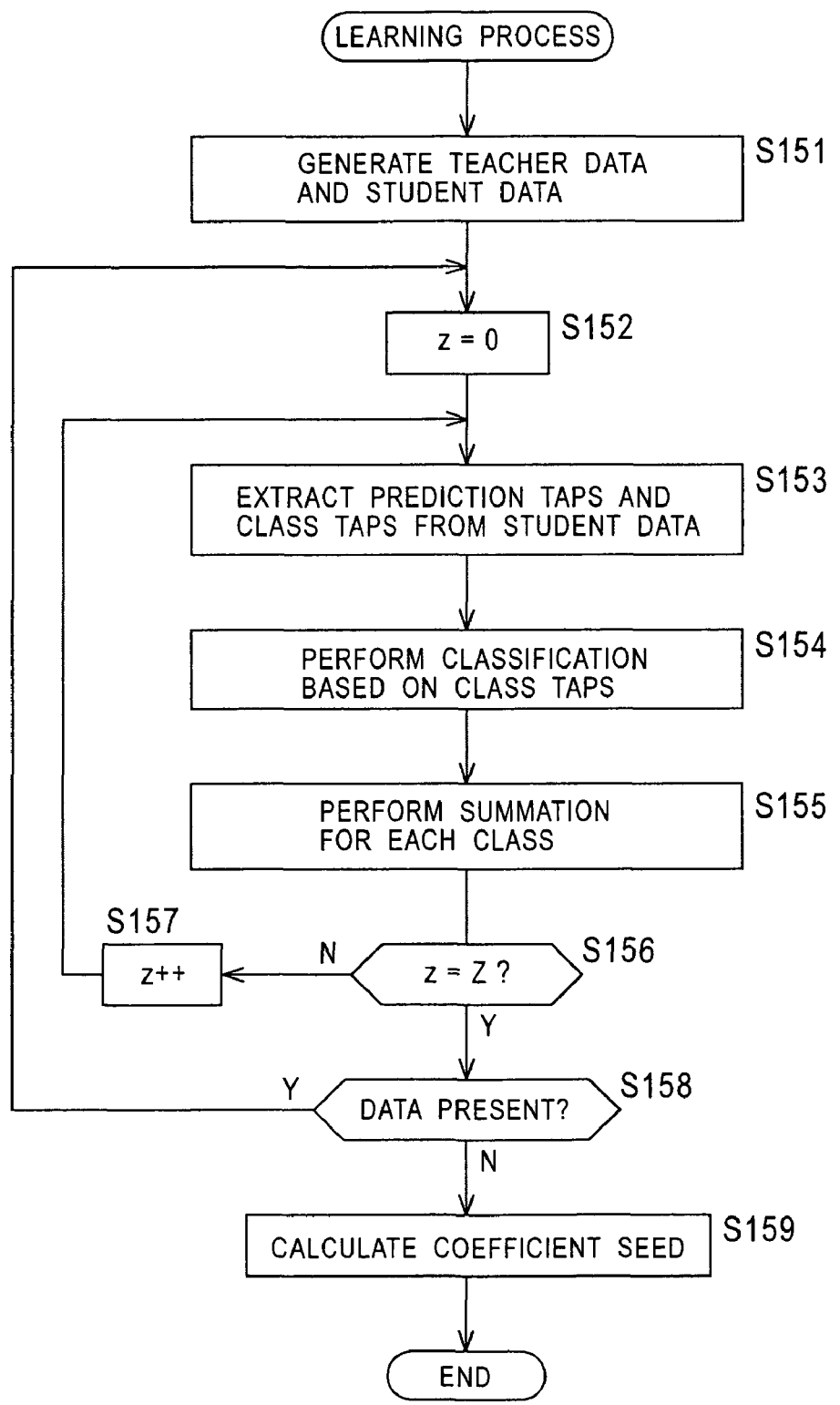
FIG. 28 is a flowchart showing a process of learning coefficient-seed data.

Next, processing that is executed by the learning apparatus shown in FIG. 25 (learning process) will be described with reference to a flowchart shown in FIG. 28.

First, in step S151, the teacher-data generating unit 101 and the student-data generating unit 103 generate and output teacher data and student data from learning-image data, respectively. More specifically, the teacher-data generating unit 101 outputs the learning-image data as it is as teacher data. The student-data generating unit 101 receives Z+1 values of the parameter z generated by the parameter generating unit 110, and the student-data generating unit 101 superposes on the learning-image data noises corresponding to the Z+1 values (0, 1, ..., and Z) of the parameter Z, thereby generating and outputting Z+1 frames of student data for each frame of teacher data (learning-image data). (Note, however, that in the case shown in part C of FIG. 27, described earlier, Z' frames of student data are generated for each value of the parameter z.)

The teacher data output from the teacher-data generating unit 101 is supplied to and stored in the teacher-data storing unit 102, and the student data output from the student-data generating unit 103 is supplied to and stored in the student-data storing unit 104.

Then, the procedure proceeds to step S152. In step S152, the parameter generating unit 110 sets an initial value, for example, 0, in the parameter z, and supplies the parameter z to the tap extracting units 105 and 106 and the summation unit 108. The procedure then proceeds to step S153. In step S153, the tap extracting unit 105 selects, as a target teacher pixel, a pixel that has not been selected as a target teacher pixel among the teacher data stored in the teacher-data storing unit 102. Furthermore, in step S153, the tap extracting unit 105 generates prediction taps for the target teacher pixel from the student data for the parameter z output from the parameter generating unit 110 (student data generated by superposing a noise corresponding to the parameter z on the learning-image data corresponding to the teacher data that has been selected as the target teacher pixel), stored in the student-data storing unit 104, and supplies the prediction taps to the summation unit 108. Also, the tap extracting unit 106 generates class taps for the target teacher pixel form the student data for the parameter z output from the parameter generating unit 110, stored in the student-data storing unit 104, and supplies the class taps to the classification unit 107.

The procedure then proceeds to step S154. In step S154, the classification unit 107 classifies the target teacher pixel based on the class taps for the target teacher pixel, and outputs a class code corresponding to the class determined to the summation unit 108. The procedure then proceeds to step S155.

In step S155, the summation unit 108 reads the target teacher pixel from the teacher-data storing unit 102, and calculates the component $X_{i,K}t_p x_{j,K} t_q$ of the matrix on the left-hand side of equation (34) and the component $x_{i,K} t_p y_K$ of the vector on the right-hand side thereof, using the target teacher pixel, the prediction taps supplied from the tap extracting unit 105, and the parameter z output from the parameter generating unit 110. Furthermore, to components associated with the class code from the classification unit 107 among the components of the matrix and the components of the vector that have already been calculated, the summation unit 108 adds the component $x_{i,K}t_p x_{j,K} t_q$ of the matrix and the component $x_{i,K}t_p y_K$ of the vector calculated from the target pixel, the prediction taps, and parameter z. The procedure then proceeds to step S156.

In step S156, the parameter generating unit 110 determines whether the parameter z it is outputting equals the possible maximum value Z thereof. If it is determined in step S156 that the parameter z being output by the parameter generating unit 110 does not equal the maximum value Z (is smaller than the maximum value Z), the procedure proceeds to step S157. In step S157, the parameter generating unit 110 adds 1 to the parameter z, and outputs the result of addition as a new parameter to the tap extracting units 105 and 106 and the summation unit 108. The procedure then returns to step S153, and the same procedure is repeated.

On the other hand, if it is determined in step S156 that the parameter z equals the maximum value Z, the procedure proceeds to step S158. In step S158, the tap extracting unit 105 determines whether any teacher data that has not yet been selected as a target teacher pixel is stored in the teacher-data storing unit 102. If it is determined in step S158 that teacher data that has not yet been selected as a target teacher pixel is stored in the teacher-data storing unit 102, the tap extracting unit 105 selects the teacher data that has not yet been selected as a target teacher pixel as a new target teacher pixel. The procedure then returns to step S152, and the same procedure is repeated.

On the other hand, if it is determined in step S158 that teacher data that has not yet been selected as a target teacher pixel is not stored in the teacher-data storing unit 102, the summation unit 108 supplies to the coefficient-seed calculating unit 109 the matrix on the left-hand side and the vector on the right-hand side of equation (34) for each class, obtained by the processing up to that time. The procedure then proceeds to step S159.

In step S159, the coefficient-seed calculating unit 109 solves the normal equations for each class, formed by the matrix on the left-hand side and the vector on the right-hand side of equation (34) for each class, supplied from the summation unit 108, thereby obtaining and outputting coefficient-seed data $\beta_{m,n}$ for each class. The procedure is then exited.

It is possible that a sufficient number of normal equations for obtaining coefficient-seed data cannot be obtained for some classes due to, for example, an insufficient number of sets of learning-image data. As for those classes, the coefficient-seed calculating unit 109 outputs, for example, default coefficient-seed data.

In the learning apparatus shown in FIG. 25, as shown in FIG. 26, the high-quality image data serving as learning-image data is used as teacher data, and the low-quality image data obtained by superposing a noise corresponding to the parameter z on the high-quality image data is used as student data, and learning is performed so as to directly obtain coefficient-seed data $\beta_{m,n}$ that minimizes the sum of square errors of the predictive values y of the teacher data, predicted according to the linear first-order equation in equation (22) from the tap coefficients $w_n$ represented by equation (25) using the coefficient-seed data $\beta_{m,n}$ and the variable $t_m$ corresponding to the parameter z and from the student data $x_n$. Alternatively, for example, coefficient-seed data $\beta_{m,n}$ may be learned as shown in FIG. 29.

Figure 29:
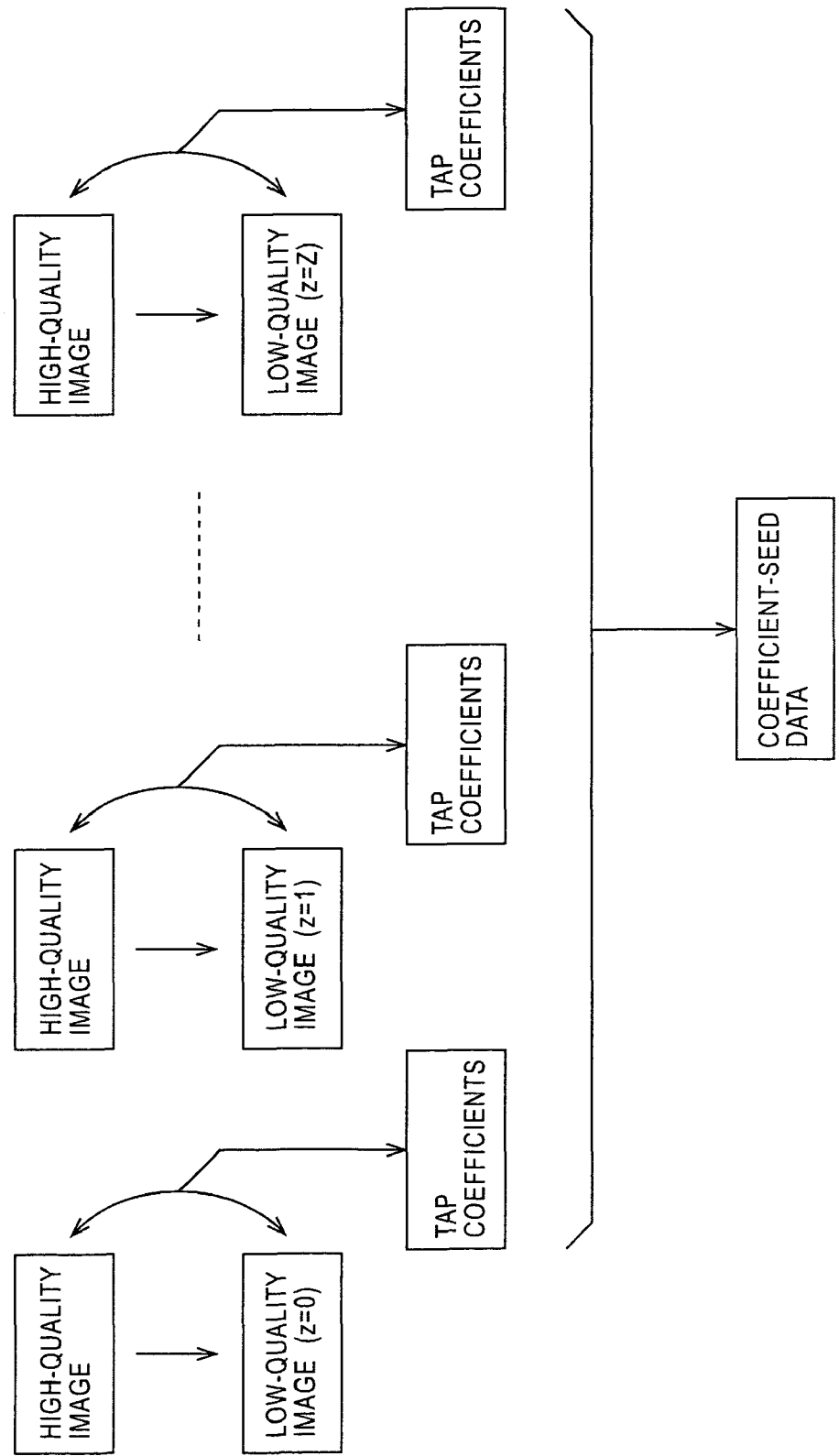
FIG. 29 is a diagram showing how coefficient-seed data is learned.

That is, in the embodiment shown in FIG. 29, similarly to the embodiment shown in FIG. 26, the high-quality image data supplied as learning-image data is used as teacher data, and the low-quality image data obtained by superposing a noise corresponding to the parameter z on the high-quality image data is used as student data. First, for each value of the parameter z (z=0, 1, . . . , Z herein), tap coefficients $w_n$ that minimize the sum of square errors of the predictive values y predicted by a linear first-order calculation according to equation (22) using the tap coefficients $w_n$ and the student data are obtained. Furthermore, in the embodiment shown in FIG. 29, using the tap coefficients $w_n$ calculated as teacher data and the parameter z as student data, learning is performed to obtain coefficient-seed data $\beta_{m,n}$ that minimizes the sum of square errors of the predictive values of the tap coefficients $w_n$ that serve as teacher data, predicted according to equation (25) using the coefficient-seed data $\beta_{m,n}$ and the variable tm corresponding to the parameter z serving as student data.

More specifically, tap coefficients $w_n$ with which the sum E of square errors of the predictive values y of the teacher data, predicted according to the linear first-order equation in equation (22), expressed by equation (29) given earlier, becomes minimum (minimal) are tap coefficients $w_n$ with which the sum E is partially differentiated to become 0.

Thus, the following equation must be satisfied:

$$\frac{\partial E}{\partial w_n} = e_1 \frac{\partial e_1}{\partial w_n} + e_2 \frac{\partial e_2}{\partial w_n} + \cdots + e_k \frac{\partial e_n}{\partial w_n} = 0 \quad (35)$$
$$(n = 1, 2, \cdots, N)$$

Partially differentiating equation (27) given earlier with the tap coefficients $w_n$ yields the following equation:

$$\frac{\partial e_k}{\partial w_1} = -x_{1,k}, \frac{\partial e_k}{\partial w_2} = -x_{2,k}, \cdots, \frac{\partial e_k}{\partial w_N} = -x_{N,k}, \quad (36)$$
$$(k = 1, 2, \cdots, K)$$

From equations (35) and (36), the following equation is obtained:

$$\sum_{k=1}^{K} e_k x_{1,k} = 0, \sum_{k=1}^{K} e_k x_{2,k} = 0, \cdots \sum_{k=1}^{K} e_k x_{N,k} = 0 \quad (37)$$

By assigning equation (27) to $e_k$ in equation (37), equation (37) can be expressed by normal equations in equation (38):

$$\begin{bmatrix} \left(\sum_{k=1}^{K} x_{1,k}x_{1,k}\right) & \left(\sum_{k=1}^{K} x_{1,k}x_{2,k}\right) & \cdots & \left(\sum_{k=1}^{K} x_{1,k}x_{N,k}\right) \\ \left(\sum_{k=1}^{K} x_{2,k}x_{1,k}\right) & \left(\sum_{k=1}^{K} x_{2,k}x_{2,k}\right) & \cdots & \left(\sum_{k=1}^{K} x_{2,k}x_{N,k}\right) \\ \vdots & \vdots & \ddots & \vdots \\ \left(\sum_{k=1}^{K} x_{N,k}x_{1,k}\right) & \left(\sum_{k=1}^{K} x_{N,k}x_{2,k}\right) & \cdots & \left(\sum_{k=1}^{K} x_{N,k}x_{N,k}\right) \end{bmatrix} \quad (38)$$

-continued $$\begin{bmatrix} w_1 \\ w_2 \\ \vdots \\ w_N \end{bmatrix} = \begin{bmatrix} \left(\sum_{k=1}^{K} x_{1,k}y_k\right) \\ \left(\sum_{k=1}^{K} x_{2,k}y_k\right) \\ \vdots \\ \left(\sum_{k=1}^{K} x_{N,k}y_k\right) \end{bmatrix}$$

The normal equations in equation (38), similarly to the normal equations in equation (34), can be solved for the tap coefficients $w_n$ by, for example, the sweep-out method (Gauss-Jordan elimination).

By solving the normal equations in equation (38), optimal tap coefficients (tap coefficients that minimize the sum E of square errors herein) $w_n$ are obtained for each class and for each value of the parameter z (z=0, 1, . . . , and Z).

In this embodiment, tap coefficients are calculated according to equation (25) from the coefficient-seed data $\beta_{m,n}$ and the variable $t_m$ corresponding to the parameter z. Now, letting the tap coefficients calculated according to equation (25) be denoted by $w_n'$, coefficient-seed data $\beta_{m,n}$ with which an error $e_n$ between optimal tap coefficients $w_n$ and tap coefficients $w_n'$ calculated according to equation (25) becomes 0 is optimal for obtaining optimal tap coefficients $w_n$. However, it is generally difficult to obtain such coefficient-seed data $\beta_{n,m}$ for every tap coefficients $w_n$.

$$e_n = w_n - w_n' \quad (39)$$

Using equation (25), equation (39) can be rearranged into the following equation:

$$e_n = w_n - \left(\sum_{m=1}^{M} \beta_{m,n} t_m\right) \quad (40)$$

Thus, for example, using the least-square method as a rule for determining the optimality of coefficient-seed data $\beta_{n,m}$, optimal coefficient-seed data $\beta_{n,m}$ can be determined by minimizing the sum E of square errors represented by the following equation:

$$E = \sum_{n=1}^{N} e_n^2 \quad (41)$$

The minimum (minimal) value of the sum E of square errors in equation (41) is given by coefficient-seed data $\beta_{n,m}$ with which the sum E is partially differentiated to become 0, as expressed in equation (42).

$$\frac{\partial E}{\partial \beta_{m,n}} = \sum_{m=1}^{M} 2 \frac{\partial e_n}{\partial \beta_{m,n}} \cdot e_n = 0 \quad (42)$$

Assigning equation (40) into equation (42) yields the following equation:

$$\sum_{m=1}^{M} t_m \left( w_n - \left( \sum_{m=1}^{M} \beta_{m,n} t_m \right) \right) = 0 \quad (43)$$

Now, let $X_{i,j}$ and $Y_i$ be defined as expressed in equations (44) and (45):

$$X_{i,j} = \sum_{z=0}^{Z} t_i t_j \quad (i = 1, 2, \cdots, M : j = 1, 2, \cdots, M) \quad (44)$$

$$Y_i = \sum_{z=0}^{Z} t_i w_n \quad (45)$$

In this case, equation (43) can be expressed by the normal equations in equation (46) using $X_{i,j}$ and $Y_i$:

$$\begin{bmatrix} X_{1,1} & X_{1,2} & \cdots & X_{1,M} \\ X_{2,1} & X_{2,1} & \cdots & X_{2,2} \\ \vdots & \vdots & \ddots & \vdots \\ X_{M,1} & X_{M,2} & \cdots & X_{M,M} \end{bmatrix} \begin{bmatrix} \beta_{1,n} \\ \beta_{2,n} \\ \vdots \\ \beta_{M,n} \end{bmatrix} = \begin{bmatrix} Y_1 \\ Y_2 \\ \vdots \\ Y_M \end{bmatrix} \quad (46)$$

The normal equations in equation (46) can also be solved for the coefficient-seed data $\beta_{n,m}$ using, for example, the sweep-out method (Gauss-Jordan elimination).

Figure 30:
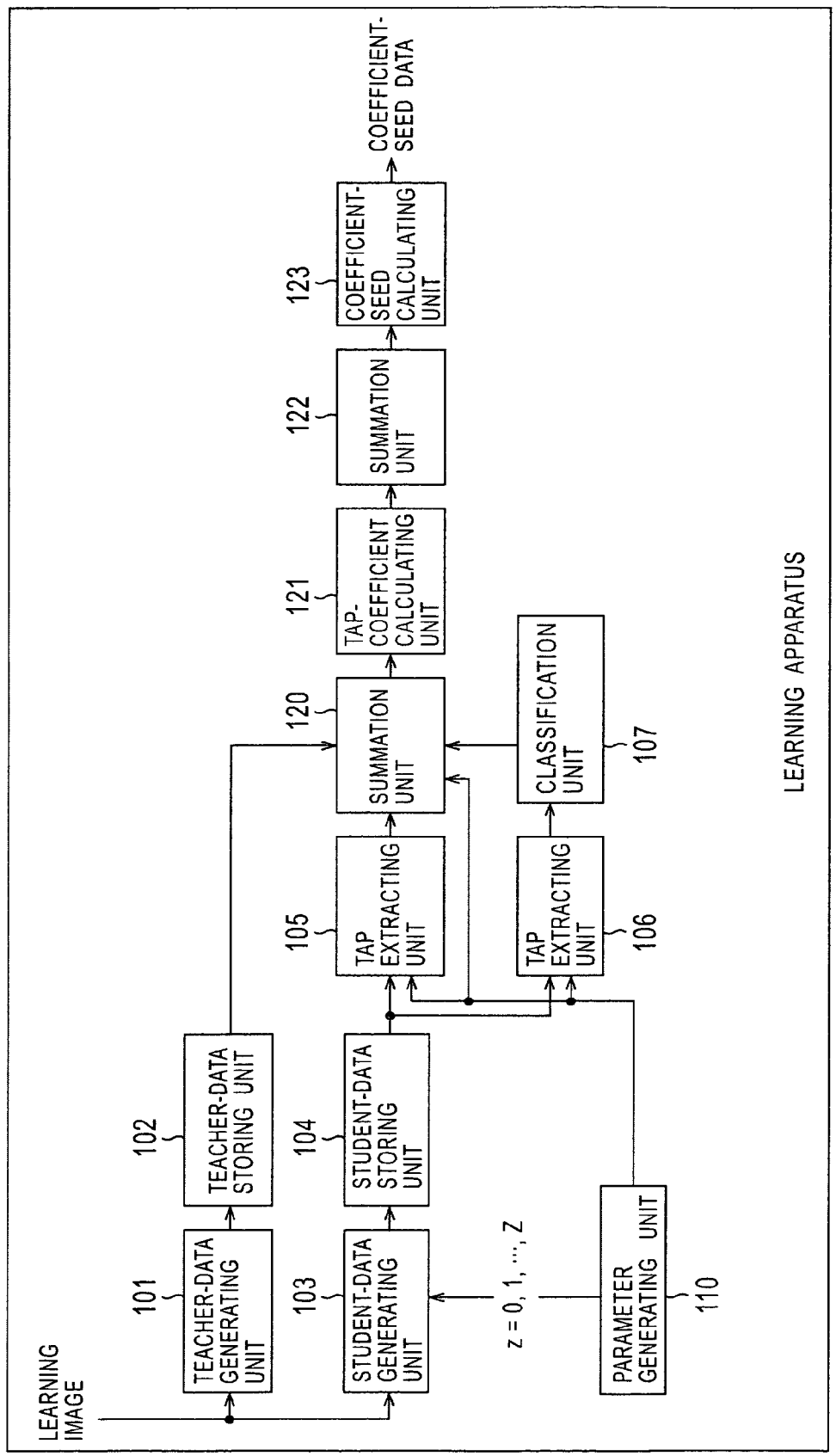
FIG. 30 is a block diagram showing a second example-configuration of the learning apparatus for learning coefficient-seed data.

FIG. 30 shows an example configuration of a learning apparatus that performs learning for obtaining coefficient-seed data $\beta_{n,m}$ by forming and solving the normal equations in equation (46). In the figure, parts corresponding to those shown in FIG. 25 are designated by the same numerals, and descriptions thereof will hereinafter be omitted when appropriate.

A summation unit 120 receives a class code for a target teacher pixel output from the classification unit 107 and a parameter z output from the parameter generating unit 110. The summation unit 120 reads the target teacher pixel from the teacher-data storing unit 102, and performs summation using the target teacher pixel and student data constituting prediction taps for the target teacher pixel, supplied from the tap extracting unit, for each class code supplied from the classification unit 107 and for each value of the parameter z output from the parameter generating unit 110.

That is, the summation unit 120 receives the teacher data $y_k$ stored in the teacher-data storing unit 102, the prediction taps $x_{n,k}$ output from the tap extracting unit 105, the class code output from the classification unit 107, and the parameter z used for generating the student data for generating the prediction taps, output from the parameter generating unit 110.

The summation unit 120, for each class corresponding to the class code supplied from the classification unit 107, and for each value of the parameter z output from the parameter generating unit 110, performs a calculation corresponding to multiplication of the student data $x_{n,k}$ and the teacher data $y_k$ ($x_{n,k}y_k$) of the vector on the right-hand side of equation (38) and summation ($\Sigma$), using the prediction taps (student data) $x_{n,k}$ and the teacher data $y_k$.

More specifically, the summation unit 120, in an internal memory (not shown) thereof, stores the component ($\Sigma x_{n,k}, x_{n'k}$) of the matrix on the left-hand side of equation (38) and the component ($\Sigma x_{n,k}y_k$) of the vector on the right-hand side thereof, calculated for the teacher data selected as a target teacher pixel in the previous iteration. To the component ($\Sigma x_{n,k}, x_{n'k}$) of the matrix or the component ($\Sigma x_{n,k}y_k$) of the vector, the summation unit 120 adds a corresponding component $\rho x_{n,k+1}, x_{n'k+1}$ or $\Sigma x_{n,k+1}y_{k+1}$ calculated using the teacher data $y_{k+1}$ and the student data $x_{n,k+1}$ for the teacher data that has been newly selected as a target teacher pixel (performs an addition represented by summation in equation (38)).

The summation unit 120 performs the summation described above using all the teacher data stored in the teacher-data storing unit 102 as a target teacher pixel, thereby forming the normal equations in equation (38) for each class and for each value of the parameter z, and supplies the normal equations to a tap-coefficient calculating unit 121.

The tap-coefficient calculating unit 121 solves the normal equations for each class and for each class of the parameter z, supplied from the summation unit 120, thereby obtaining optimal tap coefficients $w_n$ for each class and for each value of the parameter z, and supplies the tap coefficients $w_n$ to a summation unit 122.

The summation unit 122 performs summation for each class using the parameter z (variable $t_m$ corresponding thereto) and the optimal tap coefficients $w_n$.

More specifically, the summation unit 122, using a variable $t_i$ ($t_j$) calculated from the parameter z according to equation (24), performs a calculation for each class, corresponding to square of the variable $t_i$ ($t_j$) corresponding to the parameter z and summation ($\Sigma$) for obtaining the component $X_{i,j}$ of the matrix on the left-hand side of equation (46), defined by equation (44).

The component $X_{i,j}$ is determined only by the parameter z and does not depend on class, so that the component $X_{i,j}$ need not actually be calculated for each class, and calculating just once suffices.

Furthermore, the summation unit 122, using the variable $t_i$ calculated from the parameter z according to equation (24) and the optimal tap coefficients $w_n$, performs for each class a calculation corresponding to multiplication of the variable $t_i$ corresponding to the parameter z and the optimal tap coefficients $w_n$ ($t_i w_n$) and summation ($\Sigma$) for obtaining the component $Y_i$ of the vector on the right-hand side of equation (46), defined by equation (45).

The summation unit 122 calculates the component $X_{i,j}$ represented by equation (44) and the component $Y_i$ represented by equation (45), thereby forming the normal equations in equation (46) for each class, and supplies the normal equations to a coefficient-seed calculating unit 123.

The coefficient-seed calculating unit 123 solves the normal equations in equation (46) for each class, supplied from the summation unit 122, thereby obtaining coefficient-seed data $\beta_{m,n}$ for each class.

Figure 22:
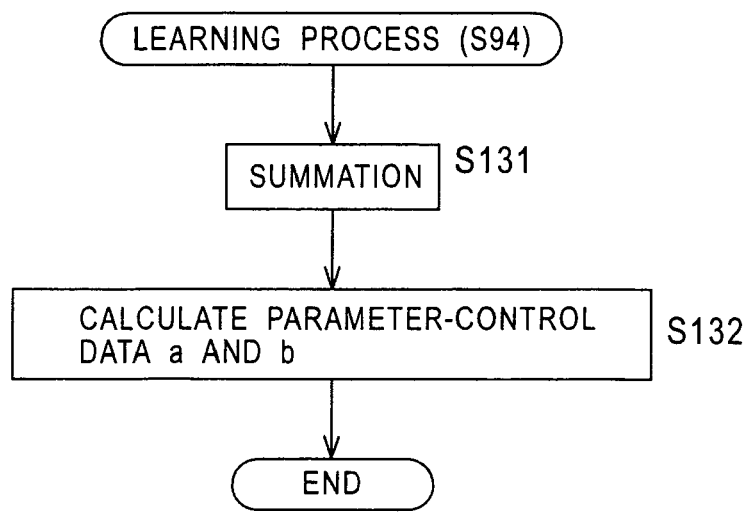
FIG. 22 is a flowchart showing a process of leaning parameter-control data.

The coefficient-seed memory 97 of the data processing unit 22 shown in FIG. 22 may store the coefficient-seed data $\beta_{m,n}$ for each class, obtained as described above.

The arrangement of the data processing unit 22 shown in FIG. 23 may be such, for example, that the coefficient-seed memory 97 is not provided, the optimal tap coefficients $w_n$ optimal for each value of the parameter z, output from the tap-coefficient calculating unit 121 shown in FIG. 30, is stored in a memory, the optimal tap coefficients stored in the memory are selected according to the parameter z stored in the parameter memory 98 and set in the coefficient memory 94. In that case, however, a memory having a large capacity in proportion to the number of values that the parameter z is allowed to take on is required. In contrast, in a case where the coefficient-seed memory 97 is provided and coefficient-seed data is stored therein, the storage capacity of the coefficient-seed memory 97 does not depend on the number of values that the parameter z is allowed to take on, so that a memory having a small capacity can be used as the coefficient-seed memory 97. Furthermore, in a case where coefficient-seed data $\beta_{m,n}$ is stored, tap coefficients $w_n$ are generated from the coefficient-seed data $\beta_{m,n}$ and the value of the parameter z according to equation (23). Thus, continuous tap coefficients $w_n$ in accordance with the value of the parameter z can be obtained. Accordingly, the image quality of image data output by the prediction unit 95 as output data can be adjusted smoothly without steps.

The processing that is executed by the management server 3 in a case where the data processing unit 22 of the user terminal 2 (FIG. 4) is configured as shown in FIG. 23 is the same as the processing in the case where the data processing unit 22 is configured as shown in FIG. 11, except in that the parameter is z in equation (23) for generating tap coefficients $w_n$ instead of the weight W, so that description thereof will be omitted.

Figure 31:
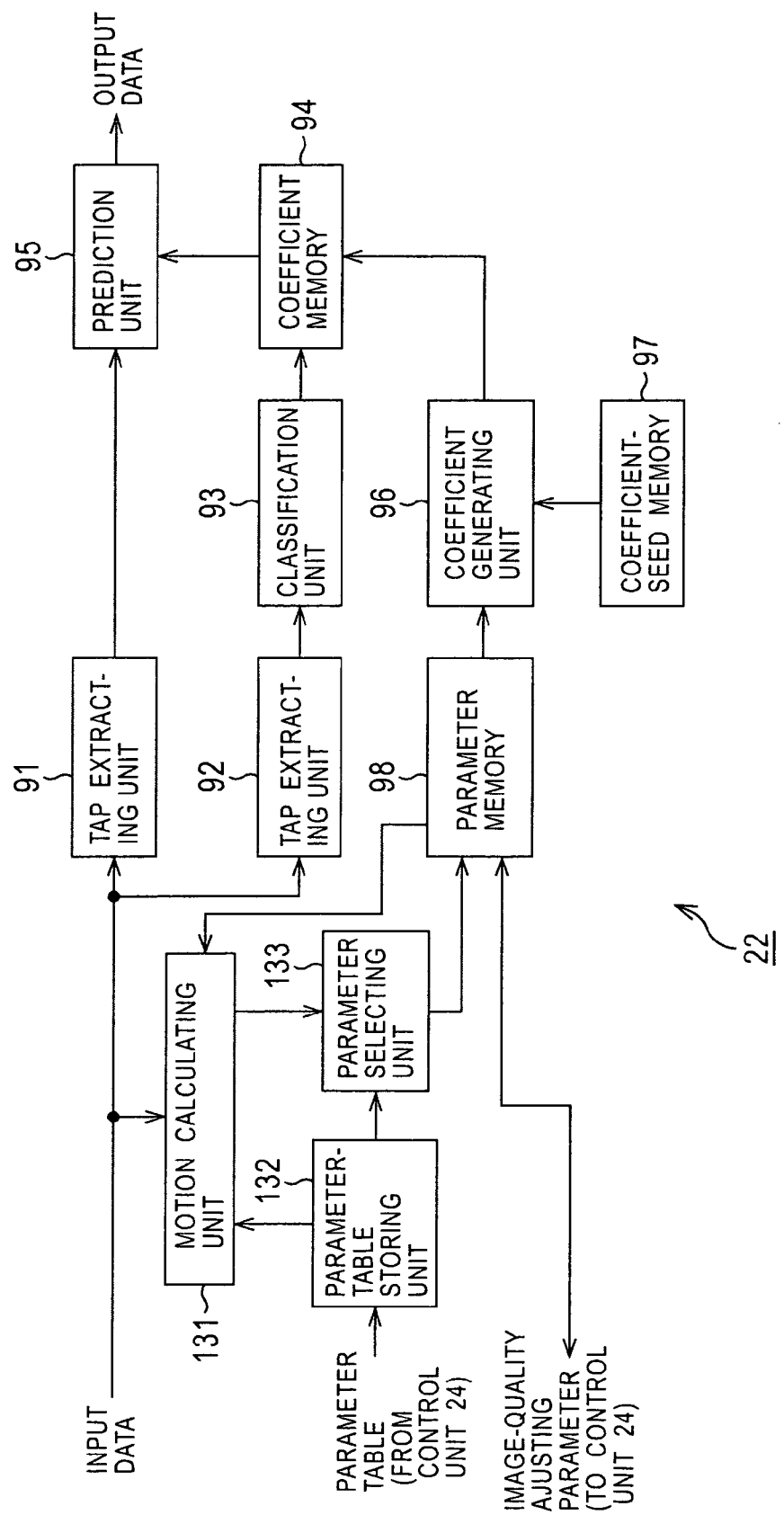
FIG. 31 is a block diagram showing a fourth example configuration of the data processing unit 22.

FIG. 31 shows an example configuration of the data processing unit 22 shown in FIG. 4 in a case where the data processing unit 22 improves the resolution of image data supplied from the broadcast receiving unit 21. In the figure, parts corresponding to those in FIG. 23 are designated by the same numerals, and descriptions thereof will hereinafter be omitted as appropriate. More specifically, the data processing unit 22 shown in FIG. 31 is configured basically the same as that shown in FIG. 23, except in that a motion calculating unit 131, a parameter-table storing unit 132, and a parameter selecting unit 133 are additionally provided.

In the data processing unit 22 shown in FIG. 31, however, in order to improve the resolution of image data as mentioned above, the coefficient-seed memory 97 stores coefficient-seed data for improving the resolution instead of coefficient-seed data for removing noise.

Figure 32:
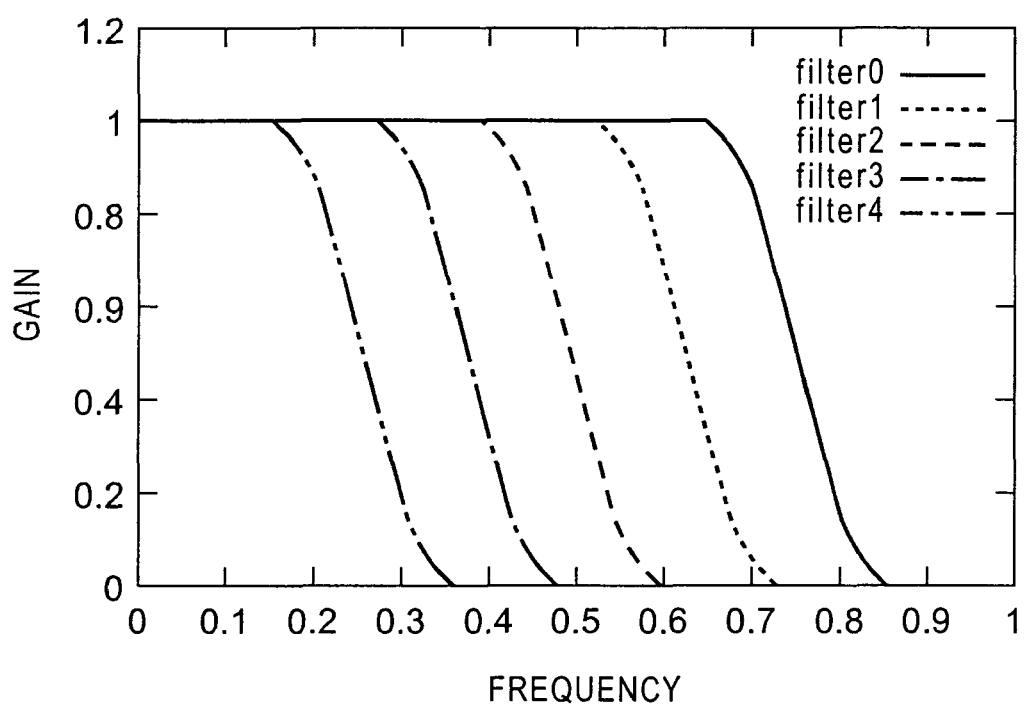
FIG. 32 is a diagram showing characteristics of an LPF.

The coefficient-seed data for improving the resolution is learned in the student-data generating unit 103 of the learning apparatus shown in FIG. 25 or the learning apparatus shown in FIG. 30. For example, as shown in FIG. 32, high-quality image data serving as learning-image data is filtered in the horizontal or vertical direction by LPFs (low pass filters) having different cutoff frequencies depending on values of the parameter z output from the parameter generating unit 110, thereby generating low-quality image data that serves as student data, whereby coefficient-seed data for improving the resolution is obtained.

Regarding learning of coefficient-seed data, coefficient-seed data that allow various processes can be obtained by combinations of teacher data and student data. For example, high-quality image data is used as teacher data, and low-quality image data obtained by distorting the high-quality image data serving as teacher data is used as student data, whereby coefficient-seed data for removing distortion is obtained. As another example, image data is used as teacher data, and DCT coefficients obtained by applying DCT (discrete cosine transform) on the image data serving as teacher data is used as student data, whereby coefficient-seed data for transforming DCT coefficients into image data is obtained. The coefficient-seed memory 97 is capable of storing various kinds of coefficient-seed data as described above, and the data processing unit 22 executes different processes depending on the kinds of coefficient-seed data to be stored in the coefficient-seed memory 97.

In the data processing unit 22 shown in FIG. 31, a parameter z that is input by a user's operation of the image-quality adjusting knob 13 is stored in the parameter memory 98. The prediction unit 95 performs a linear first-order predictive calculation according to equation (22) using tap coefficients $w_n$ that are generated based on the parameter z, that is, performs a linear first-order predictive calculation according to equation (22) using tap coefficients $w_n$ that are generated based on the parameter z set by an operation of the image-quality adjusting knob 13, whereby image data having an improved resolution compared with the image data supplied as input data is obtained.

Furthermore, in the data processing unit 22 shown in FIG. 31, the amount of motion in the image data supplied as input data is calculated, and a parameter z that is optimal for improving the resolution of image data having that motion amount is obtained. Then, the optimal parameter z is stored in the parameter memory 98, and the prediction unit 95 performs a linear first-order predictive calculation according to equation (22) using tap coefficients $w_n$ that are generated based on the parameter z, whereby image data having an improved resolution compared with the image data supplied as input data is obtained.

More specifically, the motion calculating unit 131 receives the image data supplied as input data, calculates the motion amount (amount of change) in the image data supplied as input data, and supplies the motion amount to the parameter selecting unit 133.

The motion amount of the image data may be based on activities such as the sum of absolute values of differences between frames, a dynamic range indicating the difference between the maximum value and the minimum value of pixel values, or the square sum of pixel values. The motion calculating unit 131 may calculate the motion amount of the image data, for example, on a frame-by-frame basis, or on a block-by-block basis by grouping the frames into a plurality of blocks.

The motion calculating unit 131 monitors the parameter memory 98 and the parameter-table storing unit 132 to detect whether a parameter z has newly been supplied to the parameter memory 98 and whether a parameter table, which will be described later, has newly been supplied to the parameter-table storing unit 132. Based on the results of detection, the motion calculating unit 131 switches the operation mode between an automatic mode in which the parameter z to be stored in the parameter memory 98 is changed in accordance with the motion amount of image data supplied as input data and an manual mode in which the parameter z is not changed in accordance with the motion amount.

The parameter-table storing unit 132 stores a parameter table included in server information provided by the management server 3, supplied from the control unit 24 (FIG. 4). More specifically, in this embodiment, server information provided by the management server 3 includes a parameter table serving as parameter-related information, and the control unit 24, upon receiving the server information, supplies the parameter table included in the server information to the parameter-table storing unit 132, where it is stored by overwriting.

The parameter table associates a motion amount of image data with an appropriate parameter z for improving the resolution of image data having that motion amount, and it is generated at the management server 3, as will be described later.

The parameter selecting unit 133, when the operation-mode is the automatic mode, selects a parameter z associated with (a motion amount that is most approximate to) the motion amount supplied from the motion calculating unit 131 from the parameter table in the parameter-table storing unit 132. Furthermore, the parameter selecting unit 133 supplies the parameter z selected to the parameter memory 98, where it is stored by overwriting.

Figure 33:
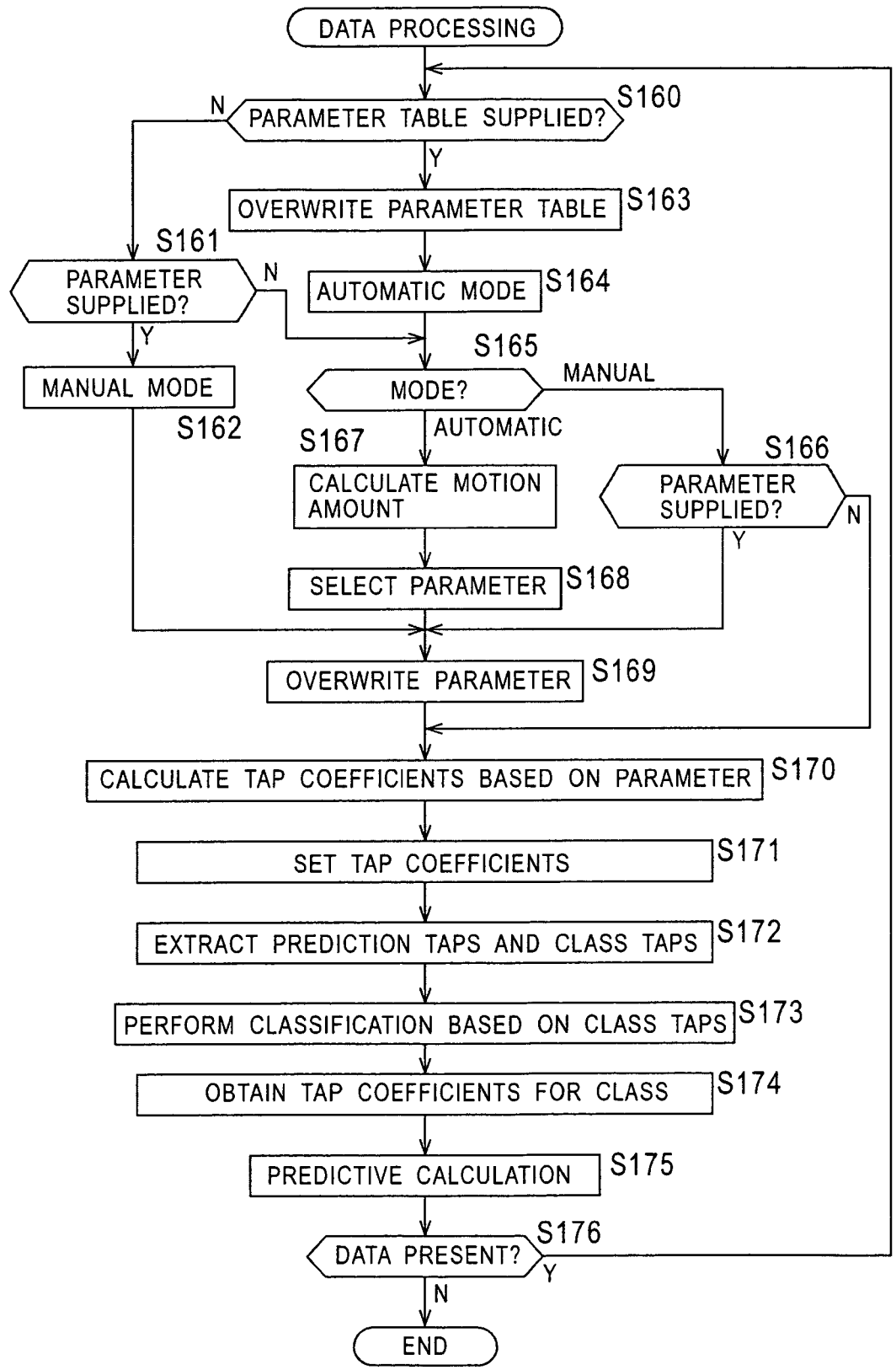
FIG. 33 is a flowchart showing processing that is executed by the data processing unit 22.

Next, data processing that is executed by the data processing unit 22 shown in FIG. 31 will be described with reference to a flowchart shown in FIG. 33.

First, in step S160, the motion calculating unit 131 determines whether a parameter table has been supplied to the parameter-table storing unit 132 from the control unit 24 (FIG. 4). If it is determined in step S160 that a parameter table has not been supplied, the procedure proceeds to step S161. In step S161, the motion calculating unit 131 determines whether a parameter z has been supplied to the parameter memory 98 from the control unit 24 by a user's operation of the image-quality adjusting knob 31.

If it is determined in step S161 that a parameter z has not been supplied, the procedure proceeds to step S165.

On the other hand, if it is determined in step S161 that a parameter z has been supplied, the procedure proceeds to step S162, in which the motion calculating unit 131 sets the operation mode to the manual mode. The procedure then proceeds to step S169. If the operation mode has already been set to the manual mode, the processing in step S162 can be skipped.

In step S169, the parameter memory 98, by overwriting, stores the parameter z determined in step S160 as having been supplied from the control unit 24.

Then, the procedure sequentially goes through steps S170 to S176, in which the same processes as in steps S143 to S149 shown in FIG. 24 are executed, respectively.

Thus, in a case where the operation mode is the automatic mode, when a parameter z has been newly input by a user's operation of the image-quality adjusting knob 31, the operation mode is set to the manual mode. Furthermore, the prediction unit 95 performs a linear first-order predictive calculation according to equation (22) using tap coefficients $w_n$ that are generated based on the parameter z newly input, whereby image data having an improved resolution compared with the image data supplied as input data is obtained.

If it is determined in step S160 that a parameter table has been supplied to the parameter-table storing unit 132 from the control unit 24, the procedure proceeds to step S163. In step S163, the parameter-table storing unit 132 stores the parameter table by overwriting. The procedure then proceeds to step S164.

In step S164, the motion calculating unit 132 sets the operation mode to the automatic mode. The procedure then proceeds to step S165. Thus, when a parameter table has been supplied from the control unit 24, the operation mode is set to the automatic mode.

If the operation mode has already been set to the automatic mode, the processing in step S164 can be skipped.

In step S165, the motion calculating unit 131 determines whether the operation mode is the manual mode or the automatic mode.

If it is determined in step S165 that the operation mode is the manual mode, the procedure proceeds to step S166. In step S166, similarly to step S161, the motion calculating unit 131 determines whether a parameter z has been supplied to the parameter memory 98 from the control unit 24 by a user's operation of the image-quality adjusting knob 31.

If it is determined in step S166 that a parameter z has been supplied, that is, when a parameter z has newly been input by a user's operation of the image-quality adjusting knob 31, the procedure proceeds to step S169. In step S169, the parameter memory 98, by overwriting, stores the parameter z determined in step S166 as having been supplied from the control unit 24.

Then, the procedure sequentially goes through steps S170 to S176, in which the same processes as in steps S143 to S149 shown in FIG. 24 are executed, respectively.

Thus, in a case where the operation mode is the manual mode, when a parameter z has newly been input by a user's operation of the image-quality adjusting knob 31, the prediction unit 95 performs a linear first-order predictive calculation according to equation (22) using tap coefficients $w_n$ that are generated based on the new parameter z, whereby image data having an improved resolution compared with the image data supplied as input data is obtained.

If it is determined in step S166 that a parameter z has not been supplied, the procedure sequentially goes through steps S170 to S176, in which the same processes as in steps S143 to S149 shown in FIG. 24 are executed, respectively.

Thus, in a case where the operation mode is the manual mode, when the user does not operate the image-quality adjusting knob 31, the prediction unit 95 performs a linear first-order predictive calculation according to equation (22) using tap coefficients $w_n$ that are generated based on a parameter z having already been stored in the parameter memory 98, whereby image data having an improved resolution compared with the image data supplied as input data is obtained.

If it is determined in step S165 that the operation mode is the automatic mode, the procedure proceeds to step S167. In step S167, the motion calculating unit 131 calculates the amount of motion in the image data supplied as input data to the tap extracting units 91 and 92, and supplies the motion amount to the parameter selecting unit 133.

Then, the procedure proceeds to step S168. In step S168, the parameter selecting unit 133 selects a parameter z associated with a motion amount that is most approximate to the motion amount supplied from the motion calculating unit 131 from the parameter table stored in the parameter-table storing unit 132, and supplies the parameter z to the parameter memory 98. The procedure then proceeds to step S169.

In step S169, the parameter memory 98, by overwriting, stores the parameter z supplied from the parameter selecting unit 133.

Then, the procedure sequentially goes through steps S170 to S176, in which the same processes as in steps S143 to S149 shown in FIG. 24 are executed, respectively.

Thus, in a case where the operation mode is the automatic mode, a parameter z associated with the motion amount of the image data supplied as input data is selected, and the prediction unit 95 performs a linear first-order predictive calculation according to equation (22) using tap coefficients $w_n$ that are generated based on the parameter z, whereby image data having an improved resolution compared with the image data supplied as input data is obtained.

From what has been described above, with the data processing unit 22 shown in FIG. 31, when the user inputs a parameter z by operating the image-quality adjusting knob 13, image data having an improved resolution compared with the image data supplied as input data is obtained based on the parameter z. When the user obtains server information from the management server 3 by operating the requesting button 14, a parameter z corresponding to the motion amount of the image data supplied as input data is selected from a parameter table included in the server information, and image data having an improved resolution compared with the image data supplied as input data is obtained based on the parameter z selected. Thus, the user is allowed to obtain image data having an adjusted resolution by operating the image-quality adjusting knob 13, and also to obtain image data having a resolution adjusted in accordance with the motion amount of image data supplied as input data based on the parameter table.

Alternatively, the automatic mode and the manual mode may be switched between when, for example, the user operates a predetermined button, not shown, of the remote commander 10 (FIG. 2).

Next, the updating of the user-information database 44 in step S43 shown in FIG. 10, executed by the user-information management unit 43 of the management server 3 (FIG. 9) in a case where the data processing unit 22 of the user terminal 2 (FIG. 4) is configured as shown in FIG. 31, will be described in detail with reference to a flowchart shown in FIG. 34.

First, in step S181, the user-information management unit 43 calculates the motion amount of image data included in status information separated from user information supplied from the control unit 42, similarly to the motion calculating unit 131 shown in FIG. 31.

More specifically, in a case where the data processing unit 22 of the user terminal 2 is configured as shown in FIG. 31, user information similar to that in the case where the data processing unit 22 is configured as shown in FIG. 11 is generated and supplied to the management server 3. In step S181, the motion amount is calculated from image data included in status information of the user information.

The procedure then proceeds to step S182, in which the user-information management unit 43 detects a directory corresponding to a class to which the motion amount calculated in step S181 belongs from the user-information database 44.

More specifically, in the user-information database 44, directories (or records or other segments of storage area) corresponding to a plurality of classes of a predetermined range of motion amount are formed in advance, and in step S182, a directory corresponding to a class to which the motion amount calculated in step S181 belongs is detected.

The procedure then proceeds to step S183, in which the user-information management unit 43 additionally registers in the directory detected in step S182 a parameter z included in the user information supplied from the control unit 42 (provided user information) and the motion amount calculated from the image data included as status information in the provided user information, the parameter z and the motion amount being associated with each other. The procedure is then exited.

Figure 34:
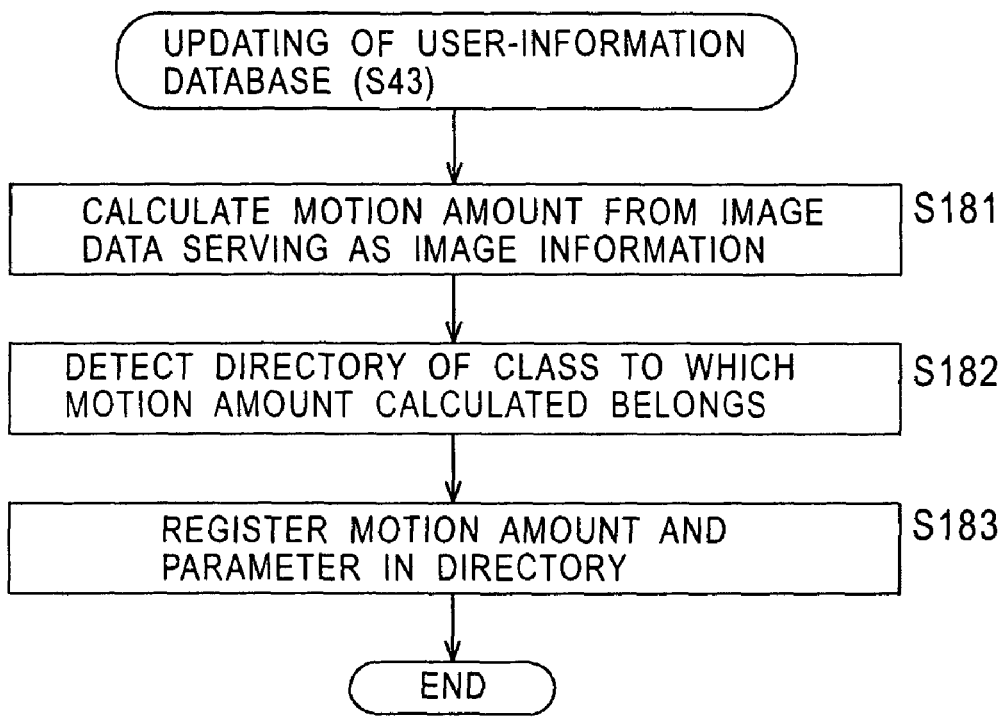
FIG. 34 is a flowchart showing in detail processing that is executed in step S43.

Thus, according to the updating process of the user-information database 44, shown in FIG. 34, the parameter z included in the provided user information is classified on the basis of the motion amount of the image data included in the status information of the provided user information, and is registered in the user-information database 44 accordingly.

Figure 35:
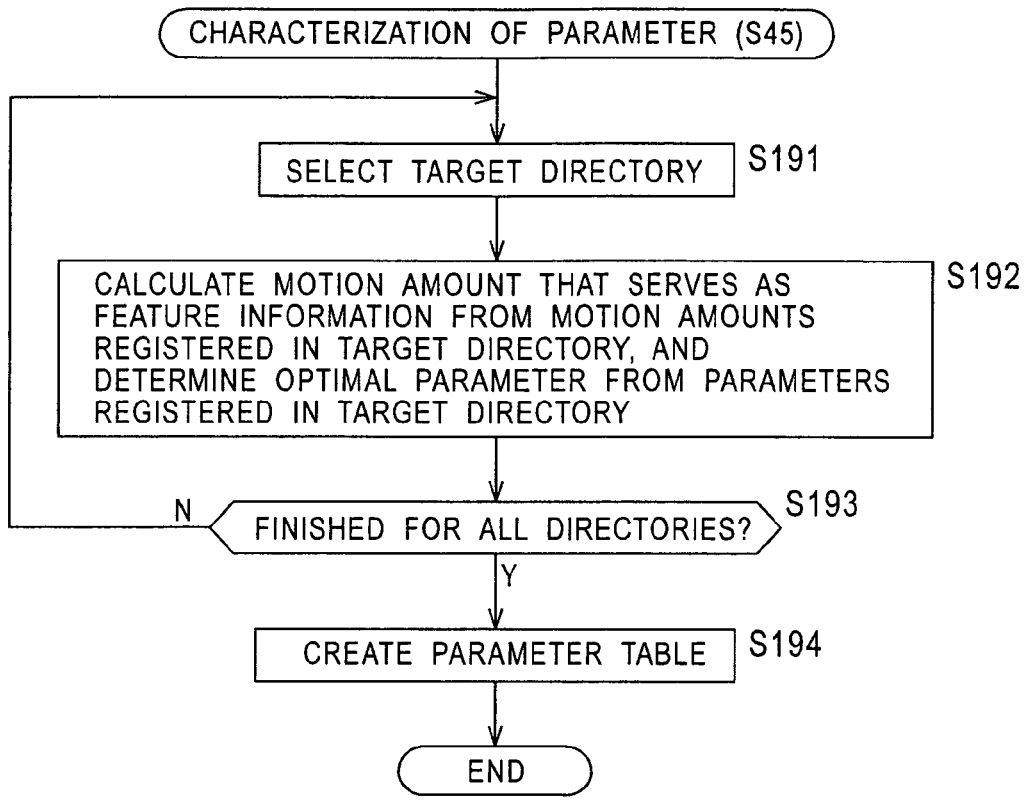
FIG. 35 is a flowchart showing in detail processing that is executed in step S45.

Next, processing that is executed by the characterizing unit 45 of the management server 3 (FIG. 9) in step S45 shown in FIG. 10 in a case where the data processing unit 22 of the user terminal 2 (FIG. 4) is configured as shown in FIG. 31 will be described in detail with reference to a flowchart shown in FIG. 35.

First, in step S191, the characterizing unit 45 selects a target directory corresponding to a class to be processed from among the directories corresponding to the classes of the predetermined range of motion amount, formed in the user-information database 44. The procedure then proceeds to step S192.

In step S192, the characterizing unit 45 calculates, for example, an average value or mode of motion amounts registered in the target directory, which serves as feature information. Furthermore, the characterizing unit 45 calculates, for example, an average value or mode of parameters z registered in the target directory, and associates it, as an optimal parameter, with the motion amount serving as feature information.

The procedure then proceeds to step S193, in which the characterizing unit 45 determines whether all the directories formed in the user-information database 44 have been processed as a target directory.

If it is determined in step S193 that all the directories formed in the user-information database 44 have not been processed as a target directory, the procedure returns to step S191. In step S191, one of the directories that have not been selected as a target directory is newly selected as a target directory, and then the same procedure is repeated.

If it is determined in step S193 that all the directories formed in the user-information database 44 have been processed as a target directory, the procedure proceeds to step S194. In step S194, the characterizing unit 45 creates a parameter table showing a list of motion amounts serving as feature information for the respective directories corresponding to the classes and parameters z associated therewith. The procedure is then exited.

In step S46 shown in FIG. 10, the parameter table in which motion amounts are associated with optimal parameters z, generated as described above, is stored as parameter-related information, by overwriting, in the parameter database 46.

Figure 36:
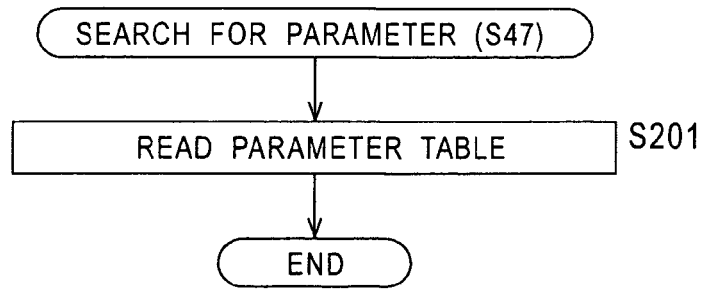
FIG. 36 is a flowchart showing in detail processing that is executed in step S46.

Next, processing that is executed by the server-information providing unit 47 of the management server 3 (FIG. 9) in step S47 shown in FIG. 10 in a case where the data processing unit 22 of the user terminal 2 (FIG. 4) is configured as shown in FIG. 31 will be described in detail with reference to a flowchart shown in FIG. 36.

In step S201, the server-information providing unit 47 reads the parameter table stored in the parameter database 46 and supplies the parameter table to the server-information sending unit 48. The procedure is then exited.

Thus, in step S48 shown in FIG. 10, regardless of the content of request user information transmitted from the user terminal 2, the parameter table stored in the parameter database 46 is included in server information that is transmitted to the user terminal 2.

In the parameter table in the parameter database 46, by the procedure described with reference to FIG. 35, an average value, mode, or the like of parameters z that are set by individual user's operations of the image-quality adjusting knob 13 is registered in association with an average value or mode of motion amounts of image data supplied as input data and processed by the data processing unit 22 when the parameters z are set. Thus, each parameter associated with a motion amount in the parameter table represents an average value or mode of parameters set by a plurality of users by operating the image-quality adjusting knob 13 when image data having the motion amount is processed by the data processing unit 22, and the user terminal 2 having received server information sets a parameter z using the parameter table. Thus, at the user terminal 2, without a user's operation of the image-quality adjusting knob 13, a parameter z that is set by a large number of users for image data of each motion amount, i.e., an optimal parameter z, is automatically set.

Figure 37:
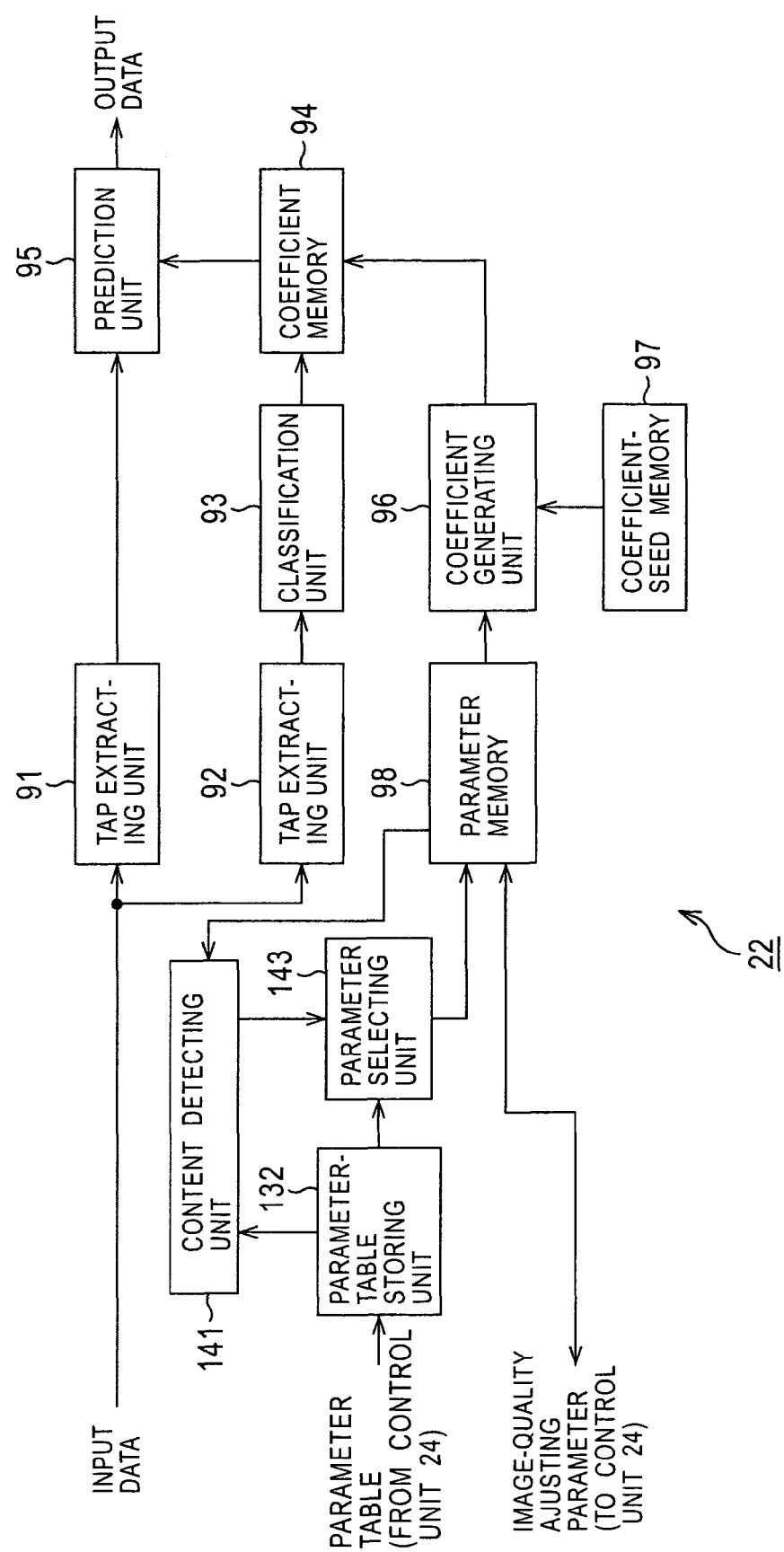
FIG. 37 is a block diagram showing a fifth example configuration of the data processing unit 22.

FIG. 37 shows another example configuration of the data processing unit 22 in a case where the data processing unit 22 shown in FIG. 4 improves the resolution of image data supplied from the broadcast receiving unit 21. In the figure, parts corresponding to those in FIG. 31 are designated by the same numerals, and descriptions thereof will hereinafter be omitted as appropriate. More specifically, the data processing unit 22 shown in FIG. 37 is basically configured the same as that shown in FIG. 31, except in that a content detecting unit 141 and a parameter selecting unit 143 are provided instead of the motion calculating unit 131 and the parameter selecting unit 133, respectively.

In the embodiment shown in FIG. 37, for example, similarly to the case shown in FIG. 31, it is assumed that the parameter memory 98 stores coefficient-seed data for improving the resolution of image data.

In the data processing unit 22 shown in FIG. 37, similarly to the case shown in FIG. 31, a parameter z that is input by a user's operation of the image-quality adjusting knob 13 is stored in the parameter memory 98, and the prediction unit 95 performs a linear first-order predictive calculation according to equation (22) using prediction taps $w_n$ that are generated based on the parameter z, whereby image data having an improved resolution compared with image data supplied as input data is obtained.

Furthermore, in the data processing unit 22 shown in FIG. 37, content information representing the content of the image data supplied as input data, such as a program name of a program including the image data, is obtained, and an optimal parameter z for improving the resolution of the image data including the content represented by the content information is obtained. Then, the optimal parameter z is stored in the parameter memory 98, and the prediction unit 95 performs a linear first-order predictive calculation according to equation (22) using tap coefficients $w_n$ that are generated based on the parameter z, whereby image data having an improved resolution compared with the image data supplied as input data is obtained.

More specifically, the content detecting unit 141 detects content information representing the content of the image data supplied as input data, and supplies the content information to the parameter selecting unit 143. More specifically, for example, the content detecting unit 141 accesses a server, not shown, that is providing a program table of television broadcasting, and detects content information of the image data supplied as input data, based on a channel and time and date of reception by the broadcast receiving unit 21 (FIG. 4). The method of detecting content information is not limited to the above.

The content detecting unit 141, similarly to the motion calculating unit 131 shown in FIG. 31, monitors the parameter memory 98 and the parameter-table storing unit 132, and it detects whether a parameter z has newly been supplied to the parameter memory 98 and whether a parameter table has newly been supplied to the parameter-table storing unit 132. Based on the results of detection, the content detecting unit 141 switches between an automatic mode in which the parameter z to be stored in the parameter memory 98 is changed in accordance with content information of the image data supplied as input data and a manual mode in which the parameter z is not changed in accordance with content information.

The parameter selecting unit 143, when the operation mode is the automatic mode, selects a parameter z associated with the content information supplied from the content detecting unit 141 from the parameter table in the parameter-table storing unit 132. Furthermore, the parameter selecting unit 143 supplies the parameter z selected to the parameter memory 98, where it is stored by overwriting.

In this embodiment, the parameter table that serves as parameter-related information, included in server information provided by the management server 3, associates content information with a parameter z, as will be described later, and the parameter-table storing unit 24 stores the parameter table.

When the data processing unit 22 is configured as shown in FIG. 37, the information providing unit 27 shown in FIG. 4 obtains not the image data supplied as input data but content information of the image data, and the user-information generating unit 31 includes the content information as status information in user information. Thus, for example, when the user sets a parameter z by operating the image-quality adjusting knob 13 (stores the parameter z in the parameter memory 98), content information of image data input to the data processing unit 22 when the parameter z is set is included as status information in user information.

Figure 38:
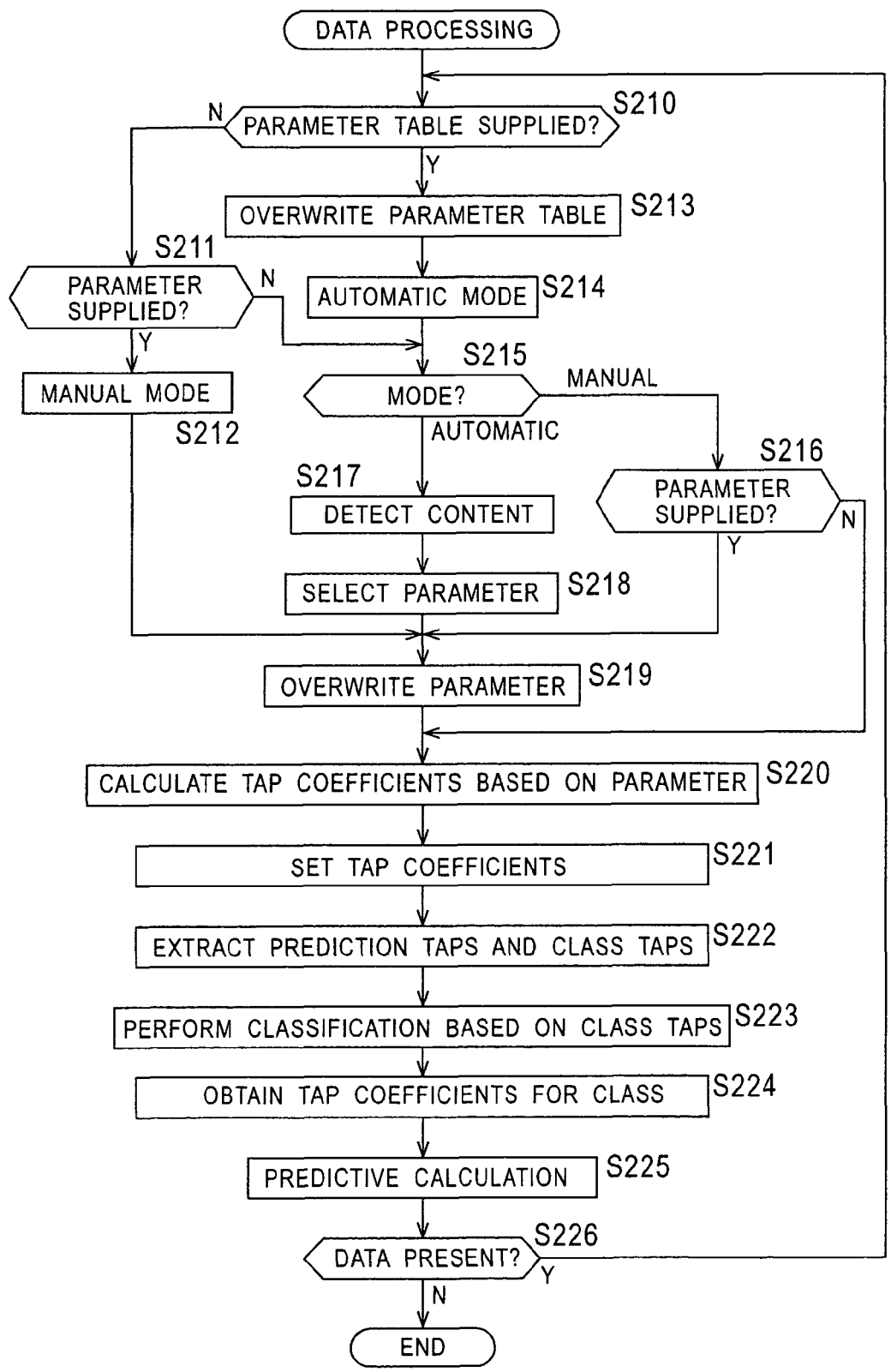
FIG. 38 is a flowchart showing processing that is executed by the data processing unit 22.

Next, data processing that is executed by the data processing unit 22 shown in FIG. 37 will be described with reference to a flowchart shown in FIG. 38.

First, in step S210, the content detecting unit 141 determines whether a parameter table has been supplied from the control unit 24 (FIG. 4) to the parameter-table storing unit 132. If it is determined in step S210 that a parameter table has not been supplied, the procedure proceeds to step S211. In step S211, the content detecting unit 141 determines whether a parameter z has been supplied from the control unit 24 to the parameter memory 98 by a user's operation of the image-quality adjusting knob 31.

If it is determined in step S211 that a parameter z has not been supplied, the procedure proceeds to step S215.

On the other hand, if it is determined in step S211 that a parameter z has been supplied, the procedure proceeds to step S212. In step S212, the content detecting unit 141 sets the operation mode to the manual mode. The procedure then proceeds to step S219. If the operation mode has already been set to the manual mode, the processing in step S212 can be skipped.

In step S219, the parameter memory 98, by overwriting, stores the parameter z determined as having been supplied from the control unit 24 in step S210.

Then, the procedure sequentially goes through steps S220 to S226, in which the same processes as in steps S143 to S149 shown in FIG. 24 are executed, respectively.

Thus, in a case where the operation mode is the automatic mode, when a parameter z has newly been input by a user's operation of the image-quality adjusting knob 31, the operation mode is set to the manual mode, and the prediction unit 95 performs a linear first-order predictive calculation according to equation (22) using tap coefficients $w_n$ that are generated based on the newly input parameter z, whereby image data having an improved resolution compared with image data supplied as input data is obtained.

If it is determined in step S210 that a parameter table has been supplied from the control unit 24 to the parameter-table storing unit 132, the procedure proceeds to step S213. In step S213, the parameter-table storing unit 132 stores the parameter table by overwriting. The procedure then proceeds to step S214.

In step S214, the motion calculating unit 132 sets the operation mode to the automatic mode. The procedure then proceeds to step S215. Thus, when a parameter table has been supplied from the control unit 24, the operation mode is set to the automatic mode.

If the operation mode has already been set to the automatic mode, the processing in step S214 can be skipped.

In step S215, the content detecting unit 141 determines whether the operation mode is the manual mode or the automatic mode.

If it is determined in step S215 that the operation mode is the manual mode, the procedure proceeds to step S216. In step S216, similarly to step S211, the content detecting unit 141 determines whether a parameter z has been supplied from the control unit 24 to the parameter memory 98 by a user's operation of the image-quality adjusting knob 31.

If it is determined in step S216 that a parameter z has been supplied, that is, when a parameter z has newly been input by a user's operation of the image-quality adjusting knob 31, the procedure proceeds to step S219. In step S219, the parameter memory 98, by overwriting, stores the parameter z determined in step S216 as having been supplied from the control unit 24.

Then, the procedure sequentially goes through steps S220 to S226, in which the same processes as in steps S143 to S149 shown in FIG. 24 are executed, respectively.

Thus, in a case where the operation mode is the manual mode, when a parameter z has newly been input by a user's operation of the image-quality adjusting knob 31, the prediction unit 95 performs a linear first-order predictive calculation according to equation (22) using tap coefficients $w_n$ that are generated based on the new parameter z, whereby image data having an improved resolution compared with image data supplied as input data is obtained.

If it is determined in step S216 that a parameter z has not been supplied, the procedure sequentially goes through steps S220 to S226, in which the same processes as in steps S143 to S149 shown in FIG. 24 are executed, respectively.

Thus, in a case where the operation mode is the manual mode, when the user does not operate the image-quality adjusting knob 31, the prediction unit 95 performs a linear first-order predictive calculation according to equation (22) using tap coefficients $w_n$ that have already been stored in the parameter memory 98, whereby image data having an improved resolution compared with image data supplied as input data is obtained.

If it is determined in step S215 that the operation mode is the automatic mode, the procedure proceeds to step S217. In step S217, the content detecting unit 141 detects content information of the image data supplied as input data to the tap extracting units 91 and 92, and supplies the content information to the parameter selecting unit 143.

The procedure then proceeds to step S218. In step S218, the parameter selecting unit 143 selects a parameter z associated with content information that coincides with the content information from the content detecting unit 141 from the parameter table stored in the parameter-table storing unit 132, and supplies the parameter z to the parameter memory 98. The procedure then proceeds to step S219.

In step S219, the parameter memory 98, by overwriting, stores the parameter z from the parameter selecting unit 143.

Then, the procedure sequentially goes through steps S220 to S226, in which the same processes as in steps S143 to S149 shown in FIG. 24 are executed, respectively.

Thus, in a case where the operation mode is the automatic mode, a parameter z associated with content information of image data supplied as input data is selected, and the prediction unit 95 performs a linear first-order predictive calculation according to equation (22) using tap coefficients $w_n$ that are generated based on the parameter z, whereby image data having an improved resolution compared with the image data supplied as input data is obtained.

From what has been described above, with the data processing unit 22 shown in FIG. 37, when a parameter z has been input by a user's operation of the image-quality adjusting knob 13, image data having an improved resolution compared with image data supplied as input data is obtained based on the parameter z. On the other hand, when the user has obtained server information from the management server 3 by operating the requesting button 14, a parameter z associated with content information of image data supplied as input data is selected from a parameter table included in the server information, and image data having an improved resolution compared with the image data supplied as input data is obtained based on the parameter z selected. Thus, the user is allowed to obtain image data having an adjusted resolution by operating the image-quality adjusting knob 13, and also to obtain image data in which the resolution is adjusted in accordance with content information of image data supplied as input data based on a parameter table.

The automatic mode and the manual mode may alternatively be switched between when the user operates a predetermined button, not shown, of the remote commander 10 (FIG. 2).

Next, a process of updating the user-information database 44 by the user-information management unit 43 of the management server 3 (FIG. 9) in step S43 shown in FIG. 10 in a case where the data processing unit 22 of the user terminal 2 (FIG. 4) is configured as shown in FIG. 37 will be described in detail with reference to a flowchart shown in FIG. 39.

First, in step S231, the user-information management unit 43 searches the user-information database 44 for a directory for content information that serves as status information separated from provided user information supplied from the control unit 42.

That is, when the data processing unit 22 of the user terminal 2 is configured as shown in FIG. 37, the provided user information includes content information that serves as status information, as described with reference to FIG. 37, and in step S231, a directory for the content information is searched for from the user-information database 44.

Then, the procedure proceeds to step S232. In step S232, based on the result of search in step S231, the user-information management unit 43 determines whether a directory for the content information serving as status information included in the provided user information has been registered (formed) in the user-information database 44.

If it is determined in step S232 that a directory for the content information serving as status information included in the provided user information has been registered in the user-information database 44, the procedure proceeds to step S233. In step S233, the user-information management unit 43 additionally registers a parameter in the provided user information and the content information serving as status information in the directory. The procedure is then exited.

On the other hand, if it is determined in step S232 that a directory for the content information serving as status information included in the provided user information has not been registered in the user-information database 44, the procedure proceeds to step S234. In step S234, the user-information management unit 43 creates a directory for the content information included in the provided user information, as a new storage area in the user-information database 44, and registers a parameter included in the provided user information and the content information serving as status information in the directory. The procedure is then exited.

Figure 39:
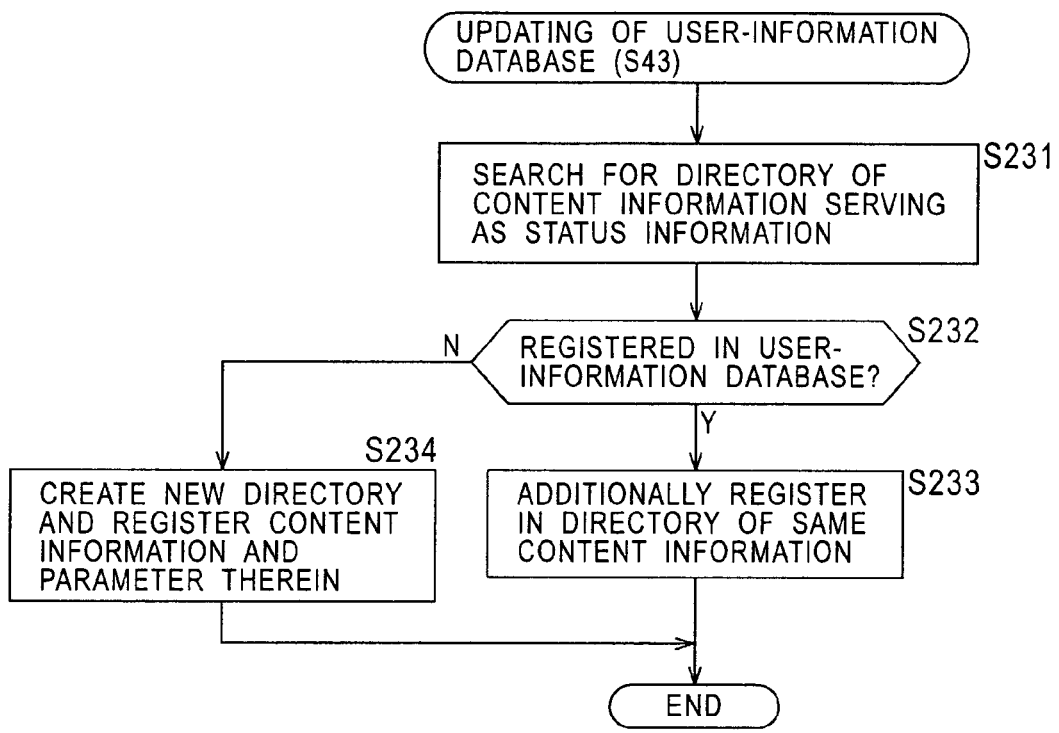
FIG. 39 is a flowchart showing in detail processing that is executed in step S43.

According to the process of updating the user-information database 44, shown in FIG. 39, the parameter in the provided user information and the content information serving as status information are classified on the basis of the content information, and registered in the user-information database 44 accordingly.

Figure 40:
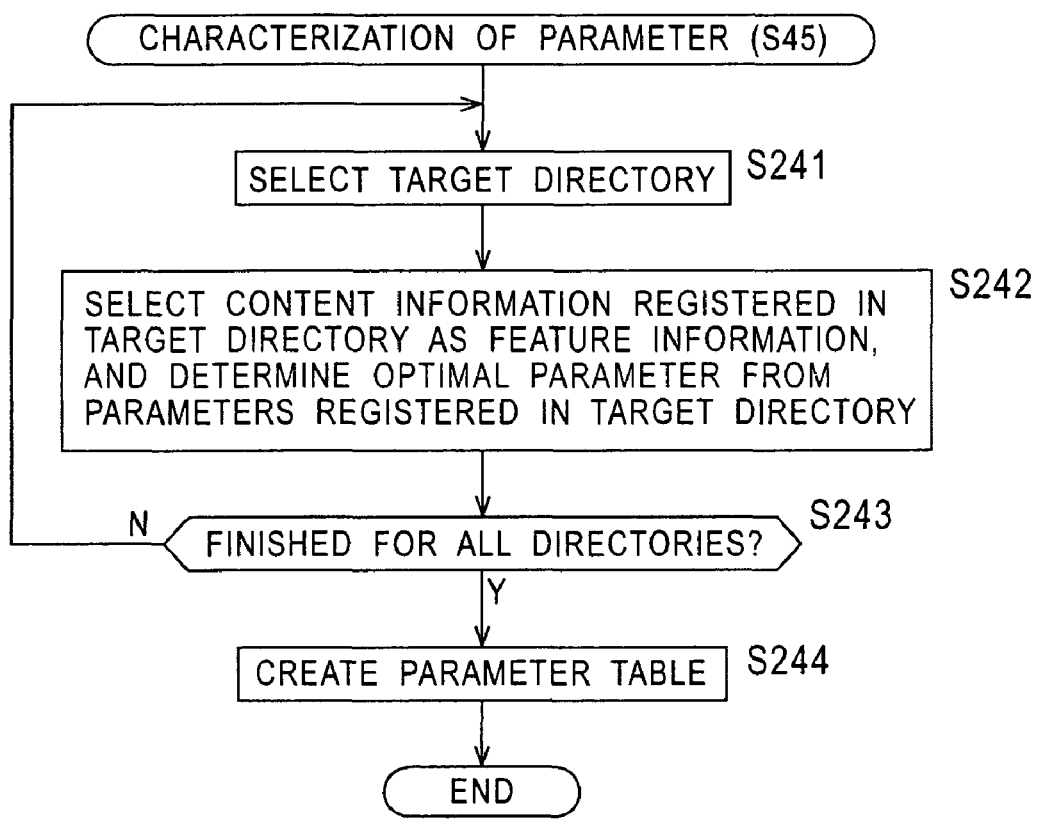
FIG. 40 is a flowchart showing in detail processing that is executed in step S45.

Next, processing that is executed by the characterizing unit 45 of the management server 3 (FIG. 9) in step S45 shown in FIG. 10 in a case where the data processing unit 22 of the user terminal 2 (FIG. 4) is configured as shown in FIG. 37 will be described in detail with reference to a flowchart shown in FIG. 40.

First, in step S241, the characterizing unit 45 selects a target directory that is to be processed from among the directories formed in the user-information database 44. The procedure then proceeds to step S242.

In step S242, the characterizing unit 45 selects the (same) content information registered in the target directory as feature information. Furthermore, the characterizing unit 45 calculates, for example, an average value or mode of parameters z registered in the target directory, and associates it, as an optimal parameter, with the content information serving as feature information.

The procedure then proceeds to step S243, in which the characterizing unit 45 determines whether all the directories formed in the user-information database 44 have been processed as a target directory.

If it is determined in step S243 that all the directories formed in the user-information database 44 have not been processed as a target directory, the procedure returns to step S241. In step S241, one of the directories that have not been selected as a target directory is newly selected as a target directory, and then the same procedure is repeated.

On the other hand, if it is determined in step S243 that all the directories formed in the user-information database 44 have been processed as a target directory, the procedure proceeds to step S244. In step S244, the characterizing unit 45 creates a parameter table showing a list of content information serving as feature information for the respective directories registered in the user-information database 44 and parameters z associated therewith. The procedure is then exited.

In step S46 shown in FIG. 10, the parameter table in which content information is associated with optimal parameters therefor, created as described above, is stored as parameter-related information in the parameter database 46 by overwriting.

Then, similarly to the case described with reference to FIG. 36, the content table is read from the parameter database 46 by the server-information providing unit 47, and regardless of the content of request user information transmitted from the user terminal 2, it is included by the server-information sending unit 48 in server information that is transmitted to the user terminal 2.

By the processing described with reference to FIG. 40, in the parameter table in the parameter database 46, an average value, mode, or the like of parameters z that have been set by individual users' operations of the image-quality adjusting knob 13 are registered in association with content information of image data supplied as input data and processed by the data processing unit 22 when the parameters z are set. Thus, each parameter associated with content information in the parameter table represents an average value or mode of parameters that are set by operations of the image-quality adjusting knob 13 by a large number of users, and the user terminal 2 having received server information sets a parameter z using the parameter table. Thus, at the user terminal 2, without a user's operation of the image-quality adjusting knob 13, a parameter z that is set by a large number of users for image data of content represented by relevant content information, i.e., an optimal parameter z, is automatically set.

In the example described above, content information representing the content of image data is included as status information in provided user information. Alternatively, for example, information representing a genre (category) of the content of image data (e.g., distinction among a news program, a sports program, a movie program, etc.) may be included as status information in provided user information. In that case, at the management server 3, a parameter table in which genres are associated with parameters is created. In that case, however, the content detecting unit 141 must detect a genre of the content of image data.

FIG. 41 shows an example configuration of a network system according to an embodiment of the present invention. In the figure, parts corresponding to those in the broadcasting system shown in FIG. 1 are designated by the same numerals, and descriptions thereof will hereinafter be omitted as appropriate. More specifically, the network system shown in FIG. 41 is configured basically the same as the broadcasting system shown in FIG. 1, except in that it does not include the broadcasting station 1 and in that user terminals $151_1$ to $151_4$ are provided instead of the user terminals $2_1$ to $2_4$.

Similarly to the user terminals $2_1$ to $2_4$, the user terminals $151_1$ to $151_4$ will hereinafter be each referred to as a user terminal 151 except where a distinction among them is particularly necessary.

In the network system shown in FIG. 41, similarly to the case between the user terminal 2 and the management server 3 in the broadcasting system shown in FIG. 1, user information is provided from the user terminal 151 to the management server 3 and server information is provided from the management server 3 to the user terminal 151.

FIG. 42 shows an example configuration of the user terminal 151 shown in FIG. 41. In the figure, parts corresponding to those of the user terminal 2 shown in FIG. 4 are designated by the same numerals, and descriptions thereof will hereinafter be omitted as appropriate. More specifically, the user terminal 151 shown in FIG. 42 is configured basically the same as the user terminal 2 shown in FIG. 4, except in that the broadcast receiving unit 21 and the output unit 23 are not provided and in that the control unit 24 additionally has connecting terminals 171 and 172.

The user terminal 2 shown in FIG. 4 includes the broadcast receiving unit 21 that serves as means for providing image data to the data processing unit 22, and the output unit 23 that serves as means for outputting (displaying) image data having been processed by the data processing unit 22. In contrast, the user terminal 151 shown in FIG. 42 does not include means for providing image data to the data processing unit 22 or means for outputting (displaying) image data having been processed by the data processing unit 22, and these means can instead be attached externally.

The connecting terminal 171 of the control unit 24 is used for connection with means for providing image data to the data processing unit 22. In the embodiment shown in FIG. 42, as an example of such means, a DVD player 161 is connected to the connecting terminal 171. The DVD player 161 includes an MPEG (Moving Picture Experts Group) decoder for decoding MPEG-encoded data recorded on a DVD that is not shown. The DVD player 161, by the MPEG decoder 162, decodes MPEG-encoded data played back from the DVD, and supplies the resulting image data to the control unit 24 via the connecting terminal 171. The image data supplied from the DVD player 161 to the control unit 24 is supplied to the signal processing unit 22.

The connecting terminal 172 of the control unit 24 is used for connection with output means for outputting image data having been processed by the data processing unit 22. In the embodiment shown in FIG. 42, as an example of such means, a display apparatus 163 is connected to the connecting terminal 172. The data processing unit 22 supplies image data having been processed therein to the control unit 24, and the control unit 24 supplies the image data from the data processing unit 22 to the display apparatus 163 via the connecting terminal 172, and the display unit 163 displays the image data supplied as described above.

At the user terminal 151 configured as described above, the DVD player 161 plays back MPEG-encoded data from the DVD, and the MPEG decoder 162 included therein MPEG-decodes the data, whereby image data is decoded. The DVD player 161 supplies the decoded image data to the control unit 24 via the connecting terminal 171, and the control unit 24 supplies the image data from the DVD player 161 to the data processing unit 22. The data processing unit 22 is configured, for example, as shown in FIG. 23. The data processing unit 22 removes noise from the image data supplied from the control unit 24 based on a parameter that is set therein, and supplies the result to the control unit 24. The control unit 24 supplies the image data from the data processing unit 22 to the display apparatus 163 via the connecting terminal 172. The display apparatus 163 displays the image data from the control unit 24.

Although the data processing unit 22 of the user terminal 151 has been described as configured as shown in FIG. 23, alternatively, the data processing unit 22 may be configured as described with reference to FIG. 11, FIG. 18, FIG. 31, or FIG. 37.

With regard to the user terminals 2 and 151, the processing path of image data in the user terminal 2 goes through the broadcast receiving unit 21, the data processing unit 22, and the output unit 23; whereas the processing path of image data in the user terminal 151 goes through the DVD player 161, the control unit 24, the data processing unit 22, the control unit 24, and the display apparatus 163, differing in that the control unit 24 is passed. However, the processing that is executed is basically the same.

Thus, at the user terminal 151, with regard to processing relating to user information and server information, the process described with reference to FIG. 5 is executed, similarly to the case of the user terminal 2.

First, information collecting processes that are executed by the user terminal 151 shown in FIG. 42 in steps S6 and S10 shown in FIG. 5 will be described in detail with reference to flowcharts shown in FIGS. 43A and 43B.

Figure 43A:
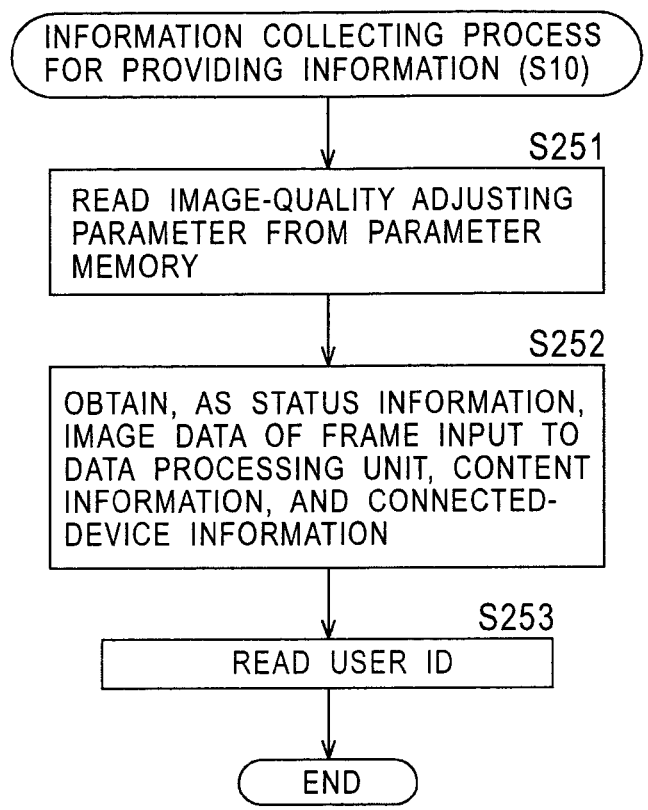
FIG. 43A is a flowchart showing in detail processing that is executed in step S10.

In the collecting process that is executed in step S10 in a case where user information is to be provided, referring to FIG. 43A, first, in step S251, the information providing unit 27 (FIG. 42) reads a parameter that has been set in the parameter memory 98 of the data processing unit 22 (FIG. 23). The procedure then proceeds to step S252.

In step S252, the information providing unit 27 obtains, as status information, image data of a frame that is currently being input to the data processing unit 22 from the DVD player 161 via the control unit 24. Furthermore, in step S252, the information providing unit 27 obtains content information of image data that is being played back by the DVD player 161 and connected-device information regarding external devices connected to the connecting terminals 171 and 172.

The information providing unit 27 obtains content information, for example, from a DVD that is being played back by the DVD player 161. Furthermore, the information providing unit 27 obtains connected-device information from the DVD player 161 connected to the connecting terminal 171 and the display apparatus 163 connected to the connecting terminal 172.

The connected-device information may be, for example, the type, manufacturer, or arrangement of an external device that is connected to the connecting terminal 171 or the connecting terminal 172 (e.g., a DVD player, an MD (mini disc) (trademark) player, or a CD (compact disc) player).

More specifically, for example, with regard to the DVD player 161 connected to the connecting terminal 171 as shown in FIG. 42, connected-device information that is obtained includes information indicating that it is a DVD player, a manufacturer thereof, and a manufacture of the MPEG decoder 162 or a signal processing circuit, not shown, included in the DVD player 161. Furthermore, for example, with regard to the display apparatus 163 connected to the connecting terminal 172 as shown in FIG. 42, connected-device information that is obtained includes information indicating that it is a display apparatus, a manufacturer thereof, and a type of the display apparatus 162 (e.g., a CRT direct viewing tube, a liquid crystal panel, a PDP (plasma display panel), or a projector). With regard to the display apparatus 163, for example, if the type thereof is a projector, furthermore, information indicating whether the projector is a front projector or a rear projector, and whether the display device employs CRT, liquid crystal, or DLP (digital light processing), may be obtained as connected-device information.

Then, the procedure proceeds to step S253, in which the information providing unit 27 reads a user ID from the memory 25 (FIG. 42). The procedure is then exited.

In step S11 shown in FIG. 5, a providing flag is attached to the user ID, the parameter, the image data serving as status information, the content information, and the connected device information, collected as described above, whereby user information is generated.

Figure 43B:
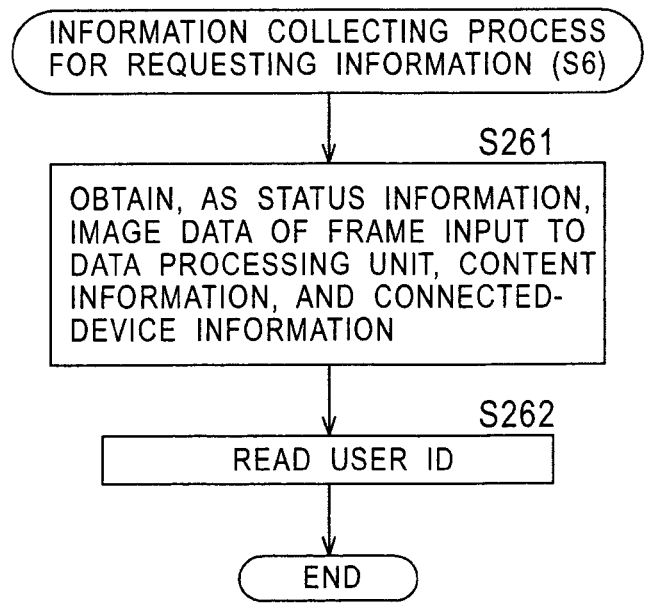
FIG. 43B is a flowchart showing in detail processing that is executed in step S6.

In the collecting process executed in step S6 in a case where server information is to be requested, referring to FIG. 43B, first, in step S261, similarly to step S252 shown in FIG. 43A, the information requesting unit 28 (FIG. 42) obtains, as status information, image data of a frame that is currently being input to the data processing unit 22, and also obtains content information of the image data and connected-device information as status information. The procedure then proceeds to step S262.

In step S262, the information requesting unit 28 reads a user ID from the memory 25 (FIG. 42). The procedure is then exited.

In step S7 shown in FIG. 5, a requesting flag is attached to the user ID, the image data serving as status information, the content information, and the connected-device information, collected as described above, whereby user information is generated.

The management server 3 shown in FIG. 41 executes basically the same processing as in the flowchart shown in FIG. 10, as described in relation to the management server 3 shown in FIG. 1.

Now, a process of updating the user-information database 44 by the user-information management unit 43 of the management server 3 (FIG. 42) in step S43 shown in FIG. 10, for the user terminal 151 configured as shown in FIG. 42, will be described in detail with reference to a flowchart shown in FIG. 44.

First, in step S271, the user-information management unit 43 searches the user-information database 44 for a directory of content information included in status information of provided user information supplied from the control unit 42.

That is, the status information includes content information as described with reference to FIGS. 43A and 43B, and the user-information management unit 43 searches for a directory that has been created for content information included in the status information of the provided user information supplied from the control unit 42.

The procedure then proceeds to step S272. In step S272, based on the result of search in step S271, the user-information management unit 43 determines whether a directory for the content information included in the status information of the provided user information supplied from the control unit 42 has been registered in the user-information database 44.

If it is determined in step S272 that a directory for the content information included in the status information of the provided user information has been registered in the user-information database 44, the procedure proceeds to step S273. In step S273, the user-information management unit 43 additionally registers in the directory the parameter included in the provided user information, the image data serving as status information, the content information, and the connected-device information. The procedure is then exited.

On the other hand, if it is determined in step S272 that a directory for the content information included in the status information of the provided user information has not been registered in the user-information database 44, the procedure proceeds to step S274. In step S274, the user-information management unit 43 creates, as a new storage area in the user-information database 44, a directory for the content information included in the status information of the provided user information, and registers in the directory the parameter included in the provided user information, the image data serving as status information, the content information, and the connected-device information. The procedure is then exited.

Figure 44:
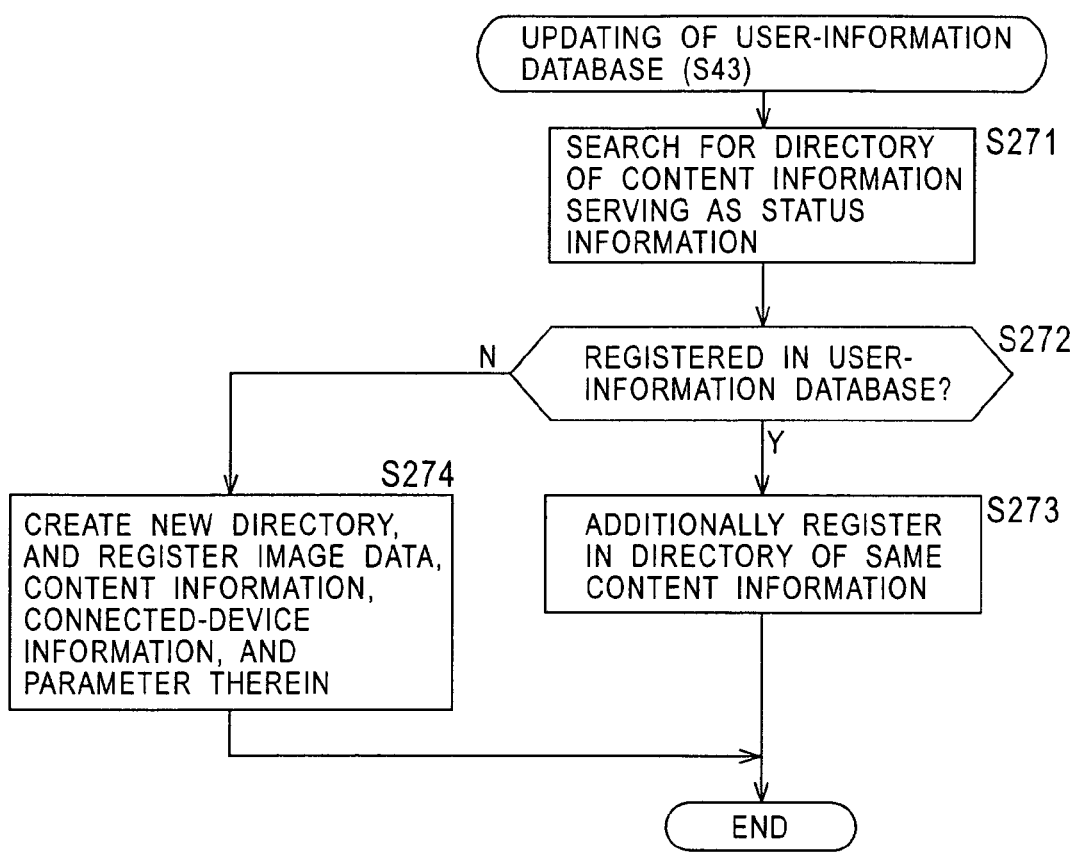
FIG. 44 is a flowchart showing in detail processing that is executed in step S43.

Thus, according to the process of updating the user-information database 44, shown in FIG. 44, a parameter and status information in user information is classified on the basis of content represented by content information included in the status information, and registered in the user-information database 44 accordingly.

Next, processing that is executed in step S45 shown in FIG. 10 by the characterizing unit 45 of the management server 3 (FIG. 9) for the user terminal 151 configured as shown in FIG. 42 will be described with reference to a flowchart shown in FIG. 45.

First, in step S281, the characterizing unit 45 obtains true values of image data stored in each of the directories of the user-information database 44.

More specifically, at the user terminal 151 (FIG. 42), image data that is played back from a DVD by the DVD player 161 is processed, and a noise (or distortion) is superposed on the image data in a playback process by the DVD player 161 (including a decoding process by the MPEG decoder 162). In the user-information database 44, image data on which noise is superposed as described above is classified on the basis of content represented by content information and stored accordingly. In this embodiment, since content information of image data is stored in the user-information database 44 together with the image data, image data stored in the user-information database 44 can be identified based on the content information.

Thus, in step S281, the characterizing unit 45 identifies image data stored together with content information in the user-information database 44 based on the content information, and obtains true values of the image data identified from, for example, a server of a content distribution company, not shown.

In step S281, alternatively, for example, image data recorded on various DVDs may be accumulated in the form of an image database at the management server 3, allowing true values of the image data stored in the user-information database 44 to be obtained from the image database.

Furthermore, true values of image data may be obtained, for example, by calculating an average value of image data of the same scene, as described in relation to step S91 shown in FIG. 15.

When the true values of the image data have been obtained in step S281, the procedure proceeds to step S282. In step S282, the characterizing unit 45 calculates an amount of noise superposed on each set of image data registered in the user-information database 44, using the true values of the image data.

More specifically, the characterizing unit 45 reads each set of image data registered in the user-information database 44, and subtracts the true values of the image data therefrom, thereby obtaining a noise amount of the image data.

After the noise amounts of the image data have been obtained in step S282, the procedure proceeds to step S283. In step S283, the characterizing unit 45 derives a relationship between a noise amount of image data and a parameter for each set of connected-device information, using connected-device information as feature information that characterizes a parameter with which the connected-device information is associated as status information. The relationship between the noise amount and the parameter for each set of connected-device information represents a value that is set by each user of a similar external connected device as an optimal parameter for image data on which an amount of noise is superposed.

The procedure then proceeds to step S284. In step S284, the characterizing unit 45 statistically processes the relationship between noise amounts and parameters for each set of connected-device information, thereby obtaining an optimal parameter for each noise amount for each set of connected-device information serving as feature information. The procedure is then exited.

More specifically, for example, the characterizing unit 45 divides a predetermined range of noise amount into a plurality of classes, and assuming noise amounts belonging to the same class as the same noise amount, calculates an average value or mode of parameters transmitted from the user terminals 151 together with image data having noise amounts belonging to the same class. Furthermore, the characterizing unit 45 associates the noise amount as a representative value for each class (e.g., an average value, a minimum value, or a maximum value of each class) with the average value or mode of parameters that has been calculated for noise amounts belonging to the class.

Alternatively, for example, the characterizing unit 45 divides a predetermined range of parameter into a plurality of classes, and assuming parameters belonging to the same class as the same parameter, calculates an average value or mode of noise amounts calculated from image data transmitted from the user terminals 151 together with parameters belonging to the same class. Furthermore, the characterizing unit 45 associates the parameter that serves as a representative value of each class (e.g., an average value, a minimum value, or a maximum value of each class) with an average value or mode of noise amounts that has been calculated for parameters belonging to the class.

In step S46 shown in FIG. 10, sets of noise amount and parameter associated with each other (parameter-related information) for each set of connected-device information are stored in the parameter database 46 by overwriting. That is, in this case, the parameter database 46 stores sets of noise amount and parameter are stored as classified on the basis of connected-device information.

Next, processing that is executed in step S47 by the server-information providing unit 47 of the management server 3 (FIG. 42) for the user terminal 151 configured as shown in FIG. 42 will be described in detail with reference to a flowchart shown in FIG. 46.

Figure 45:
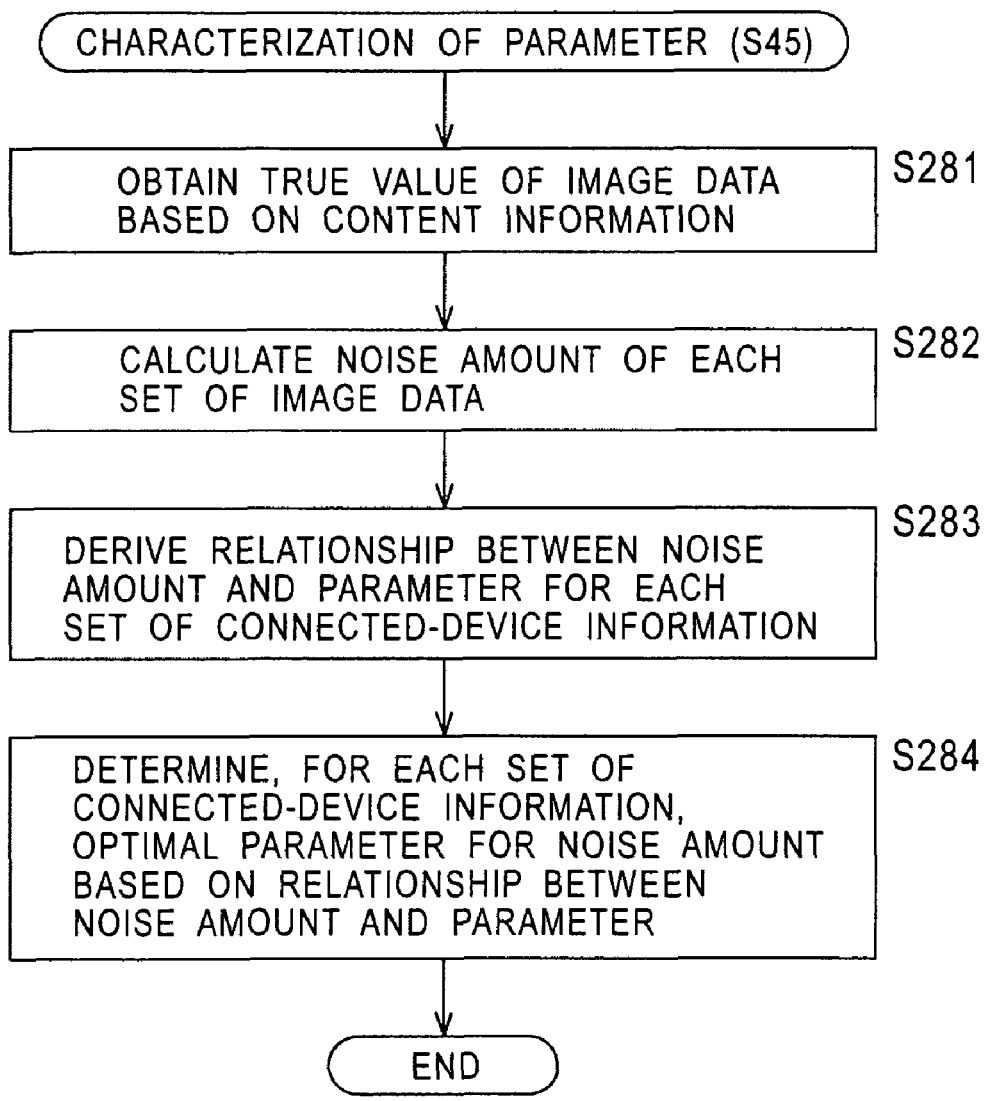
FIG. 45 is a flowchart showing in detail processing that is executed in step S45.

First, in step S291, the server-information providing unit 47 obtains true values of image data included in status information of request user information (user information for requesting server information, with the requesting flag indicating 1) supplied from the control unit 42 (FIG. 9), similarly to step S281 shown in FIG. 45. The procedure then proceeds to step S292.

In step S292, similarly to step S282 shown in FIG. 45, the server-information providing unit 47 calculates the noise amount of the image data included in the status information of the request user information, using the true values obtained in step S291. The procedure then proceeds to step S293.

In step S293, the server-information providing unit 47 searches the parameter database 46 for sets of noise amount and parameter that is classified in association with connected-device information that fully or partially match connected-device information included in the status information of the request user information, and searches further the sets of noise amount and parameter for a parameter associated with a noise amount that is most approximate to the noise amount calculated in step S292. Then, the server-information providing unit 47 reads the parameter from the parameter database 46, and supplies the parameter to the server-information sending unit 48. The procedure is then exited.

Thus, in step S48 shown in FIG. 10, a parameter that is classified in association with connected-device information that matches at least partially the connected-device information included in the request user information transmitted from the user terminal 151, and that is associated with a noise amount that is most approximate to the noise amount of the image data included in the request user information, is sent as an optimal parameter for the user terminal 151.

As described with reference to FIG. 45, in the parameter database 46, for example, average values, modes, or the like of parameters that have been set by individual users' operations of the image-quality adjusting knob 13 are registered as classified on the basis of connected-device information. Thus, the parameter that is selected by the processing shown in FIG. 46 from the parameter database 46 represents an average value or mode of parameters that have been set by operations of the image-quality adjusting knob 13 by a large number of users who are using external devices that coincide at least partially with the user terminal 151 that has requested server information and who are viewing image data having an amount of noise approximate to the noise amount of image data that is being received by the user terminal 151. The user terminal 151 that has sent user information for requesting server information is provided with server information including the average value or mode of parameters. As described with reference to FIG. 5, at the user terminal 151 having received the server information, the parameter included in the server information, i.e., an average value or mode of parameters that have been set by a large number of users using the same external device under similar noise environments, is set. Accordingly, without a user's operation of the image-quality adjusting knob 13, a parameter that has been set by a large number of users using the same external device under similar noise environments, i.e., an optimal parameter, is automatically set.

Figure 47:
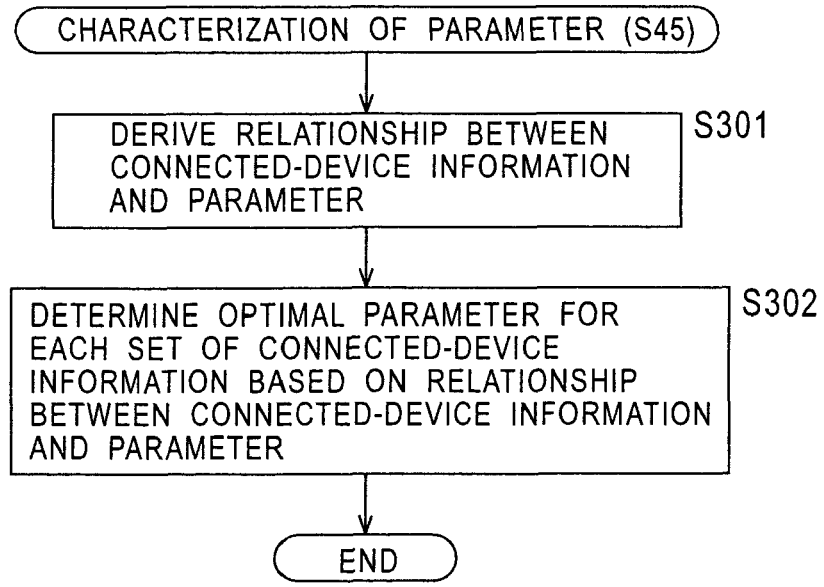
FIG. 47 is a flowchart showing in detail processing that is executed in step S45.

The characterizing unit 45 of the management server 3 (FIG. 9) that exchanges user information and server information with the user terminal 151 shown in FIG. 42 may execute processing shown in a flowchart in FIG. 47 instead of processing shown in the flowchart in FIG. 45.

More specifically, in that case, first, in step S301, the characterizing unit 45 derives a relationship between each set of connected-device information and a parameter, using connected-device information registered in the user-information database 44 as feature information that characterizes a parameter with which the connected device information is associated as status information. The relationship between the connected-device information and the parameter represents a value that is set by individual users of similar externally connected devices as an optimal parameter for image data.

The procedure then proceeds to step S302. In step S302, the characterizing unit 45 statistically processes relationships between connected-device information and parameters, derived in step S301, thereby obtaining an optimal parameter for each set of connected-device information serving as feature information. The procedure is then exited.

That is, for example, the characterizing unit 45 calculates an average value or mode of parameters associated with the same connected-device information, and associates it with the connected-device information.

In step S46 shown in FIG. 10, sets of connected information and parameter associated with each other as described above (parameter-related information) are stored in the parameter database 46 by overwriting. That is, in this case, sets of connected-device information and parameter are stored in the parameter database 46.

Figure 46:
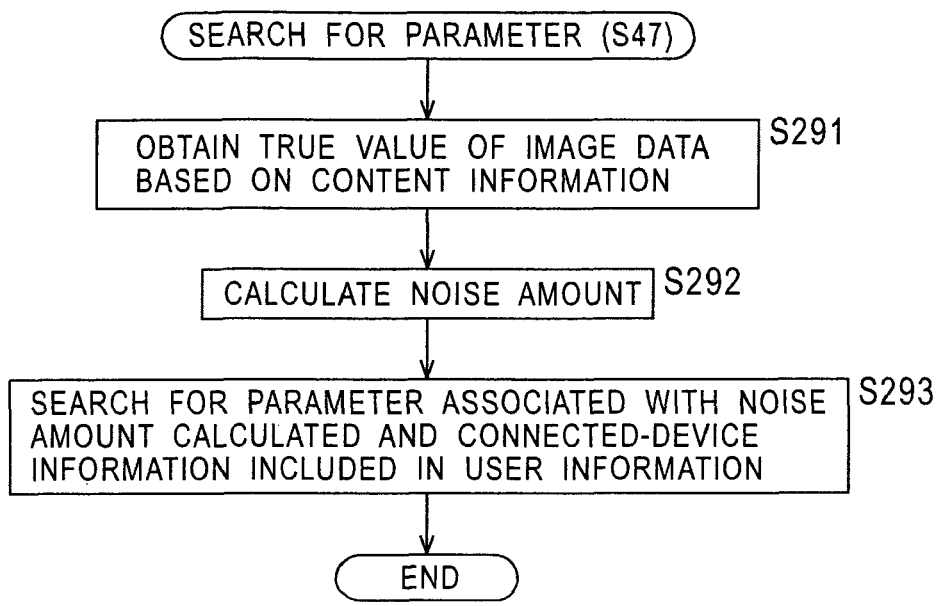
FIG. 46 is a flowchart showing in detail processing that is executed in step S47.
Figure 48:
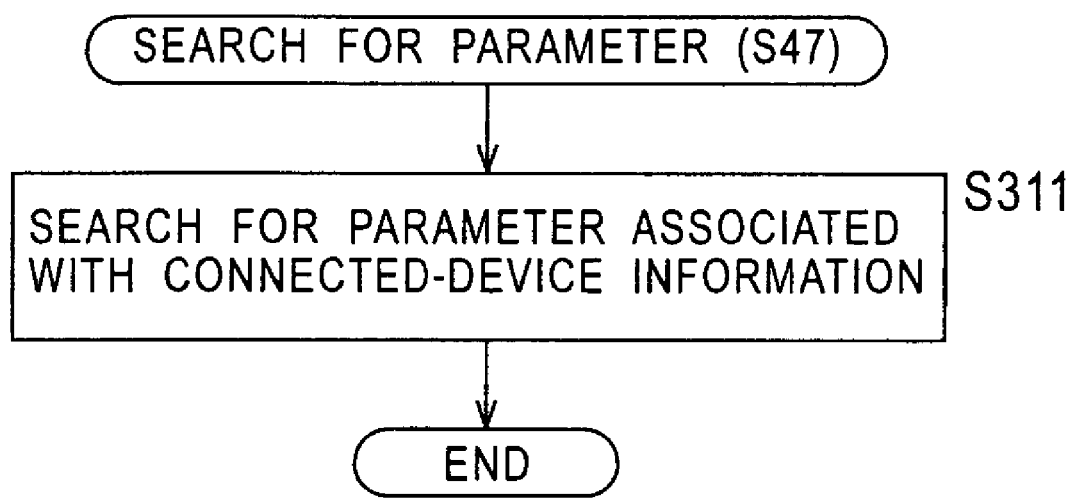
FIG. 48 is a flowchart showing in detail processing that is executed in step S47.

When the processing shown in the flowchart in FIG. 47 is executed in step S45 shown in FIG. 10, processing shown in a flowchart in FIG. 48 is executed in step S47 shown in FIG. 10 instead of the processing shown in the flowchart in FIG. 46.

More specifically, in step S301, the server-information providing unit 47 searches for a parameter associated with connected-device information that fully or partially matches the connected-device information included in the status information of the request user information supplied from the control unit 42 (FIG. 9). Then, the server-information providing unit 47 reads the parameter from the parameter database 46, and supplies it to the server-information sending unit 48. The procedure is then exited.

Thus, in step S48 shown in FIG. 10, a parameter associated with connected-device information that matches at least partially the connected-device information included in the request user information transmitted from the user terminal 151 is sent as an optimal parameter for the user terminal 151.

As described with reference to FIG. 45, in the parameter database 46, for example, average values or modes of parameters that have been set by individual users' operations of the image-quality adjusting knob 13 are registered as classified on the basis of connected-device information. Thus, the parameter that is selected by the processing shown in FIG. 46 from the parameter database 46 represents an average value or mode of parameters that have been set by operations of the image-quality adjusting knob 13 by a large number of users who are using external devices that coincide at least partially with the user terminal 151 that has requested server information. The user terminal 151 that has sent user information for requesting server information is provided with server information including the average value or mode of parameters. As described with reference to FIG. 5, at the user terminal 151 having received the server information, the parameter included in the server information, i.e., an average value or mode of parameters that have been set by a large number of users using the same external device, is set. Accordingly, without a user's operation of the image-quality adjusting knob 13, a parameter that has been set by a large number of users using the same external device, i.e., an optimal parameter, is automatically set.

More specifically, for example, with regard to the DVD player 161 connected to the user terminal 151 shown in FIG. 42 and the MPEG decoder 162 included in the DVD player 161, for example, signal processing executing in the DVD player 161 and the degree of distortion of image data output by the MPEG decoder 162 often differ depending on the manufacturer. Thus, in order to obtain high-quality image data by the data processing unit 22, a parameter must be set based on each manufacturer of the DVD player 161 or the MPEG decoder 162.

Thus, as described earlier, the management server 3 provides an average value or the like of parameters that have been set by a large number of users of the same external device to other users using the same external device. Accordingly, the other users are allowed to obtain high-quality image data without setting a parameter by operating the image-quality adjusting knob 13 by themselves.

In that case, status information of user information need not include image data. Furthermore, the management server 3 need not obtain true values of image data or obtain a noise amount of image data.

The series of processes described above may be executed either by hardware or by software. When the series of processes is executed by software, a program that constitutes the software is installed, for example, on a general-purpose computer.

FIG. 49 shows an example configuration of a computer according to an embodiment, on which a program for executing the series of processes described above is installed.

The program may be recorded in advance in a hard disk 205 or a ROM 203 that serves as recording medium included in the computer.

Alternatively, the program may be stored (recorded) temporarily or permanently on a removable recording medium 211 such as a flexible disc, a CD-ROM (compact disc read only memory), an MO (magneto optical) disc, a DVD (digital versatile disc), a magnetic disc, or a semiconductor memory. The removable recording medium 211 as such can be provided in the form of so-called package software.

Instead of installing the program from the removable recording medium 211 onto the computer as described above, the program may be transferred by wireless from a downloading site to the computer via an artificial satellite for digital satellite broadcasting, or transferred through wired lines from a downloading site via a network such as a LAN (local area network) or the Internet, so that the computer is allowed to receive the transferred program in a communication unit 208 and installed the program on the hard disk 205 included in the computer.

The computer includes a CPU (central processing unit) 202. The CPU 202 is connected to an input/output interface 210 via a bus 201. When a command is input to the CPU 202 via the input/output interface 210 by a user's operation of an input unit 207 including a keyboard, a mouse, and a microphone, the CPU 202 stores a program stored in the ROM (read only memory) 203 according to the command. Alternatively, the CPU 202 loads into a RAM (random access memory) 204 and executes a program that is stored in the hard disk 205, a program transferred from a satellite or a network, received by the communication unit 208, and installed on the hard disk 205, or a program read from the removable recording medium 211 loaded in a drive 209 and installed on the hard disk 205. Thus, the CPU 202 executes processing according to the flowcharts described above, or processing executed by the arrangements in the block diagrams described above. The results of processing is, for example, output from an output unit 206 including an LCD (liquid crystal display) and a speaker, send from the communication unit 208, or recorded on the hard disk 205 via the input/output interface 210, as needed.

In this specification, processing steps defining programs for allowing a computer to execute various processes need not necessarily be executed sequentially in the orders shown in the flowcharts, and include processes that are executed in parallel or individually (e.g., parallel processing or processing using objects).

Furthermore, a program may be executed either by a single computer or by distributed processing using a plurality of computers. Furthermore, a program may be transferred to an executed by a remote computer.

Although the description has been made hereinabove in the context of processing image data, alternatively, the present invention may also be applied, for example, processing of audio data. More specifically, for example, in the embodiment shown in FIG. 42, the arrangement may be such that a CD player for playing back music is connected to the connecting terminal 171 instead of the DVD player 161 and that a speaker is connected to the connecting terminal 172 instead of the display apparatus 163.

Industrial Applicability

According to a first data processing apparatus, data processing method, and program of the present invention, input data is processed based on a predetermined parameter; and a parameter is set in accordance with an operation of operation means that is operated when inputting the parameter. Furthermore, user information is provided to a server apparatus that statistically processes the user information, the user information at least including the parameter that has been set and status information indicating status under which the parameter has been used, and server information for setting the parameter is obtained from the server apparatus. Furthermore, information regarding the parameter is set according to the server information. Accordingly, a parameter for appropriately processing input data can be set by a user, and a parameter for appropriately processing input data can also be set automatically without the user performing such setting.

According to the second data processing apparatus, data processing method, and program of the present invention, user information is obtained from a plurality of user terminals, the user information at least including a predetermined parameter that is used at a user terminal that processes input data based on the parameter, and including status information indicating status under which the parameter has been used at the user terminal. Furthermore, feature information is detected from the status information included in the user information and information regarding the parameter is associated with each set of feature information. Furthermore, the user terminal is provided with server information at least including the information regarding the parameter associated with the feature information. Accordingly, the user terminal is provided with a parameter that allows input data to be processed appropriately.

According to the data processing system of the present invention, at each of the plurality of user terminals, data processing method, and program, input data is processed based on a predetermined parameter; and a parameter is set in accordance with an operation of operation means that is operated when inputting the parameter. Furthermore, user information is provided to a server apparatus that statistically processes the user information, the user information at least including the parameter that has been set and status information indicating status under which the parameter has been used. Furthermore, server information for setting the parameter is obtained from the server apparatus, and information regarding the parameter is set according to the server information. At the server apparatus, user information is obtained from the plurality of user terminals. Furthermore, feature information is detected from status information included in the user information, and each set of feature information is associated with information regarding the parameter. Furthermore, the user terminal is provided with server information at least including the information regarding the parameter associated with the feature information. Accordingly, each of the user terminals is provided with a parameter that allows input data to be processed appropriately. Furthermore, at each of the user terminals, a parameter that allows input data to be processed appropriately can be set automatically without a user setting a parameter.

The invention claimed is:

1. A data processing apparatus for adjusting an image quality of a broadcast program comprising:
   data processing means for processing input data based on a parameter;
   first setting means for setting, in accordance with an operation operated when inputting the parameter, the parameter used by the data processing means;
   user-information providing means for providing user information to a server apparatus that statistically processes the user information, the user information including the parameter set by the first setting means and status information indicating status under which the parameter is used by the data processing means;
   server-information obtaining means for obtaining server information for setting the parameter; and
   second setting means for setting, in accordance with the server information, information regarding the parameter used by the data processing means,
   wherein the server-information obtaining means obtains an optimal parameter from the server apparatus, the optimal parameter being determined by the server apparatus based on a relationship between a noise amount and the parameter of each frame that is registered in the server apparatus as a same scene, the noise amount being calculated by the server apparatus based on a true value of image data of the same scene, the true value of image data being obtained by averaging the image data of a plurality of frames of the same scene registered in the server apparatus, the plurality of frames of the same scene including more than two frames, the true value approximating image data without superimposed noise amount due to broadcasting, the noise amount of the plurality of frames of the same scene having a Gaussian distribution,
   wherein the data processing means adjusts the image quality of the input data including the broadcast program based on the optimal parameter,
   wherein the status information identifies a frame by an ID of a program and an index of the frame and the server apparatus registers the parameter with the frame according to the ID and the index so that user information of a same frame obtained from a plurality of users is statistically processed, and
   wherein the parameter is set in accordance with the server information, which is obtained independently of user operations.

2. The data processing apparatus according to claim 1, wherein the data processing means comprises:
   weighting means for weighting the input data and output data obtained by processing the input data, using predetermined weights; and
   adding means for adding the weighted input data and output data and outputting the sum as output data corresponding to the input data;
   wherein the first and second setting means set the parameter representing the predetermined weights for the input data and the output data.

3. The data processing apparatus according to claim 2, wherein the user-information providing means provides the server apparatus with the user information including the parameter representing the predetermined weights.

4. The data processing apparatus according to claim 1, wherein the data processing means comprises:
   weighting means for weighting the input data and output data obtained by processing the input data, using predetermined weights;
   adding means for adding the weighted input data and output data and outputting the sum as output data corresponding to the input data;
   weight calculating means for calculating a weight for weighting the input data and the output data;
   correcting means for correcting the weight calculated by the weight calculating means, based on the information set by the second setting means; and
   selecting means for selecting either a weight associated with the parameter set by the first setting means or the weight corrected by the correcting means, and supplying the weight selected to the weighting means.

5. The data processing apparatus according to claim 4, wherein the user-information providing means provides the server apparatus with the user information including the weight associated with the parameter set by the first setting means and the weight calculated by the weight calculating means.

6. The data processing apparatus according to claim 1, wherein the data processing means comprises:
   prediction-tap extracting means for extracting the input data used as prediction taps for carrying out a predetermined predictive calculation with regard to target output data considered among output data obtained by processing the input data;
   prediction means for carrying out the predetermined predictive calculation using the prediction taps for the target output data and predetermined tap coefficients to calculate a predictive value of the target output data; and
   tap-coefficient generating means for generating the predetermined tap coefficients based on the parameter set by the first setting means or the information set by the second setting means.

7. The data processing apparatus according to claim 6, wherein the user-information providing means provides the server apparatus with the user information including the parameter set by the first setting means.

8. The data processing apparatus according to claim 6, wherein the data processing means comprises:
   class-tap extracting means for extracting the input data used as class taps for classifying the target output data into one of a plurality of classes; and
   classification means for carrying out classification based on the class taps and outputting a class of the target output data;
   wherein the tap-coefficient generating means generates tap coefficients for each of the classes using coefficient-seed data for each of the classes, and
   wherein the prediction means carries out the predetermined predictive calculation using prediction taps for the target output data and tap coefficients for the class of the target output data.

9. The data processing apparatus according to claim 8, wherein the coefficient-seed data is obtained by:
   extracting, from student data that serves as a student in learning, the prediction taps for target teacher data considered among teacher data that serves as a teacher in learning; and
   performing learning so that a statistical error of a predictive value of the target teacher data, obtained by carrying out the predetermined predictive calculation using the prediction taps and the tap coefficients, is minimized.

10. The data processing apparatus according to claim 1, wherein the status information allows calculation of a noise amount of data input when the parameter is set by the first setting means.

11. The data processing apparatus according to claim 10, wherein the status information is part of the data input when the parameter is set by the first setting means.

12. The data processing apparatus according to claim 1, wherein the input data is image data, and
wherein the status information allows a motion amount of the image data.

13. The data processing apparatus according to claim 12, wherein the status information is part of the image data at a time when the parameter is set by the first setting means.

14. The data processing apparatus according to claim 1, wherein the status information indicates content or a genre of the input data.

15. The data processing apparatus according to claim 1, wherein the data processing means processes the input data supplied from supplying means for supplying the input data.

16. The data processing apparatus according to claim 15, wherein the supplying means receives the input data and supplies the input data to the data processing means, or plays back the input data from a recording medium on which the input data is recorded and supplies the input data to the data processing means.

17. The data processing apparatus according to claim 16, wherein the status information relates to the playback means.

18. The data processing apparatus according to claim 1, wherein the status information relates to output means for outputting the input data processed by the data processing means.

19. A data processing method for adjusting an image quality of a broadcast program comprising:
a data processing step of processing input data based on a parameter;
a first setting step of setting, in accordance with an operation operated when inputting the parameter, the parameter used in the data processing step;
a user-information providing step of providing user information to a server apparatus that statistically processes the user information, the user information including the parameter set in the first setting step and status information indicating status under which the parameter is used in the data processing step;
a server-information obtaining step of obtaining server information for setting the parameter; and
a second setting step of setting, in accordance with the server information, information regarding the parameter used in the data processing step,
wherein the server-information obtaining step obtains an optimal parameter from the server apparatus, the optimal parameter being determined by the server apparatus based on a relationship between a noise amount and the parameter of each frame that is registered in the server apparatus as a same scene, the noise amount being calculated by the server apparatus based on a true value of image data of the same scene, the true value of image data being obtained by averaging the image data of a plurality of frames of the same scene registered in the server apparatus, the plurality of frames of the same scene including more than two frames, the true value approximating image data without superimposed noise amount due to broadcasting, the noise amount of the plurality of frames of the same scene having a Gaussian distribution,
wherein the data processing step adjusts the image quality of the input data including the broadcast program based on the optimal parameter,
wherein the status information identifies a frame by an ID of a program and an index of the frame and the server apparatus registers the parameter with the frame according to the ID and the index so that user information of a same frame obtained from a plurality of users is statistically processed, and
wherein the parameter is set in accordance with the server information, which is obtained independently of user operations.

20. A non-transitory computer-readable medium storing a program that is executed on a computer for adjusting an image quality of a broadcast program, the program comprising:
a data processing step of processing input data based on a parameter;
a first setting step of setting, in accordance with an operation operated when inputting the parameter, the parameter used in the data processing step;
a user-information providing step of providing user information to a server apparatus that statistically processes the user information, the user information including the parameter set in the first setting step and status information indicating status under which the parameter is used in the data processing step;
a server-information obtaining step of obtaining server information for setting the parameter; and
a second setting step of setting, in accordance with the server information, information regarding the parameter used in the data processing step,
wherein the server-information obtaining step obtains an optimal parameter from the server apparatus, the optimal parameter being determined by the server apparatus based on a relationship between a noise amount and the parameter of each frame that is registered in the server apparatus as a same scene, the noise amount being calculated by the server apparatus based on a true value of image data of the same scene, the true value of image data being obtained by averaging the image data of a plurality of frames of the same scene registered in the server apparatus, the plurality of frames of the same scene including more than two frames, the true value approximating image data without superimposed noise amount due to broadcasting, the noise amount of the plurality of frames of the same scene having a Gaussian distribution,
wherein the data processing step adjusts the image quality of the input data including the broadcast program based on the optimal parameter,
wherein the status information identifies a frame by an ID of a program and an index of the frame and the server apparatus registers the parameter with the frame according to the ID and the index so that user information of a same frame obtained from a plurality of users is statistically processed, and
wherein the parameter is set in accordance with the server information, which is obtained independently of user operations.

21. A non-transitory storage medium on which a program that is executed by a computer for adjusting an image quality of a broadcast program is stored, the program comprising:
a data processing step of processing input data based on a parameter;

a first setting step of setting, in accordance with an operation operated when inputting the parameter, the parameter used in the data processing step;

a user-information providing step of providing user information to a server apparatus that statistically processes the user information, the user information including the parameter set in the first setting step and status information indicating status under which the parameter is used in the data processing step;

a server-information obtaining step of obtaining server information for setting the parameter; and a second setting step of setting, in accordance with the server information, information regarding the parameter used in the data processing step, wherein the server-information obtaining step obtains an optimal parameter from the server apparatus, the optimal parameter being determined by the server apparatus based on a relationship between a noise amount and the parameter of each frame that is registered in the server apparatus as a same scene, the noise amount being calculated by the server apparatus based on a true value of image data of the same scene, the true value of image data being obtained by averaging the image data of a plurality of frames of the same scene registered in the server apparatus, the plurality of frames of the same scene including more than two frames, the approximating image data without superimposed noise amount due to broadcasting, the noise amount of the plurality of :frames of the same scene having a Gaussian distribution, wherein the data processing step adjusts the image quality of the input data including the broadcast program based on the optimal parameter, wherein the status information identifies a frame by an ID of a program and an index of the frame and the server apparatus registers the parameter with the frame according to the ID and the index so that user information of a same frame obtained from a plurality of users is statistically processed, and wherein the parameter is set in accordance with the server information, which is obtained independently of user operations.

22. A data processing apparatus for adjusting an image quality of a broadcast program comprising:

user-information obtaining means for obtaining user information from a plurality of user terminals, the user information including a parameter used at a user terminal that processes input data based on the parameter, and including status information indicating status under which the parameter is used at the user terminal;

feature detecting means for detecting feature information from the status information included in the user information and associating information regarding the parameter with each set of feature information; and server-information providing means for providing the user terminal with server information including the information regarding the parameter associated with the feature information, wherein the server-information providing means provides an optimal parameter to the user terminal, the optimal parameter being determined based on a relationship between a noise amount and the parameter of each frame that is registered in the data processing apparatus as a some scene, the noise amount being calculated by the data processing apparatus based on a true value of image data of the same scene, the true value of image data being obtained by averaging the image data of a plurality of frames of the same scene registered in the server apparatus, the plurality of frames of the same scene including more than two frames, the true value approximating image data without superimposed noise amount due to broadcasting, the noise amount of the plurality of frames of the same scene having a Gaussian distribution, wherein the optimal parameter is used by the user terminal when the user terminal adjusts the image quality of the input data including the broadcast program, wherein the status information identifies a frame by an ID of a program and an index of the frame and the server apparatus registers the parameter with the frame according to the ID and the index so that user information of a same frame obtained from a plurality of users is statistically processed, and wherein the parameter is set in accordance with the server information, which is obtained independently of user operations.

23. The data processing apparatus according to claim 22, wherein the feature detecting means obtains, as the feature information, a noise amount of the input data from the status information.

24. The data processing apparatus according to claim 23, wherein the status information is part of the input data, and wherein the feature detecting means comprises:

true-value obtaining means for obtaining a true value of the input data; and noise-amount calculating means for calculating a noise amount of the input data from the part of the input data serving as status information and the true value of the input data.

25. The data processing apparatus according to claim 24, wherein the true-value obtaining means obtains a true value of the input data by adding part of the same input data serving as the status information obtained from a plurality of user terminals.

26. The data processing apparatus according to claim 22, wherein the input data is image data, and wherein the feature detecting means obtains, as the feature information, a motion amount of the image data from the status information.

27. The data processing apparatus according to claim 26, wherein the status information is part of the image data, and wherein the feature detecting means obtains a motion amount from the part of the image data.

28. The data processing apparatus according to claim 22, wherein the feature detecting means obtains content or a genre of the input data from the status information.

29. The data processing apparatus according to claim 22, wherein the feature detecting means obtains, from the status information, identification information for identifying playback means that plays back the input data at the user terminal.

30. The data processing apparatus according to claim 22, wherein the feature detecting means obtains, from the status information, identification information for identifying output means that outputs a result of processing the input data at the user terminal.

31. The data processing apparatus according to claim 22, wherein the feature detecting means obtains an average value or mode of the parameters included in the user information with the status information from which the same feature information is yielded, and associates the average value or mode with the same feature information as the information regarding the parameter.

32. The data processing apparatus according to claim 22, wherein the feature detecting means obtains an average value or mode of the feature information obtained from the status information included in the user information with the same value of the parameter, and associates the average value or mode of the feature information with the same value of the parameter as the information regarding the parameter.

33. The data processing apparatus according to claim 22, wherein the user information includes a first parameter being the parameter input by a user of a user terminal, and a second parameter being the parameter obtained at the user terminal, and
wherein the feature detecting means statistically processes the first and second parameters included in the user information with the status information from which the same feature information is yielded, thereby obtaining information representing a relational expression that relates the first and second parameters with each other, and associates the information representing the relational expression with the same feature information as the information regarding the parameter.

34. The data processing apparatus according to claim 22, wherein the server-information providing means provides the server information in response to a request from the user terminal.

35. The data processing apparatus according to claim 34, wherein the server-information providing means provides the user terminal with the server information including the information regarding the parameter associated with the feature information obtained from the status information included in the user information from the user terminal.

36. The data processing apparatus according to claim 22, further comprising fee charging means for charging a fee for the user information obtained or the server information provided.

37. A data processing method for adjusting an image quality of a broadcast program comprising:
a user-information obtaining step of obtaining user information from a plurality of user terminals, the user information including a parameter used at a user terminal that processes input data based on the parameter, and including status information indicating status under which the parameter is used at the user terminal;
a feature detecting step of detecting feature information from the status information included in the user information and associating information regarding the parameter with each set of feature information; and
a server-information providing step of providing the user terminal with server information including the information regarding the parameter associated with the feature information,
wherein the server-information providing step provides an optimal parameter to the user terminal, the optimal parameter being determined based on a relationship between a noise amount and the parameter of each frame that is registered as a same scene, the noise amount being calculated based on a true value of image data of the same scene, the true value of image data being obtained by averaging the image data of a plurality of frames of the same scene, the plurality of frames of the same scene including more than two frames, the true value approximating image, data without superimposed noise amount due to broadcasting, the noise amount of the plurality of frames of the same scene having a Gaussian distribution,
wherein the optimal parameter is used by the user terminal when the user terminal adjusts the image quality of the input data including the broadcast program,
wherein the status information identifies a frame by an ID of a program and an index of the frame and the server apparatus registers the parameter with the frame according to the ID and the index so that user information of a same frame obtained from a plurality of users is statistically processed, and
wherein the parameter is set in accordance with the server information, which is obtained independently of user operations.

38. A non-transitory computer-readable medium storing a program that is executed on a computer for adjusting an image quality of a broadcast program, the program comprising:
a user-information obtaining step of obtaining user information from a plurality of user terminals, the user information including a parameter used at a user terminal that processes input data based on the parameter, and including status information indicating status under which the parameter is used at the user terminal;
a feature detecting step of detecting feature information from the status information included in the user information and associating information regarding the parameter with each set of feature information; and
a server-information providing step of providing the user terminal with server information including the information regarding the parameter associated with the feature information,
wherein the server-information providing step provides an optimal parameter to the user terminal, the optimal parameter being determined based on a relationship between a noise amount and the parameter of each frame that is registered as a same scene, the noise amount being calculated based on a true value of image data of the same scene, the true value of image data being obtained by averaging the image data of a plurality of frames of the same scene, the plurality of frames of the same scene including more than two frames, the true value approximating image data without superimposed noise amount due o broadcasting, the noise amount of the uralit frames of the same scene ha vino a Gaussian distribution,
wherein the optimal parameter is used by the user terminal when the user terminal adjusts the image quality of the input data including the broadcast program,
wherein the status information identifies a frame by an ID of a program and an index of the frame and the server apparatus registers the parameter with the frame according to the ID and the index so that user information of a same frame obtained from a plurality of users is statistically processed, and
wherein the parameter is set in accordance with the server information, which is obtained independently of user operations.

39. A non-transitory storage medium on which a program that is executed by a computer for adjusting an image quality of a broadcast program is stored, the program comprising:
a user-information obtaining step of obtaining user information from a plurality of user terminals, the user information including a parameter used at a user terminal that processes input data based on the parameter, and including status information indicating status under which the parameter is used at the user terminal;
a feature detecting step of detecting feature information from the status information included in the user information and associating information regarding the parameter with each set of feature information; and
a server-information providing step of providing the user terminal with server information including the information regarding the parameter associated with the feature information, wherein the server-information providing step provides an optimal parameter to the user terminal, the optimal parameter being determined based on a relationship between a noise amount and the parameter of each frame that is registered as a same scene, the noise amount being calculated based on a true value of image data of the same scene, the true value of image data being obtained by averaging the image data of a plurality of frames of the same scene, the plurality of frames of the same scene including more than two frames, the true value approximating image data without superimposed noise amount due to broadcasting, the noise amount of the plurality of frames of the same scene having a Gaussian distribution, wherein the status information identifies a frame by an ID of a program and an index of the frame and the server apparatus registers the parameter with the frame according to the ID and the index so that user information of a same frame obtained from a plurality of users is statistically processed, and wherein the optimal parameter is used by the user terminal when the user terminal adjusts the image quality of the input data including the broadcast program, wherein the parameter is set in accordance with the server information, which is obtained independently of user operations.

40. A data processing system for adjusting an image quality of a broadcast program comprising a plurality of user terminals and a server apparatus, each of the plurality of user terminals comprising:
data processing means for processing input data based on a parameter;
first setting means for setting, in accordance with an operation operated when inputting the parameter, the parameter used by the data processing means;
user-information providing means for providing user information to a server apparatus that statistically processes the user information, the user information including the parameter set by the first setting means and status information indicating status under which the parameter is used by the data processing means;
server-information obtaining means for obtaining server information for setting the parameter; and
second setting means for setting, in accordance with the server information, information regarding the parameter used by the data processing means,
wherein the status information identifies a frame by an ID of a program and an index of the frame and the server apparatus registers the parameter with the frame according to the ID and the index so that user information of a same frame obtained from a plurality of users is statistically processed, and
wherein the parameter is set in accordance with the server information, which is obtained independently of user operations; and the server apparatus comprising:
user-information obtaining means for obtaining the user information from theplurality of user terminals;
feature detecting means for detecting feature information from the status information included in the user information and associating the information regarding the parameter with each set of feature information; and
server-information providing means for providing the user terminal with server information including the information regarding the parameter associated with the feature information, wherein the server-information obtaining means obtains an optimal parameter from the server apparatus, the optimal parameter being determined by the server apparatus based on a relationship between a noise amount and the parameter of each frame that is registered in the server apparatus as a same scene, the noise amount being calculated by the server apparatus based on a true value of image data of the same scene, the true value of image data being obtained by averaging the image data of a plurality of frames of the same scene registered in the server apparatus, the plurality of frames of the same scene including more than two frames, the true value approximating image data without superimposed noise amount due to broadcasting, the noise amount of the plurality of frames of the same scene having a Gaussian distribution, and wherein the data processing means adjusts the image quality of the input data including the broadcast program based on the optimal parameter.

41. A data processing apparatus for adjusting an image quality of a broadcast program comprising:
a data processing unit that processes input data based on a parameter;
a first setting unit that sets, in accordance with an operation operated when inputting the parameter, the parameter used by the data processing unit;
a user-information providing unit that provides user information to a server apparatus that statistically processes the user information, the user information including the parameter set by the first setting unit and status information indicating status under which the parameter is used by the data processing unit;
a server-information obtaining unit that obtains server information for setting the parameter; and
a second setting unit that sets, in accordance with the server information, information regarding the parameter used by the data processing unit,
wherein the server-information obtaining unit obtains an optimal parameter from the server apparatus, the optimal parameter being determined by the server apparatus based on a relationship between a noise amount and the parameter of each frame that is registered in the server apparatus as a same scene, the noise amount being calculated by the server apparatus based on a true value of image data of the same scene, the true value of image data being obtained by averaging the image data of a plurality of frames of the same scene registered in the server apparatus, the plurality of frames of the same scene including more than two frames, the true value imaging image data without superimposed noise amount due to broadcasting, the noise amount of the plurality of frames of the same scene having a Gaussian distribution,
wherein the data processing unit adjusts the image quality of the input data including the broadcast program based on the optimal parameter,
wherein the status information identifies a frame by an ID of a program and an index of the frame and the server apparatus registers the parameter with the frame according to the ID and the index so that user information of a same frame obtained from a plurality of users is statistically processed, and
wherein the parameter is set in accordance with the server information, which is obtained independently of user operations.

42. The data processing apparatus according to claim 41, wherein the data processing unit comprises:
- a weighting unit that weighs the input data and output data obtained by processing the input data, using predetermined weights; and
- an adding unit that adds the weighted input data and output data and outputting the sum as output data corresponding to the input data;
- wherein the first setting unit and the second setting unit set the parameter representing the predetermined weights for the input data and the output data.

43. The data processing apparatus according to claim 42, wherein the user-information providing unit provides the server apparatus with the user information including the parameter representing the predetermined weights.

44. The data processing apparatus according to claim 41, wherein the data processing means comprises:
- a weighting unit that weighs the input data and output data obtained by processing the input data, using predetermined weights;
- an adding unit that adds the weighted input data and output data and outputs the sum as output data corresponding to the input data;
- a weight calculating unit that calculates a weight for weighting the input data and the output data;
- a correcting unit that corrects the weight calculated by the weight calculating unit, based on the information set by the second setting unit; and
- a selecting unit that selects either a weight associated with the parameter set by the first setting unit or the weight corrected by the correcting unit, and supplying the weight selected to the weighting unit.

45. The data processing apparatus according to claim 41, wherein the data processing unit comprises:
- a prediction-tap extracting unit that extracts the input data used as prediction taps for carrying out a predetermined predictive calculation with regard to target output data considered among output data obtained by processing the input data;
- a prediction unit that executes the predetermined predictive calculation using the prediction taps for the target output data and predetermined tap coefficients to calculate a predictive value of the target output data; and
- a tap-coefficient generating unit that generates the predetermined tap coefficients based on the parameter set by the first setting unit or the information set by the second setting unit.

46. A data processing apparatus for adjusting an image quality of a broadcast program comprising:
- a user-information obtaining unit that obtains user information from a plurality of user terminals, the user information including a parameter used at a user terminal that processes input data based on the parameter, and including status information indicating status under which the parameter is used at the user terminal;
- a feature detecting unit that detects feature information from the status information included in the user information and associating information regarding the parameter with each set of feature information; and
- a server-information providing unit that provides the user terminal with server information including the information regarding the parameter associated with the feature information,
- wherein the server-information providing unit provides an optimal parameter to the user terminal, the optimal parameter being determined based on a relationship between a noise amount and the parameter of each frame that is registered in the data processing apparatus as a same scene, the noise amount being calculated by the server apparatus based on a true value of image data of the same scene, the true value of image data being obtained by averaging the image data of a plurality of frames of the same scene, the plurality of frames of the same scene including more than two frames, the true value approximating data without superimposed noise amount due to broadcasting, the noise amount of the plurality of frames of the same scene having a Gaussian distribution,
- wherein the optimal parameter is used by the user terminal when the user terminal adjusts the image quality of the input data including the broadcast program,
- wherein the status information identifies a frame by an ID of a program and an index of the frame and the server apparatus registers the parameter with the frame according to the ID and the index so that user information of a same frame obtained from a plurality of users is statistically processed, and
- wherein the parameter is set in accordance with the server information, which is obtained independently of user operations.

47. The data processing apparatus according to claim 46, wherein the feature detecting unit obtains, as the feature information, a noise amount of the input data from the status information.

48. The data processing apparatus according to claim 47, wherein the status information is part of the input data, and wherein the feature detecting means comprises:
- a true-value obtaining unit that obtains a true value of the input data; and
- a noise-amount calculating unit that calculates a noise amount of the input data from the part of the input data serving as status information and the true value of the input data.

49. A data processing system for adjusting an image quality of a broadcast program comprising a plurality of user terminals and a server apparatus,
each of the plurality of user terminals comprising:
- a data processing unit that processes input data based on a parameter;
- a first setting unit that sets, in accordance with an operation operated when inputting the parameter, the parameter used by the data processing unit;
- a user-information providing unit that provides user information to a server apparatus that statistically processes the user information, the user information including the parameter set by the first setting unit and status information indicating status under which the parameter is used by the data processing unit;
- a server-information obtaining unit that obtains server information for setting the parameter; and
- a second setting unit that sets, in accordance with the server information, information regarding the parameter used by the data processing unit,
- wherein the status information identifies a frame by an ID of a program and an index of the frame and the server apparatus registers the parameter with the frame according to the ID and the index so that user information of a same frame obtained from a plurality of users is statistically processed, and
- wherein the parameter is set in accordance with the server information, which is obtained independently of user operations; and the server apparatus comprising:
- a user-information obtaining unit that obtains the user information from the plurality of user terminals;
- a feature detecting unit that detects feature information from the status information included in the user information and associating the information regarding the parameter with each set of feature information; and
- a server-information providing unit that provides the user terminal with server information including the information regarding the parameter associated with the feature information, wherein the server-information obtaining unit obtains an optimal parameter from the server apparatus, the optimal parameter being determined by the server apparatus based on a relationship between a noise amount and the parameter of each frame that is registered in the server apparatus as a same scene, the noise amount being calculated by the server apparatus based on a true value of image data of the same scene, the true value of image data being obtained by averaging the image data of a plurality of frames of the same scene registered in the server apparatus, the plurality of frames of the same scene including more than two frames, the true value approximating image data without superimposed noise amount due to broadcasting, the noise amount of the plurality frames of the same scene having a Gaussian distribution, and wherein the data processing unit adjusts the image quality of the input data including the broadcast program based on the optimal parameter.

* * * * *